United States Patent
Lemke et al.

(10) Patent No.: US 7,549,401 B2
(45) Date of Patent: Jun. 23, 2009

(54) TWO-CYCLE, OPPOSED-PISTON INTERNAL COMBUSTION ENGINE

(75) Inventors: James U. Lemke, La Jolla, CA (US); William B. McHargue, Cardiff by the Sea, CA (US); Michael H. Wahl, Bonita, CA (US); Patrick R. Lee, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 11/629,136

(22) PCT Filed: Jun. 10, 2005

(86) PCT No.: PCT/US2005/020553

§ 371 (c)(1),
(2), (4) Date: Dec. 8, 2006

(87) PCT Pub. No.: WO2005/124124

PCT Pub. Date: Dec. 29, 2005

(65) Prior Publication Data

US 2007/0245892 A1    Oct. 25, 2007

Related U.S. Application Data

(63) Continuation-in-part of application No. 10/865,707, filed on Jun. 10, 2004, now Pat. No. 7,156,056.

(51) Int. Cl.
*F01P 1/04* (2006.01)
*F01P 1/06* (2006.01)

(52) U.S. Cl. .................. 123/41.34; 123/51 BA

(58) Field of Classification Search .............. 123/41.35, 123/41.34, 41.38, 51 AA, 51 BA, 53.2, 67, 123/197.4
See application file for complete search history.

(56) References Cited

U.S. PATENT DOCUMENTS

| 704,713 | A | 7/1902 | Klein ................. 123/41.35 |
| 1,231,903 | A | 7/1917 | Junkers | |
| 1,386,062 | A | 8/1921 | Junkers | |

(Continued)

FOREIGN PATENT DOCUMENTS

CH    20385    10/1899

(Continued)

OTHER PUBLICATIONS

International Preliminary Report on Patentability, with Written Opinion of the ISA, PCT/US2005/020553, mailed Dec. 28, 2006.

(Continued)

*Primary Examiner*—Mahmoud Gimie
(74) *Attorney, Agent, or Firm*—INCAPLAW; Terrance A. Meador

(57) ABSTRACT

In a two-cycle, opposed-piston internal combustion engine, opposed pistons disposed in a cylinder are coupled to a pair of side-mounted crankshafts by connecting rods that are subject to substantially tensile forces acting between the pistons and the crankshafts. This geometry reduces or eliminates side forces between the pistons and the bore of the cylinder. The cylinder and the pistons are independently cooled to reduce cylindrical deformation caused by thermal expansion during engine operation.

54 Claims, 41 Drawing Sheets

U.S. PATENT DOCUMENTS

| | | | |
|---|---|---|---|
| 1,410,319 A | 3/1922 | Junkers | |
| 1,495,326 A | 5/1924 | Junkers | |
| 1,603,173 A | 10/1926 | Watts | 123/196 R |
| 1,683,040 A | 9/1928 | Junkers | |
| 1,704,325 A | 3/1929 | Junkers | |
| 1,796,603 A | 3/1931 | Junkers | |
| 1,808,380 A * | 6/1931 | Royal | 123/41.35 |
| 1,818,558 A | 9/1931 | Junkers | |
| 1,892,277 A | 12/1932 | Junkers | |
| 1,956,355 A | 4/1934 | Junkers | 309/33 |
| 1,981,870 A | 11/1934 | Magdeburger | 92/84 |
| 2,031,318 A | 2/1936 | Junkers | 123/51 |
| 2,056,056 A | 9/1936 | Ballou | 123/51 BA |
| 2,076,334 A * | 4/1937 | Burns | 123/51 B |
| 2,169,807 A | 8/1939 | Lyon | 417/488 |
| 2,244,323 A | 6/1941 | Antonsen et al. | 123/173 |
| 2,283,432 A | 5/1942 | Gerlach et al. | 309/33 |
| 2,374,460 A * | 4/1945 | Rossman | 123/51 BB |
| 2,398,640 A | 4/1946 | Hickey | 123/48 B |
| 2,398,980 A | 4/1946 | Vonruti | 123/51 |
| 2,417,910 A | 3/1947 | Bruegger | 74/44 |
| 2,423,395 A | 7/1947 | Lieberherr | 123/173 |
| 2,435,361 A | 2/1948 | Mallory | 123/51 |
| 2,463,308 A | 3/1949 | Prieto | 123/51 |
| 2,486,185 A | 10/1949 | Mallory | 123/51 |
| 2,653,484 A | 9/1953 | Zecher | 74/40 |
| 2,776,649 A | 1/1957 | Fenske | 123/58 |
| 3,023,743 A | 3/1962 | Schauer | 123/51 |
| 3,117,566 A | 1/1964 | Vendendiger | 123/51 BA |
| 3,182,642 A | 5/1965 | Drtina | 123/41.35 |
| 3,209,736 A | 10/1965 | Witzky | 123/48 R |
| 3,221,718 A | 12/1965 | Isley | 123/32 |
| 3,369,530 A | 2/1968 | Campbell | 123/6 |
| 3,384,057 A | 5/1968 | Boone | 123/51 |
| 3,528,394 A | 9/1970 | Cummins | 123/51 A |
| 3,534,715 A | 10/1970 | Antonsen et al. | 123/41.79 |
| 3,777,722 A | 12/1973 | Lenger | 123/46 |
| 3,868,931 A | 3/1975 | Dutry et al. | 123/51 R |
| 3,983,793 A | 10/1976 | Beardmore | 92/190 |
| 4,010,611 A | 3/1977 | Zachery | 60/516 |
| 4,010,718 A | 3/1977 | Stewart | 123/41.35 |
| 4,030,471 A | 6/1977 | Ginjel | 123/197 |
| 4,090,479 A | 5/1978 | Kaye | 123/306 |
| 4,204,487 A | 5/1980 | Jones | 123/41.35 |
| 4,375,792 A | 3/1983 | Barret | 123/51 AA |
| 4,694,785 A | 9/1987 | Timmerman et al. | 123/52 |
| 4,794,896 A | 1/1989 | Tsai et al. | 123/193 |
| 4,908,923 A | 3/1990 | Anderson | 29/888.01 |
| 5,017,758 A | 5/1991 | Kirkman | 219/205 |
| 5,042,441 A | 8/1991 | Paul et al. | 123/276 |
| 5,058,537 A | 10/1991 | Paul et al. | 123/51 |
| 5,213,067 A | 5/1993 | Kramer | 123/51 |
| 5,355,854 A | 10/1994 | Aubee | 123/431 |
| 5,375,573 A | 12/1994 | Bowman | 123/196 |
| 5,533,472 A | 7/1996 | Sands et al. | 123/41.35 |
| 5,806,631 A | 9/1998 | Yoshida et al. | 184/18 |
| 5,826,556 A | 10/1998 | Ruman et al. | 123/196 |
| 5,884,550 A | 3/1999 | Northam | 92/212 |
| 5,915,345 A | 6/1999 | Kling et al. | 123/41.35 |
| 6,039,011 A | 3/2000 | Agalarov et al. | 123/51 AA |
| 6,182,619 B1 | 2/2001 | Spitzer et al. | 123/51 |
| 6,257,180 B1 | 7/2001 | Klein | 123/70 |
| 6,283,478 B1 | 9/2001 | Kumai et al. | 277/435 |
| 6,305,334 B1 | 10/2001 | Schuko | 123/56.2 |
| 6,418,885 B1 | 7/2002 | Paul et al. | 123/25 C |
| 6,435,925 B1 | 8/2002 | Mabru | 440/113 |
| 6,481,389 B2 | 11/2002 | Suzuki et al. | 123/41.35 |
| 6,662,762 B2 | 12/2003 | Schuko | 123/56.1 |
| 7,040,520 B2 | 5/2006 | Turk | 227/10 |
| 7,097,771 B2 | 8/2006 | Colucci | 210/660 |
| 7,156,056 B2 | 1/2007 | Lemke et al. | 123/41.35 |
| 7,270,108 B2 | 9/2007 | Lemke | 123/299 |
| 7,334,570 B2 | 2/2008 | Klyza | 123/467 |
| 7,360,511 B2 | 4/2008 | Lemke et al. | 123/41.35 |
| 2004/0011308 A1 | 1/2004 | Hausler et al. | 123/73 |
| 2005/0274332 A1 | 12/2005 | Lemke et al. | 123/41.35 |
| 2006/0157003 A1 | 7/2006 | Lemke et al. | 123/41.38 |
| 2006/0219213 A1 | 10/2006 | Lemke et al. | 123/299 |
| 2007/0039572 A1 | 2/2007 | Lemke et al. | 123/51 BB |
| 2007/0245892 A1 | 10/2007 | Lemke et al. | 92/169.1 |
| 2008/0035101 A1 | 2/2008 | Hausler et al. | 123/196 |
| 2008/0163848 A1 | 7/2008 | Lemke et al. | 123/197.3 |

FOREIGN PATENT DOCUMENTS

| | | |
|---|---|---|
| DE | 11054 | 9/1880 |
| DE | 195 47 186 | 7/1988 |
| DE | 424 3571 | 12/1992 |
| DE | 199 62 325 | 7/2001 |
| EP | 0609866 A1 | 8/1994 |
| EP | 0747591 A1 | 12/1996 |
| EP | 0943788 A1 | 9/1999 |
| GB | 5941/AD 1913 | 0/1914 |
| GB | 3720 | 3/1900 |
| GB | 10974/AD1914 | 5/1918 |
| GB | 147733 | 2/1921 |
| GB | 147730 | 4/1921 |
| GB | 173226 | 3/1922 |
| GB | 348084 | 4/1931 |
| GB | 348097 | 4/1931 |
| GB | 558115 * | 12/1943 |
| GB | 779 631 A | 7/1957 |
| WO | WO 00/28194 A1 | 5/2000 |
| WO | WO 00/68553 A1 | 11/2000 |
| WO | WO 01/75284 | 10/2001 |
| WO | WO 2005/124124 A1 | 12/2005 |
| WO | WO 2007/109122 A2 | 9/2007 |

OTHER PUBLICATIONS

J. Craig McLanahan, Salem State College; *Diesel Aircraft Engine: A Delayed Promise from the 1930's*, SAE International and American Institute if Aeronautics, 1999-01-5583, pp. 1-10.

J.F. Butler, E.P. Crowdyt; *The Doxford Seaforse Engine*, paper presented at a joint meeting of the Institute and N.E.C.I.E.S. on Nov. 8-9, 1971 pp. 73-115.

W.W. Pulkrabek, *Engineering Fundamentals of the Internal Combustion Engine*, Second Edition, 2004, pp. 5-11.

*Wickipedia*, the article entitled "Opposed Piston Engine", last update Jul. 12, 2007, printed Jul. 30, 2007, pp. 1-4.

Chinese Abstract of CN 1077214C, Jan. 2, 2002.

English Abstract of EP0747951 A1, Feb. 26, 1997.

English Translation of First Office Action issued Jul. 25, 2008 by the State Intellectual Property Office of PRC in PRC application 200580023840.9.

JK Parker, SR Bell, DM Davis; *An Opposed Piston Diesel Engine*, ICE vol. 18, New Developments in Off-Highway Engines, ASME 1992, pp. 17-24.

International Search Report and Written Opinion of the ISA, PCT/US2005/020553, mailed Dec. 28, 2006.

International Preliminary Report on Patentability, PCT/US2007/006618, mailed Sep. 23, 2008.

* cited by examiner

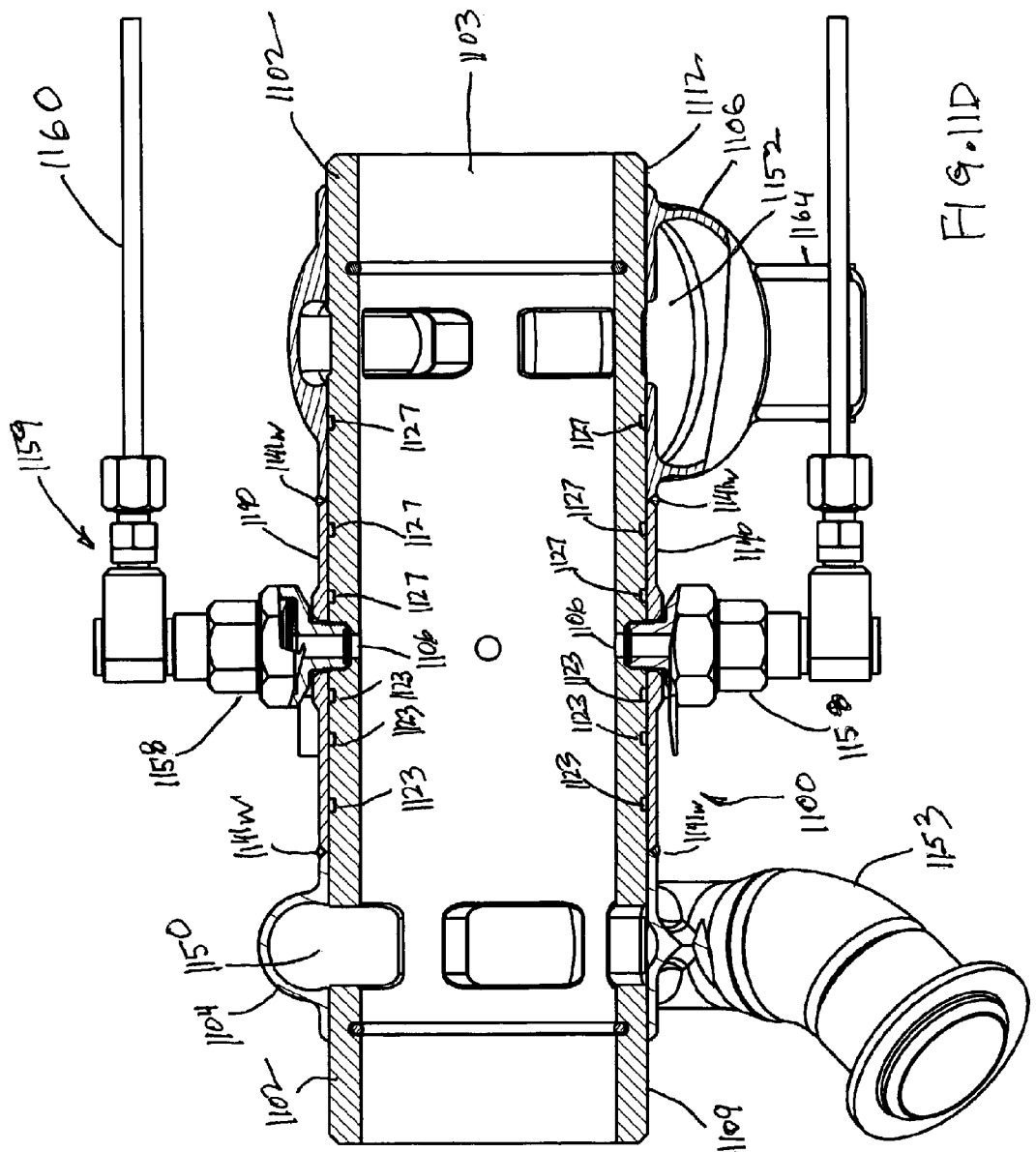

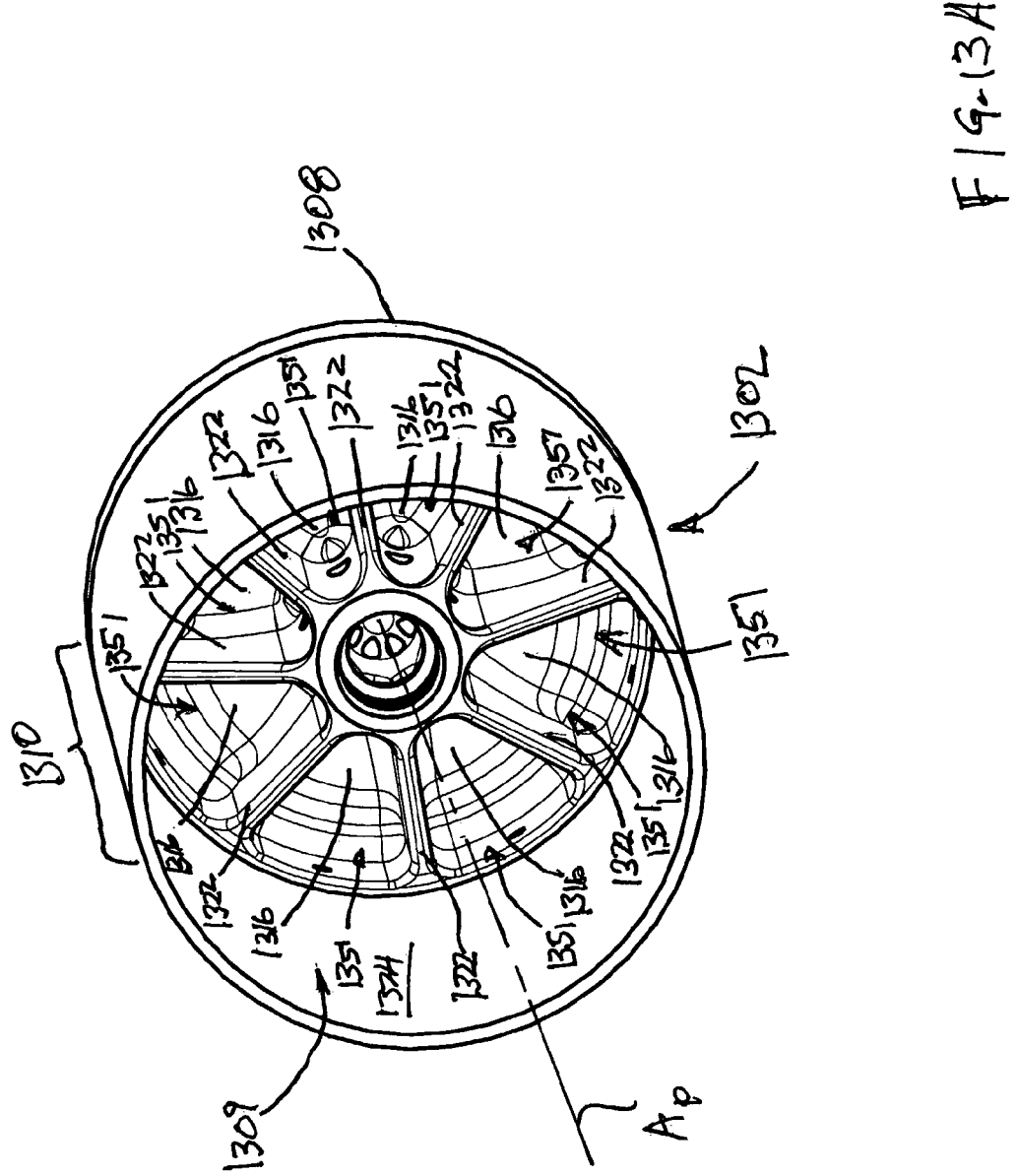

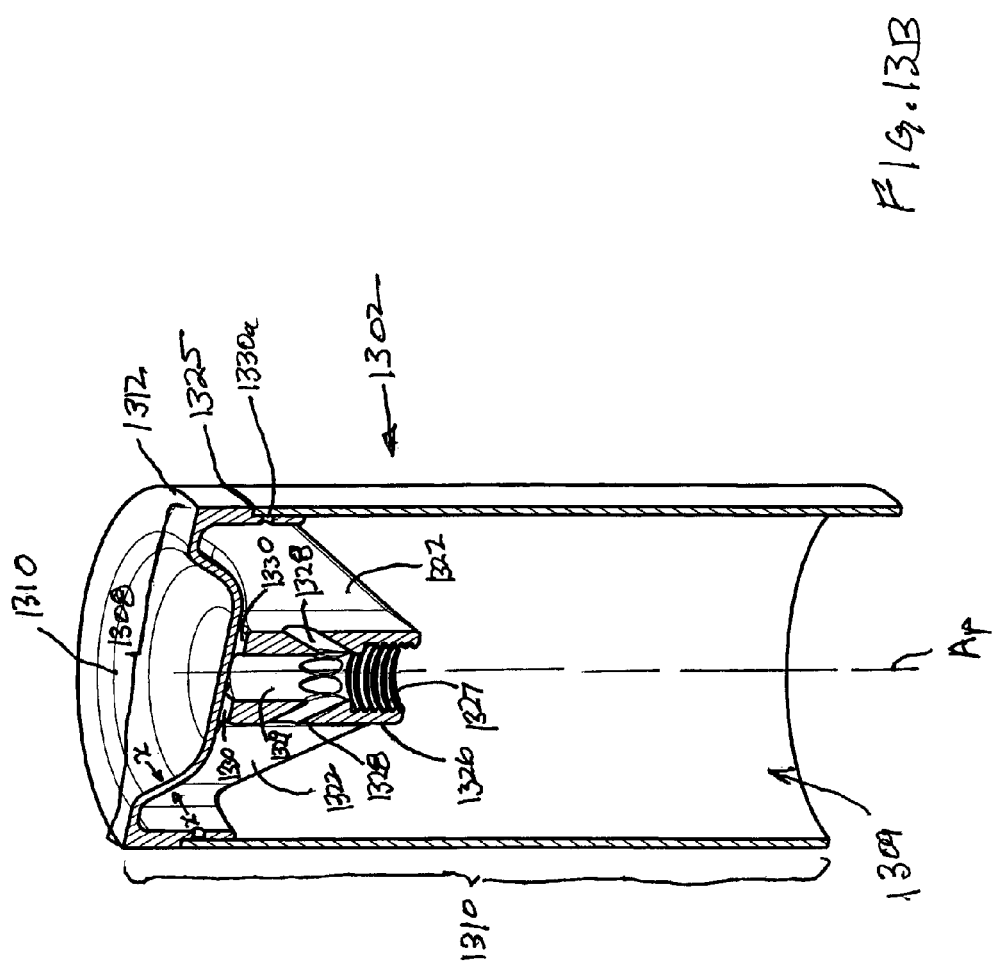

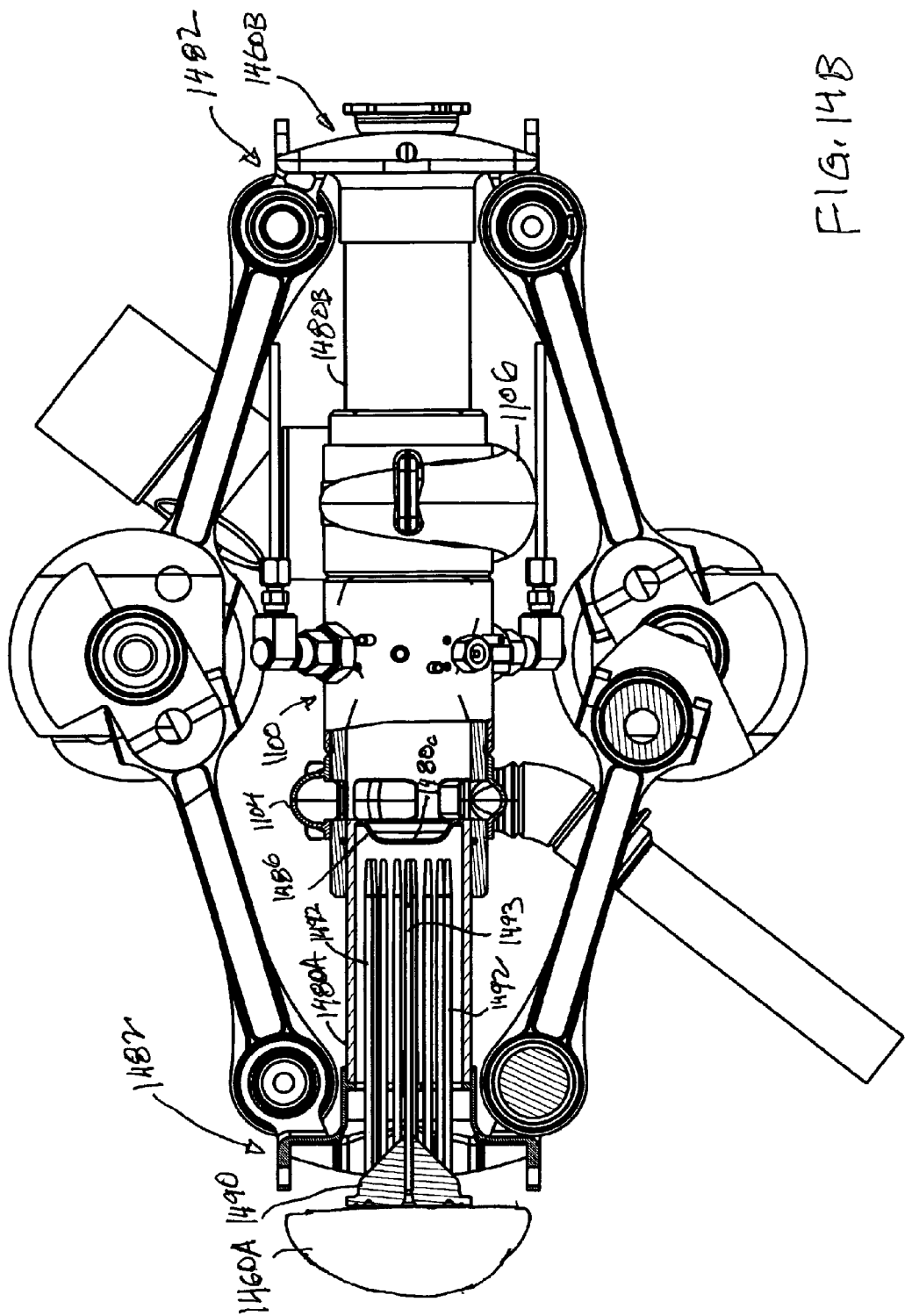

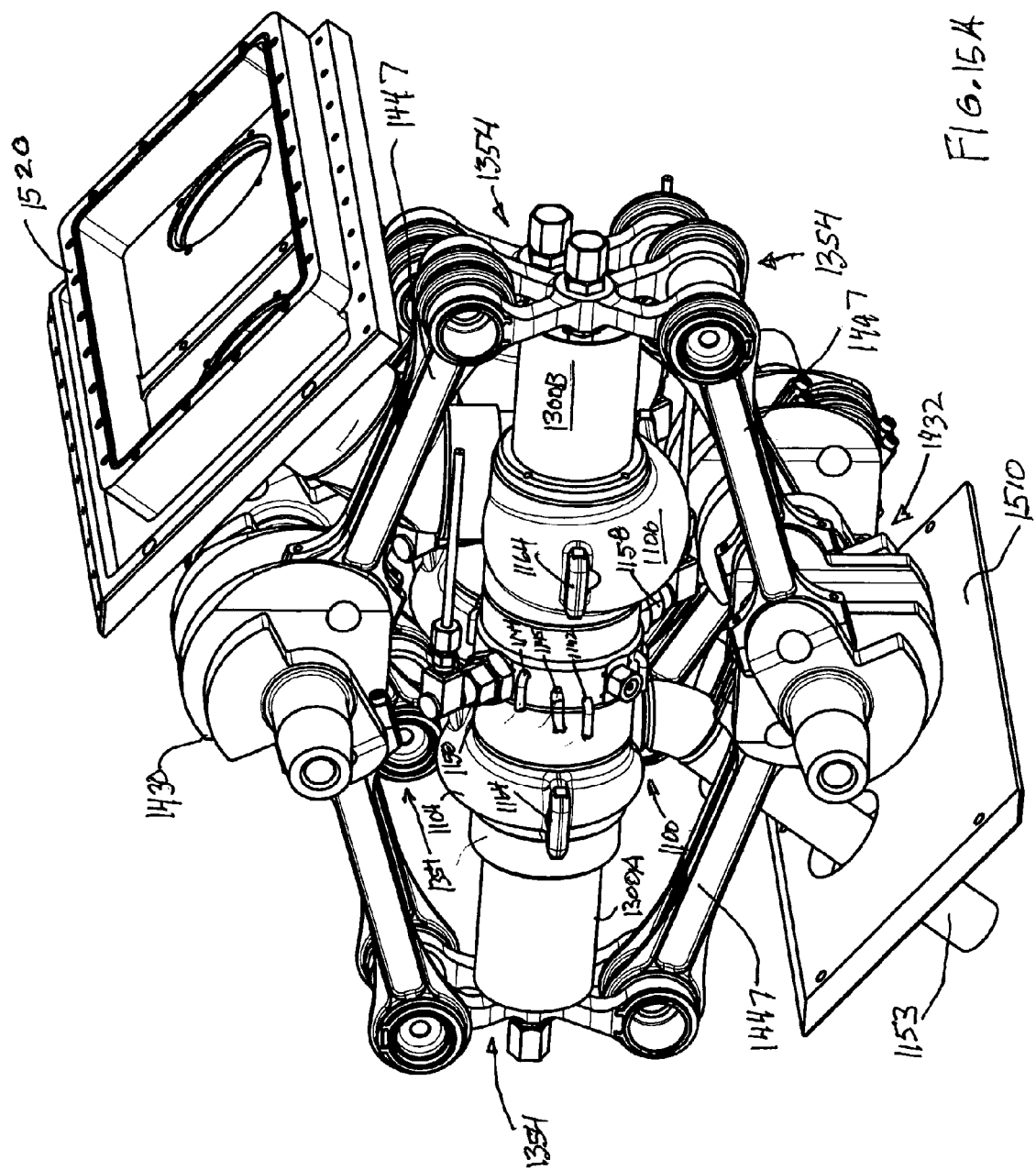

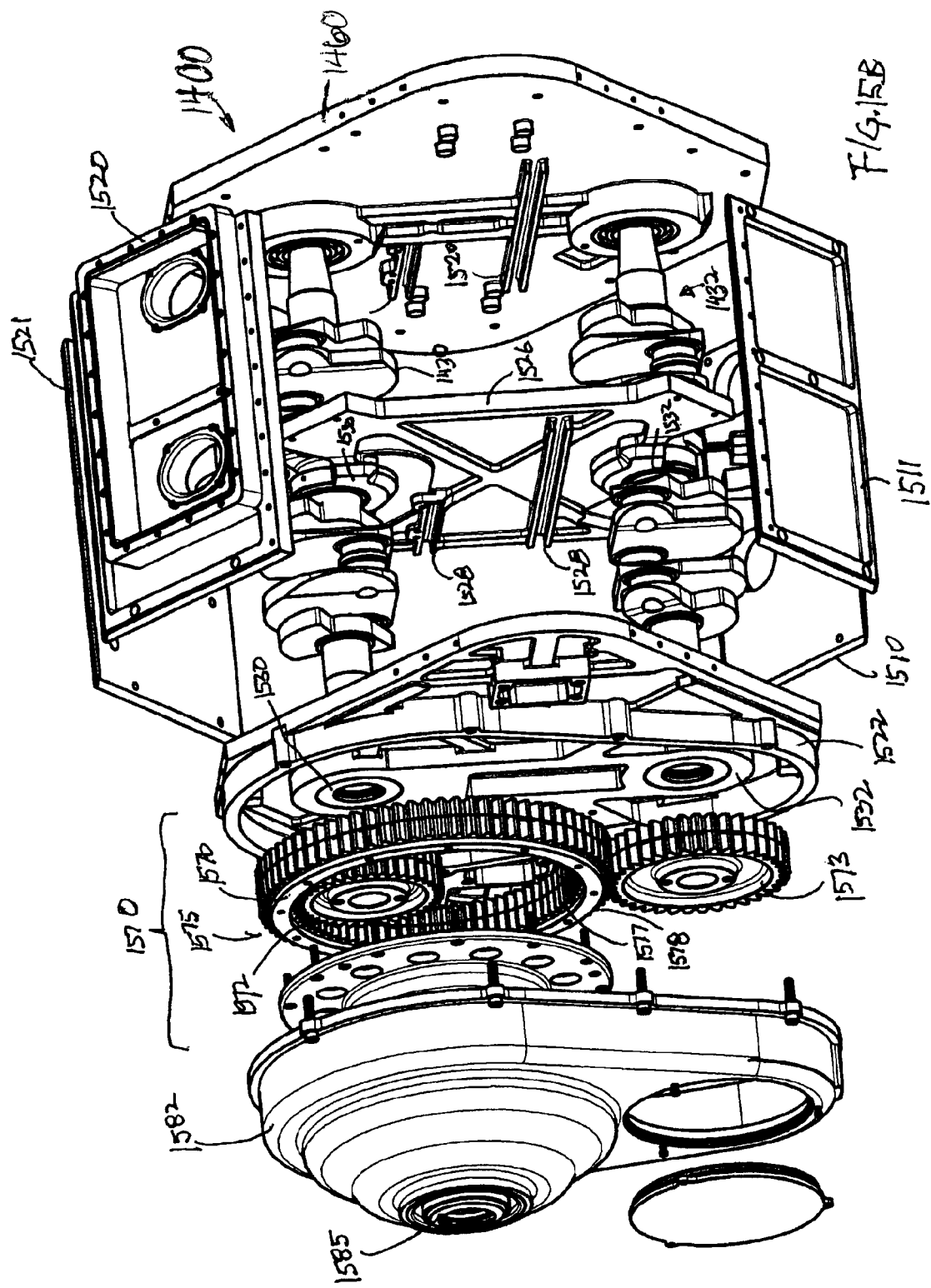

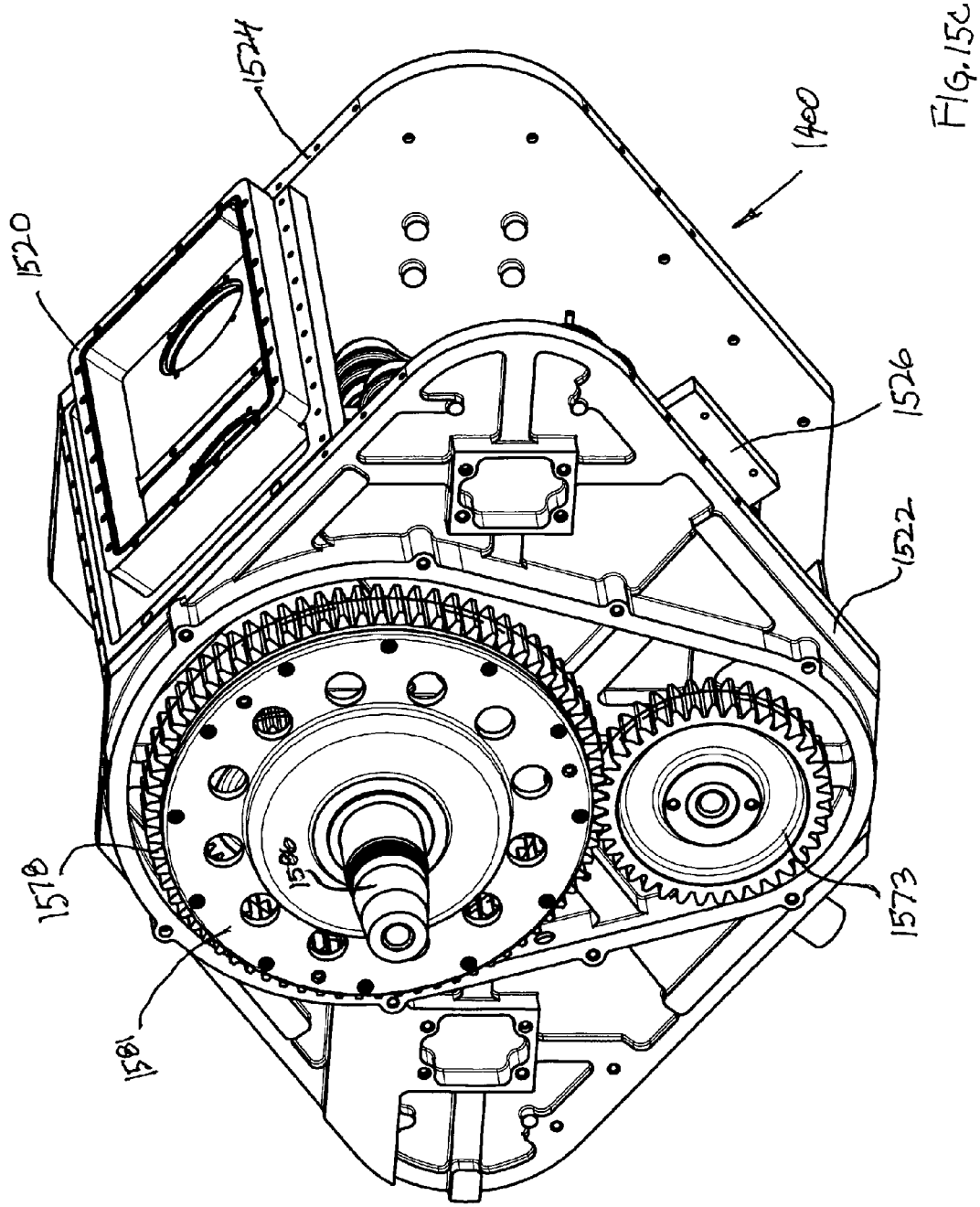

TWO-CYCLE, OPPOSED-PISTON INTERNAL COMBUSTION ENGINE

PRIORITY

This application claims priority under 35 US Code §371 as a United States National Phase Application of PCT/US2005/020553, filed 10 Jun. 2005 in the US Receiving Office, which claims the benefit of U.S. patent application Ser. No. 10/865,707 filed 10 Jun. 2004, now U.S. Pat. No. 7,156,056, issued Jan. 2, 2007.

This is also a continuation-in-part of U.S. patent application Ser. No. 10/865,707 filed Jun. 10, 2004, now U.S. Pat. No. 7,156,056, issued Jan. 2, 2007, for "Two-Cycle, Opposed Piston Internal Combustion Engine", the subject matter of which is hereby incorporated by reference in its entirety.

RELATED APPLICATIONS

The following co-pending applications, all commonly assigned to the assignee of this application, contain subject matter related to the subject matter of this application:

U.S. patent application Ser. No. 10/865,707, filed Jun. 10, 2004 for "Two Cycle, Opposed Piston Internal Combustion Engine", published as US 2005/0274332A1 on Dec. 29, 2005, now U.S. Pat. No. 7,156,056, issued Jan. 02, 2007;

PCT application US2005/020553, filed Jun. 10, 2005 for "Improved Two Cycle, Opposed Piston Internal Combustion Engine", published as WO/2005/124124 on Dec. 29, 2005;

U.S. patent application Ser. No. 11/095,250, filed Mar. 31, 2005 for "Opposed Piston, Homogeneous Charge, Pilot Ignition Engine", published as US/2006/0219213 on Oct. 05, 2006, now U.S. Pat. No. 7,270,108, issued Sep. 18, 2007;

PCT application US/2006/011886, filed Mar. 30, 2006 for "Opposed Piston, Homogeneous Charge, Pilot Ignition Engine", published as WO/2006/105390 on Oct. 5, 2006;

U.S. patent application Ser. No. 11/097,909, filed Apr. 1, 2005 for "Common Rail Fuel Injection System With Accumulator Injectors", published as US/2006/0219220 on Oct. 5, 2006, now U.S. patent No. 7,334,570, issued Feb. 26, 2008;

PCT application US2006/012353, filed Mar. 30, 2006 "Common Rail Fuel Injection System With Accumulator Injectors", published as WO/2006/107892 on Oct. 12, 2006;

U.S. patent application Ser. No. 11/378,959, filed Mar. 17, 2006 for "Opposed Piston Engine", published as US/2006/0157003 on Jul. 20, 2006, now U.S. Pat. No. 7,360,511, issued Mar. 22, 2008;

PCT application PCT/US2007/006618, filed Mar. 16, 2007 for "Opposed Piston Engine", published as WO 2007/109122 on Sep. 27, 2007;

U.S. patent application Ser. No. 11/512,942, filed Aug. 29, 2006, for "Two Stroke, Opposed Piston Internal Combustion Engine", published as US/2007/0039572 on Feb. 22, 2007;

U.S. patent application Ser. No. 11/642,140, filed Dec. 20, 2006, for "Two Cycle, Opposed Piston Internal Combustion Engine", continuation of 10/865,707;

U.S. patent application Ser. No. 12/075,374, filed Mar. 11, 2008, for "Opposed Piston Engine With Piston Compliance", published as US/2008/0163848 on Jul. 10, 2008; and, U.S. patent application Ser. No. 12/075,557, filed Mar. 12, 2008, for "Two Cycle, Opposed Piston Internal Combustion Engine", continuation of 10/865,707.

BACKGROUND

The invention concerns an internal combustion engine. More particularly, the invention relates to a two-cycle, opposed-piston engine.

The opposed-piston engine was invented by Hugo Junkers around the end of the nineteenth century. Junkers' basic configuration, shown in FIG. 1, uses two pistons P1 and P2 disposed crown-to-crown in a common cylinder C having inlet and exhaust ports I and E near bottom-dead-center of each piston, with the pistons serving as the valves for the ports. Bridges B support transit of the piston rings past the ports I and E. The engine has two crankshafts C1 and C2, one disposed at each end of the cylinder. The crankshafts, which rotate in the same direction, are linked by rods R1 and R2 to respective pistons. Wristpins W1 and W2 link the rods to the pistons. The crankshafts are geared together to control phasing of the ports and to provide engine output. Typically, a turbo-supercharger is driven from the exhaust port, and its associated compressor is used to scavenge the cylinders and leave a fresh charge of air each revolution of the engine. The advantages of Junkers' opposed piston engine over traditional two-cycle and four-cycle engines include superior scavenging, reduced parts count and increased reliability, high thermal efficiency, and high power density. In 1936, the Junkers Jumo airplane engines, the most successful diesel engines to that date, were able to achieve a power density that has not been matched by any diesel engine since. According to C. F. Taylor (*The Internal-Combustion Engine in Theory and Practice: Volume II, revised edition*; MIT Press, Cambridge, Mass., 1985): "The now obsolete Junkers aircraft Diesel engine still holds the record for specific output of Diesel engines in actual service (Volume I, FIG. 13-11)."

Nevertheless, Junkers' basic design contains a number of deficiencies. The engine is tall, with its height spanning the lengths of four pistons and at least the diameters of two crankshafts, one at each end of the cylinders. A long gear train with typically five gears is required to couple the outputs of the two crankshafts to an output drive. Each piston is connected to a crankshaft by a rod that extends from the interior of the piston. As a consequence, the rods are massive to accommodate the high compressive forces between the pistons and crankshafts. These compressive forces, coupled with oscillatory motion of the wrist pins and piston heating, cause early failure of the wrist pins connecting the rods to the pistons. The compressive force exerted on each piston by its connecting rod at an angle to the axis of the piston produces a radially-directed force (a side force) between the piston and cylinder bore. This side force increases piston/cylinder friction, which raises the piston temperature thereby limiting the brake mean effective pressure (BMEP, an indicator of engine power) achievable by the engine. One crankshaft is connected only to exhaust side pistons, and the other only to inlet side pistons. In the Jumo engine the exhaust side pistons account for up to 70% of the torque, and the exhaust side crankshaft bears the heavier torque burden. The combination of the torque imbalance, the wide separation of the crankshafts, and the length of the gear train coupling the crankshafts produces torsional resonance effects (vibration) in the gear train. A massive engine block is required to constrain the highly repulsive forces exerted by the pistons on the crankshafts during combustion, which literally try to blow the engine apart.

One proposed improvement to the basic opposed-piston engine, described in Bird's U.K. Patent 558,115, is to locate the crankshafts beside the cylinders such that their axes of rotation lie in a plane that intersects the cylinders and is normal to the axes of the cylinder bores. Such side-mounted crankshafts are closer together than in the Jumo engines, and are coupled by a shorter gear train. The pistons and crankshafts are connected by rods that extend from each piston along the sides of the cylinders, at acute angles to the sides of the cylinders, to each of the crankshafts. In this arrangement, the rods are mainly under tensile force, which removes the repulsive forces on the crankshafts and yields a substantial weight reduction because a less massive rod structure is required for a rod loaded with a mainly tensile force than for a rod under a mainly compressive load of the same magnitude. The wrist pins connecting the rods to the pistons are disposed outside of the pistons on saddles mounted to the outer skirts of the pistons. Bird's proposed engine has torsional balance brought by connecting each piston to both crankshafts. This balance, the proximity of the crankshafts, and the reduced length of the gear train produce good torsional stability. To balance dynamic engine forces, each piston is connected by one set of rods to one crankshaft and by another set of rods to the other crankshaft. This load balancing essentially eliminates the side forces that otherwise would operate between the pistons and the internal bores of the cylinders. The profile of the engine is also reduced by repositioning the crankshafts to the sides of the cylinders, and the shorter gear train requires fewer gears (four) than the Jumo engine. However, even with these improvements, a number of problems prevent Bird's proposed engine from reaching its full potential for simplification and power-to-weight ratio ("PWR", which is measured in horsepower per pound, hp/lb).

The favorable PWR of opposed piston engines as compared with other two and four cycle engines results mainly from the simple designs of these engines which eliminate cylinder heads, valve trains, and other parts. However, reducing weight alone has only a limited ability to boost PWR because at any given weight, any increase in BMEP to increase power is confined by the limited capability of the engines to cool the cylinders and pistons.

Substantial combustion chamber heat is absorbed by pistons and cylinders. In fact the crown of a piston is one of the hottest spots in a two-cycle, opposed-piston compression-ignition engine. Excessive heat will cause the crown to expand, which can lead to piston seizure. The piston must be cooled to mitigate this threat. In all high performance engines, the pistons are cooled principally by rings mounted to the outside surfaces of the pistons, near their crowns. The rings of a piston contact the cylinder bore and conduct heat from the piston to the cylinder, and therethrough to a coolant flowing through a cooling jacket, or by cooling fins on the engine cylinder assembly. Intimate contact is required between the rings and cylinder bore to cool the piston effectively. But piston rings must be lightly loaded in two-cycle, ported engines in order to survive transit over the bridges of the cylinder ports, where very complex stresses occur. Therefore, the rings are limited in their ability to cool the pistons, which places a limit on the maximum combustion chamber temperature achievable before engine failure occurs. It is known to apply a liquid lubricant to an inner surface of a piston in order to cool the piston, but the presence of structure in the interior of the piston to receive one or more wrist pins greatly limits the surface available for cooling and the means by which the liquid lubricant can be applied.

Prior opposed-piston engines include an engine block in which cylinders and engine bearings are cast in a large passive unit that serves as the primary structural and architectural element of the engine. Although Bird's engine rectified torque imbalance, eliminated most compressive forces on the rods, and eliminated side forces on the cylinder bore, it still used the engine block as the primary structural element. That is, the engine block provided support for the cylinders and engine bearings, manifolds for cylinder ports, and cooling jackets for the cylinders. Thermal and mechanical stresses transmitted through the engine block caused non-uniform radial distortion of the cylinders, necessitating piston rings to assist in maintaining the piston/cylinder seal.

It is clear that an increase in engine power in a two-cycle, opposed piston engine can be achieved with elimination or at least substantial reduction of the thermal and mechanical stresses that cause non-uniform radial distortion of the cylinder and with elimination or at least substantial reduction of thermal distortion of piston crowns.

SUMMARY

Increased BMEP is realized in a two-cycle, opposed-piston engine with side-mounted crankshafts by cooling that is both effective and tailored, and by the removal of mechanical stresses from the cylinder.

Effective cooling limits the maximum temperatures of the cylinder and pistons by conducting as much heat as possible away from these elements during engine operation. Tailored cooling eliminates or at least significantly reduces non-uniform distortion of the cylinder and expansion of the piston crowns that would otherwise be caused by heating of these elements during engine operation. In one aspect, the cylinder may be cooled by directed streaming of liquid coolant through groups of grooves on an external surface of the cylinder. In another aspect, each piston may be cooled by application of one or more directed jets of liquid coolant to a back surface of the crown of the piston.

Radially non-uniform mechanical stresses on the cylinder are eliminated or at least significantly reduced by freeing the cylinder from passive architectural or structural elements of the engine, such as an engine block. In one aspect, the cylinder may be supported in the engine principally by piston structures and fuel and coolant lines.

Altogether, these improvements maintain a close, uniform cylinder-to-piston clearance that enables a tight seal between the cylinder and the pistons, while avoiding contact between the pistons and the inside surface of the cylinder.

Further improvements in engine operation may be realized by permitting some compliance between the cylinder and pistons during engine operation. The pistons may be mounted in the engine with a degree of flexibility that enables the pistons to maintain alignment with the cylinder during engine operation.

These improvements, and other improvements and advantages described in the specification which follows, provide a very simple two-cycle, opposed-piston, engine capable of a substantial increase in BMEP, and with reduced weight, resulting in an engine with the potential to achieve a PWR much higher than attained by comparable prior art engines of the same size and speed.

BRIEF DESCRIPTION OF THE DRAWINGS

The below-described drawings are meant to illustrate principles and examples discussed in the following detailed description. They are not necessarily to scale.

FIG. 2A shows the pistons at inner or top dead center. FIG. 2B shows the pistons at outer or bottom dead center.

FIGS. 11A-11D illustrate the structure of a cylinder useable in a second embodiment of an opposed-piston internal combustion engine.

FIGS. 13A-13E illustrate the structure of a piston useable in the second embodiment engine.

FIG. 14B is a partially sectional side view of the second embodiment engine. showing a cylinder with opposed pistons in which the pistons are coupled by primarily tensile-loaded connecting rods to two crankshafts, with the view partially cut away to show an alternate piston cooling structure.

FIGS. 15A-15E are perspective views of a multiple-cylinder implementation of the second embodiment engine showing assembly details at various stages of assembly.

DETAILED DESCRIPTION

A First Engine Embodiment

Figure 2A:
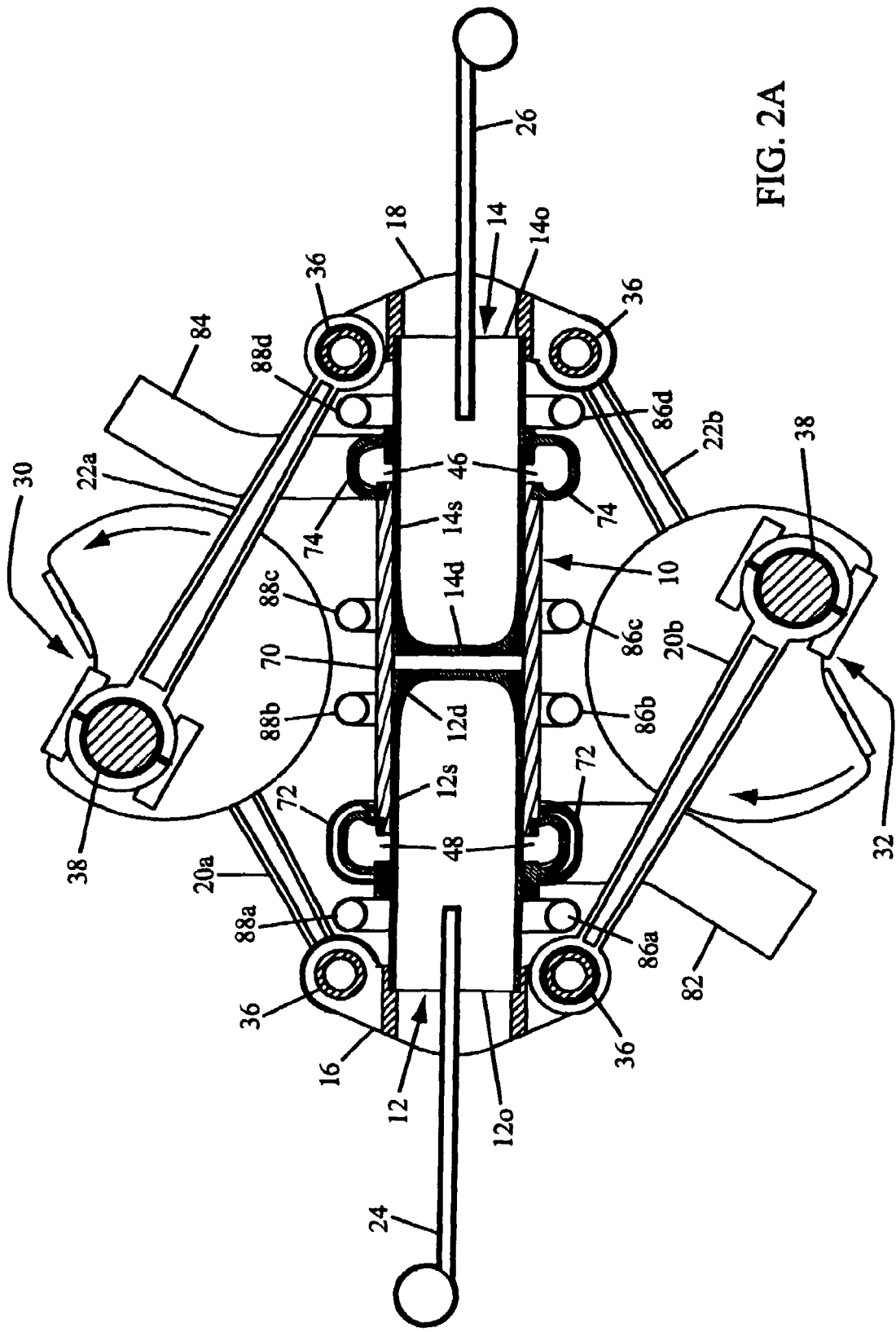
FIGS. 2A and 2B are side sectional views of a cylinder with opposed pistons coupled by tensile-loaded connecting rods to two crankshafts in a first embodiment of an opposed-piston internal combustion engine.
Figure 2B:
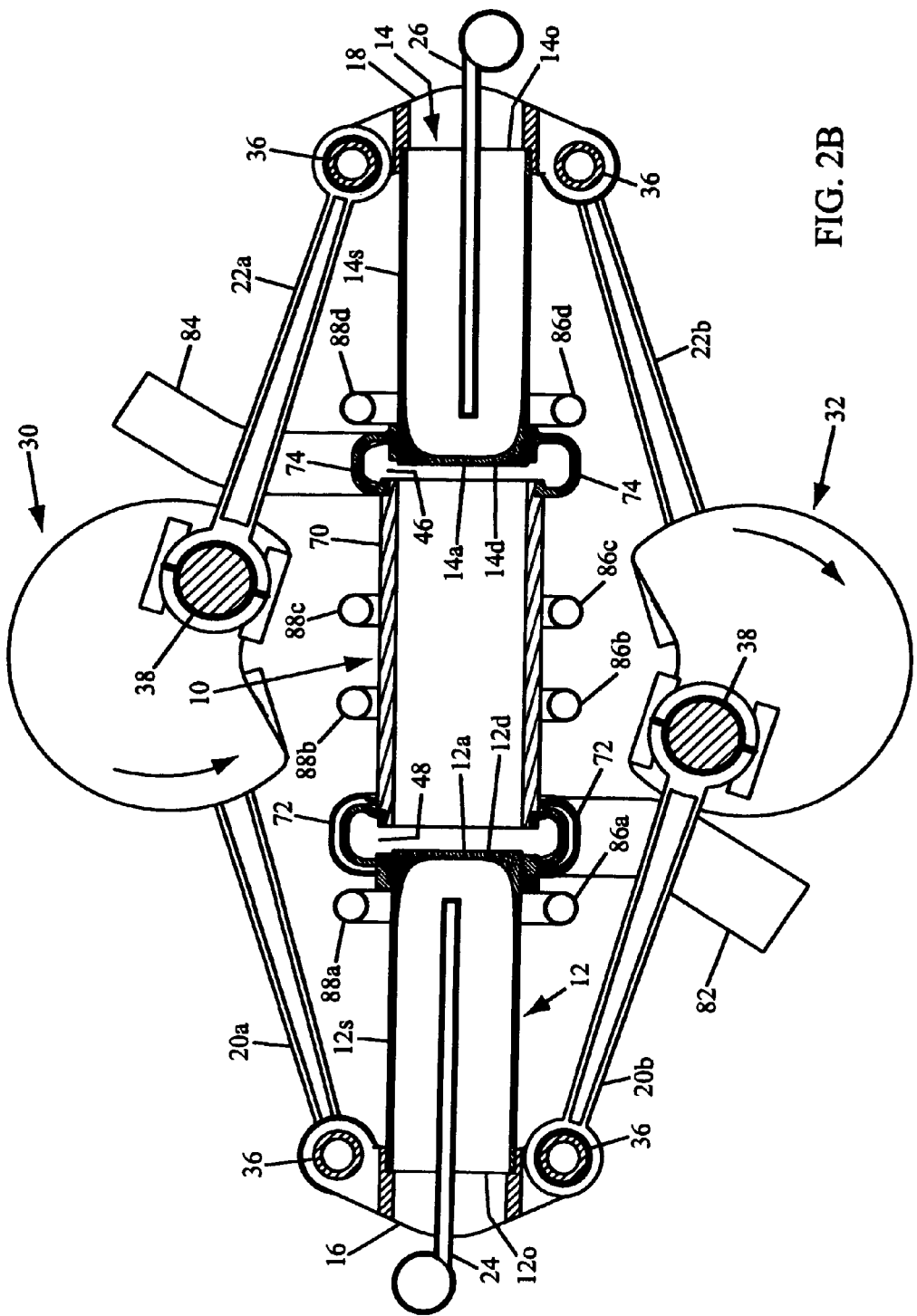

Components of a first embodiment of an opposed piston engine are illustrated in FIGS. 2A and 2B. These figures show a cylinder 10 with opposed pistons 12 and 14 disposed therein. The pistons 12 and 14 move coaxially in the cylinder 10 in opposed motions, toward and away from each other.

FIG. 2A illustrates the pistons 12 and 14 at top (or inner) dead center where they are at the peak of their compression strokes, near the moment of ignition. FIG. 2B illustrates the pistons near bottom (or outer) dead center, where they are at the end of their expansion or power strokes. These and intermediate positions will be described in more detail below.

The following explanation presumes a compression-ignition engine for the sake of illustration and example only. Those skilled in the art will realize that the elements, modules and assemblies described may also be adapted for a spark-ignition engine.

As shown in FIGS. 2A and 2B, the cylinder 10 is a tube with the opposed pistons 12 and 14 disposed in it for reciprocating opposed motion toward and away from each other and the center of the cylinder 10. The pistons 12 and 14 are coupled to first and second side-mounted counter-rotating crankshafts 30 and 32 which, in turn, are coupled to a common output (not shown in these figures).

The pistons 12 and 14 are hollow cylindrical members with closed axial ends 12a and 14a which terminate in crowns 12d and 14d, open axial ends 12o and 14o, and skirts 12s and 14s which extend from the open axial ends 12o and 14o to the crowns 12d and 14d. Saddles 16 and 18, in the form of open annular structures, are mounted to the open axial ends 12o and 14o of the pistons 12 and 14, respectively. Each of the saddles 16, 18 connects ends of a plurality of connecting rods to the respective piston on which it is mounted. The perspective of these figures illustrates only two connecting rods for each piston, and it is to be understood that one or more additional connecting rods are not visible. The connecting rods 20a and 20b are connected to the saddle 16 near the open end of the piston 12, while the connecting rods 22a and 22b are connected to the saddle 18 near the open end of the piston 14. Because the saddles 16 and 18 provide linkage between the pistons 12 and 14 and their respective rods, the pistons lack internal wristpins. The resulting open structure of the saddles and the pistons permits coolant dispensers 24 and 26 to extend axially into the pistons 12 and 14 from the open ends 12o and 14o to be aimed at the crowns and internal skirts of the pistons 12 and 14, respectively.

The two side-mounted crankshafts 30 and 32 are disposed with their axes parallel to each other and lying in a common plane that intersects the cylinder 10 at or near its longitudinal center and that is perpendicular to the axis of the cylinder. The crankshafts rotate in opposite directions. The connecting rods 20a, 20b and 22a, 22b are connected to crank throws on the crankshafts 30 and 32. Each connecting rod is disposed to form an acute angle with respect to the axes (and the sides) of the cylinder 10 and the pistons 12 and 14. The connecting rods are linked to the saddles 16 and 18 by means of needle bearings 36, and to the crank throws by means of roller bearings 38. As each piston moves through the operational cycle of the engine, the ends of the connecting rods coupled to the piston's saddle oscillate through an angular path, and there is no complete revolution between those ends and the elements of the saddle to which they are coupled. Needle bearings with sufficiently small diameter rollers produce at least full rotation of the rollers during each oscillation, thereby reducing wear asymmetry and extending bearing life.

The geometric relationship between the connecting rods, saddles, and crankshafts in FIGS. 2A and 2B keeps the connecting rods principally under tensile stress as the pistons 12 and 14 move in the cylinder 10, with a limited level of compressive stress resulting from inertial forces of the pistons at high engine speeds. This geometry reduces or substantially eliminates side forces between the pistons and the bore of the cylinder.

In FIGS. 2A and 2B, additional details and features of the cylinder 10 and the pistons 12 and 14 are shown. The cylinder 10 includes an inlet port 46 through which air, under pressure, flows into the cylinder 10. The cylinder also has an exhaust port 48 through which the products of combustion flow out of the cylinder 10. Because of their locations with respect to these ports, the pistons 12 and 14 may be respectively referred to as the "exhaust" and "inlet" pistons, and the ends of the cylinder 10 may be similarly named. A preferred, but by no means the only possible, configuration for the ports 46 and 48 are described below. The operations of the exhaust and inlet ports are modulated by movement of the pistons during engine operation. At least one injection site (not shown in this drawing) controlled by one or more fuel injectors (described below) admits fuel into the cylinder 10.

As the following illustrations and description will establish, the relation between piston length, the length of the cylinder, and the length added to the cylinder bore by the cylinder manifolds, coupled with a phase difference between the pistons as they traverse their bottom dead center positions, modulate port operations and sequence them correctly with piston events. In this regard, the inlet and exhaust ports 46 and 48 are displaced axially from the longitudinal center of the cylinder, near its ends. The pistons may be of equal length. Each piston 12 and 14 keeps the associated port 46 or 48 of the cylinder 10 closed until it approaches its bottom dead center position. The phase offset between the bottom dead center positions produces a sequence in which the exhaust port opens when the exhaust piston moves near its bottom dead center position, then the inlet port opens when the inlet piston moves near its bottom dead center position, following which the exhaust port closes after the exhaust piston moves away from its bottom dead center position, and then the inlet port closes after the inlet piston moves away from its bottom dead center position.

Figure 3A:
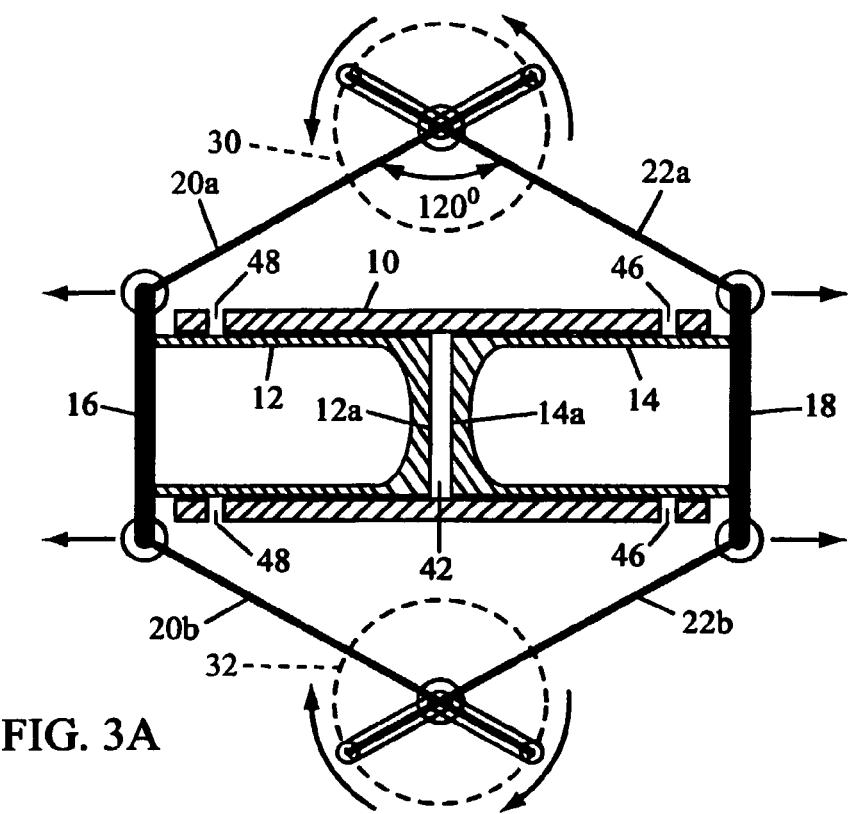
FIGS. 3A-3F are schematic sectional illustrations of the cylinder and pistons of FIGS. 2A and 2B illustrating a complete cycle of the pistons.

FIGS. 3A-3F are schematic representations of the cylinder 10 and pistons 12 and 14 of FIGS. 2A and 2B illustrating a representative cycle of operation ("operational cycle"). In this example, with the pistons at top dead center, the opposing rods on each side of the cylinder form an angle of approximately 120° as shown in FIG. 3A. This geometry is merely for the purpose of explaining an operational cycle; it is not meant to exclude other possible geometries with other operating cycles. For convenience, an operational cycle may be measured rotationally, starting at a crank angle of 0° where the pistons are at top dead center as shown in FIG. 3A and ending at 360°. With reference to FIG. 3A, the term "top dead center" is used to refer to the point at which the closed ends 12a and 14a of the pistons 12 and 14 are closest to each other and to the crankshafts and air is most highly compressed in the cylinder space 42 between the ends. This is the top of the compression stroke of both pistons. Using a convenient measurement, top dead center occurs at 0° of the cycle of operation. Further, with reference to FIGS. 3C and 3E, the term "bottom dead center" refers to the points at which the closed ends 12a and 14a of the pistons 12 and 14 are farthest from the crankshafts 30 and 32. Bottom dead center for the piston 12 occurs just before 180° of the cycle of operation. Bottom dead center for the piston 14 occurs just after 180° of the cycle of operation.

A two-stroke, compression-ignition operational cycle is now explained with reference to FIGS. 3A-3F. This explanation is meant to be illustrative, and uses 360° to measure a full cycle. The events and actions of the cycle are referenced to specific points in the 360° cycle with the understanding that for different geometries, while the sequence of events and actions will be the same, the points at which they occur in the 360° cycle will differ from those in this explanation.

Figure 3B:
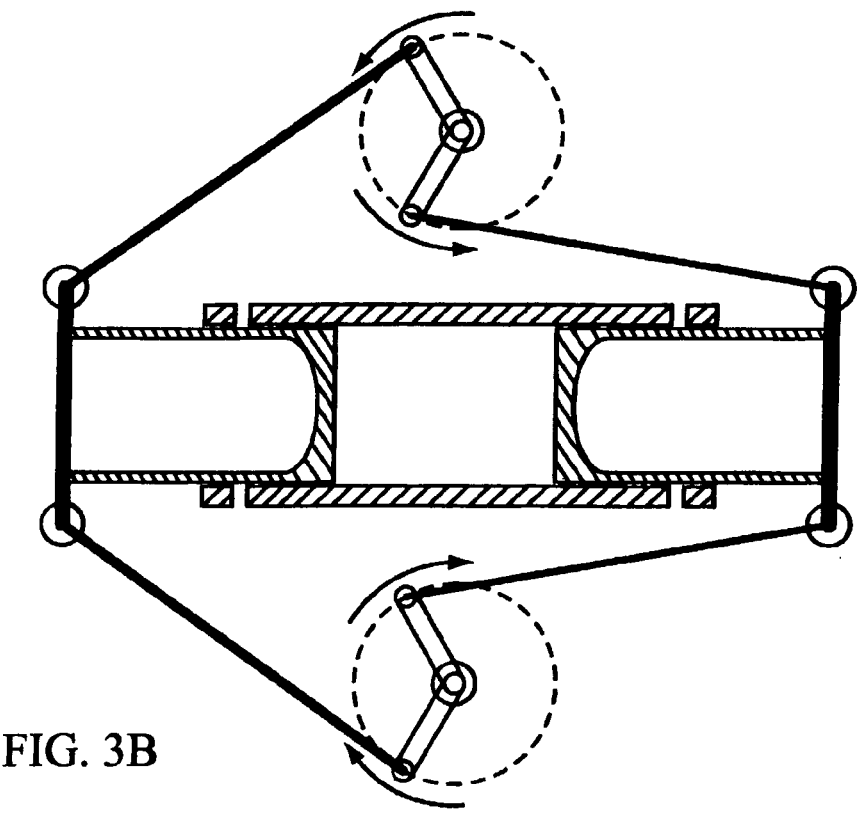
Figure 3C:
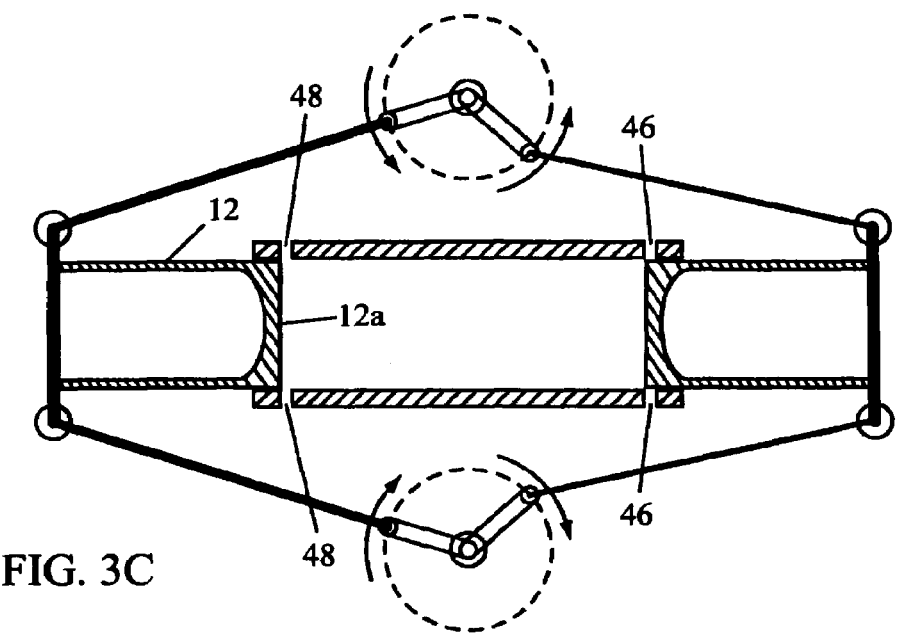
Figure 3D:
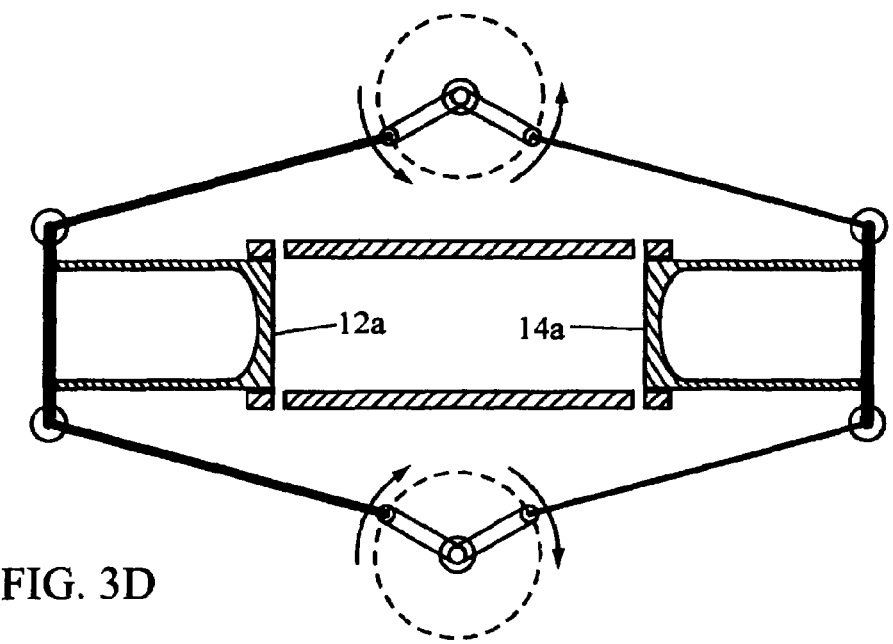
Figure 3E:
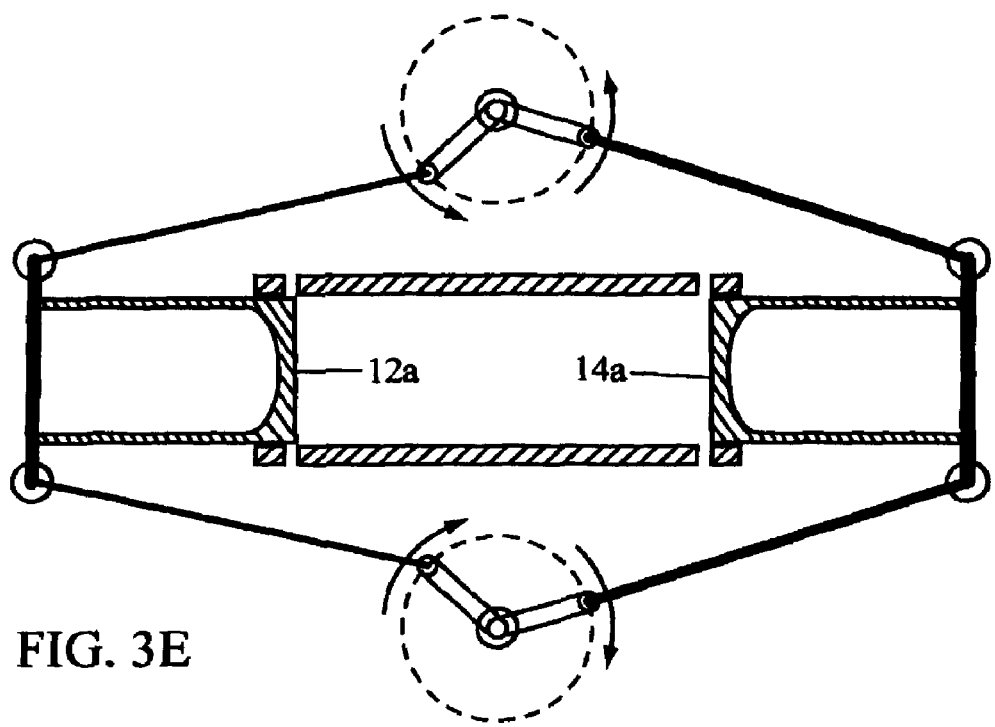
Figure 3F:
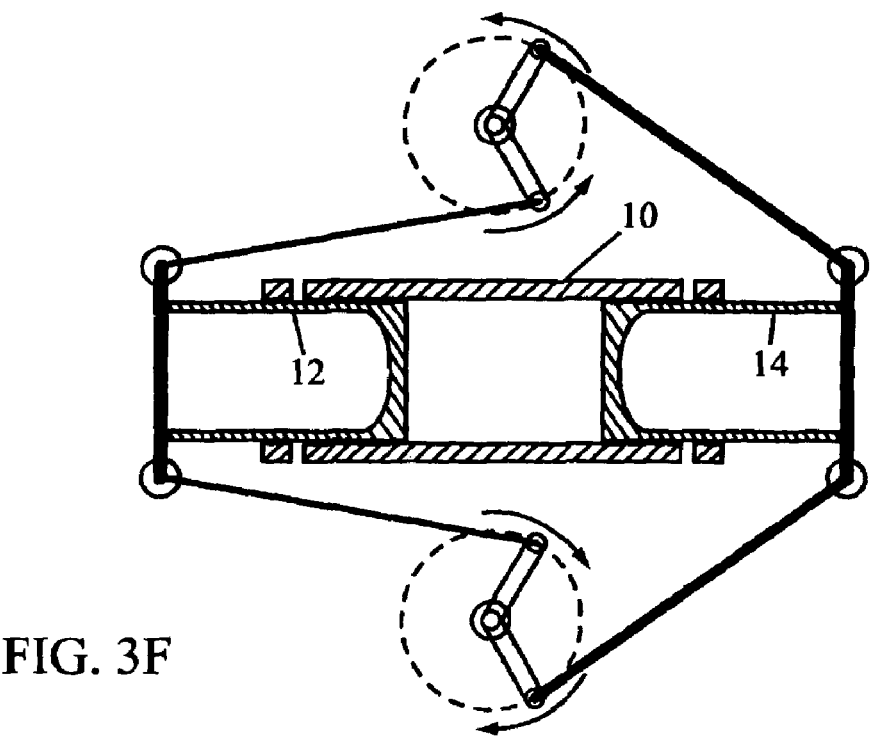

Referring now to FIG. 3A, prior to the 0° reference point in the operational cycle where the pistons 12 and 14 will be at top dead center, fuel is initially injected into the cylinder through the at least one injection site. Fuel may continue to be injected after combustion commences. The fuel mixes with compressed air and the mixture ignites between the closed ends 12a and 14a, driving the pistons apart in a power stroke, to drive the crankshafts 30 and 32 to rotate in opposite directions. The pistons 12 and 14 keep the inlet and exhaust ports 46 and 48 closed during the power stroke, blocking air from entering the inlet port and exhaust from leaving the exhaust port. In FIG. 3B, at 90° in the operational cycle, the pistons 12 and 14, near midway through their power strokes, continue to travel out of the cylinder 10. The inlet and exhaust ports 46 and 48 are still closed. In FIG. 3C, at 167° in the operational cycle, the closed end 12a of the piston 12 has moved far enough out of the cylinder 10 to open the exhaust port 48, while the inlet port 46 is still closed. The products of combustion now begin to flow out of the exhaust port 48. This portion of the cycle is referred to as blow-down. In FIG. 3D, at 180° in the operational cycle, the inlet and exhaust ports 46 and 48 are open and pressurized air flows into the cylinder 10 through the inlet port 46, while exhaust produced by combustion flows out of the exhaust port 48. Scavenging now occurs as residual combustion gasses are displaced with pressurized air. In FIG. 3E, at 193° the exhaust port 48 is closed by the piston 12, while the inlet port 46 is still open due to the phase offset described above and explained in more detail below. Charge air continues to be forced into the cylinder 10 through the inlet port 46 until that port is closed, after which the compression stroke begins. At 270° in the operational cycle, shown in FIG. 3F, the pistons 12 and 14 are near halfway through their compression stroke, and both the inlet and exhaust ports 46 and 48 are closed. The pistons 12 and 14 then again move toward their top dead center positions, and the cycle is continually repeated so long as the engine operates.

Figure 1:
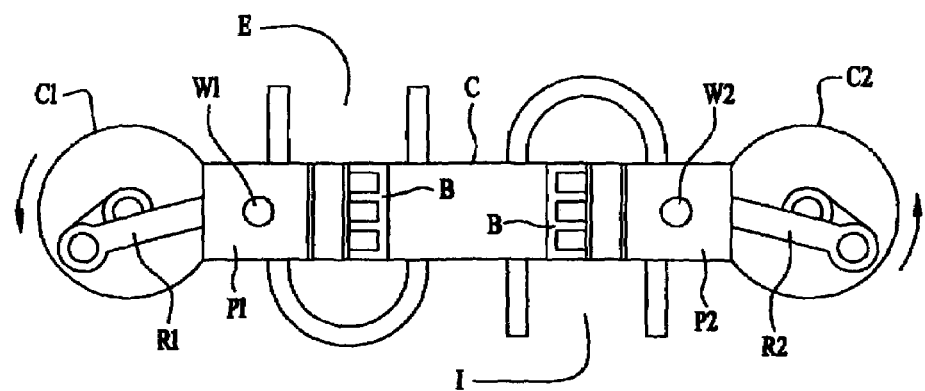
FIG. 1 is a partially schematic illustration of a portion of a prior art opposed piston diesel engine.
Figure 4:
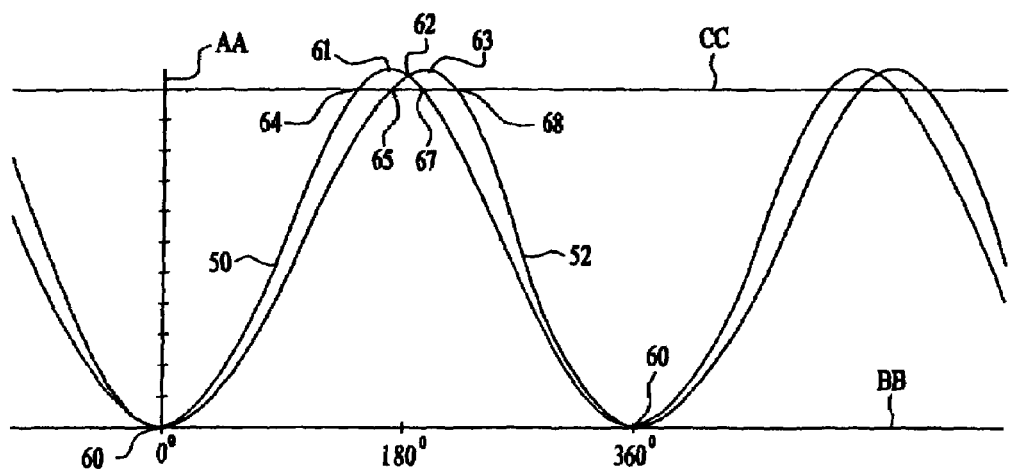
FIG. 4 is a plot showing relative phasing of the two opposed pistons of FIGS. 3A-3F.

FIG. 4 is a plot showing the phases of the pistons 12 and 14 during the representative operational cycle just described. Piston phase may be measured at either crankshaft referenced to the top dead center of each piston. In FIG. 4, the axis AA represents the distance of the crown of a piston from its top dead center position, and the axis BB represents phase. The position of the piston 12 is indicated by the line 50, while that of the piston 14 is indicated by the line 52. At top dead center 60, both of the pistons are in phase and the closed ends 12a and 14a are equally distant from the longitudinal center of the cylinder 10. As the operational cycle proceeds, the piston 12 increasingly leads in phase until it reaches its bottom dead center point 61, just before 180° in the operational cycle, indicated by 62. After the 180° point, the piston 14 passes through its bottom dead center point 63 and begins to catch up with the piston 12 until the two pistons are once again in phase at 360° in the cycle.

The oscillating phase offset between the pistons 12 and 14 illustrated in FIG. 4 enables the desired sequencing of the inlet and exhaust ports 46 and 48. In this regard, the line CC in FIG. 4 represents the position of the crown of a piston where the port controlled by the piston opens. Thus, when the closed end 12a of the piston 12 reaches the point represented by 64 on CC, the exhaust port only begins to open. When the closed end 14a of the piston 14 moves past the point represented by 65 on CC, both ports are open and scavenging takes place. At 67 on CC, the exhaust port closes and cylinder air charging occurs until the piston end 14a reaches the point represented by 68 on CC when both ports are closed and compression begins. This desirable result arises from the fact that the connecting rods for the respective pistons travel through different paths during crankshaft rotation; while one rod is going over the top of one crankshaft, the other is rotating under the bottom of the same crankshaft.

It should be noted with respect to FIG. 4 that the respective opening positions for the exhaust and inlet ports may not necessarily lie on the same line and that their relative opening and closing phases may differ from those shown.

Figure 5A:
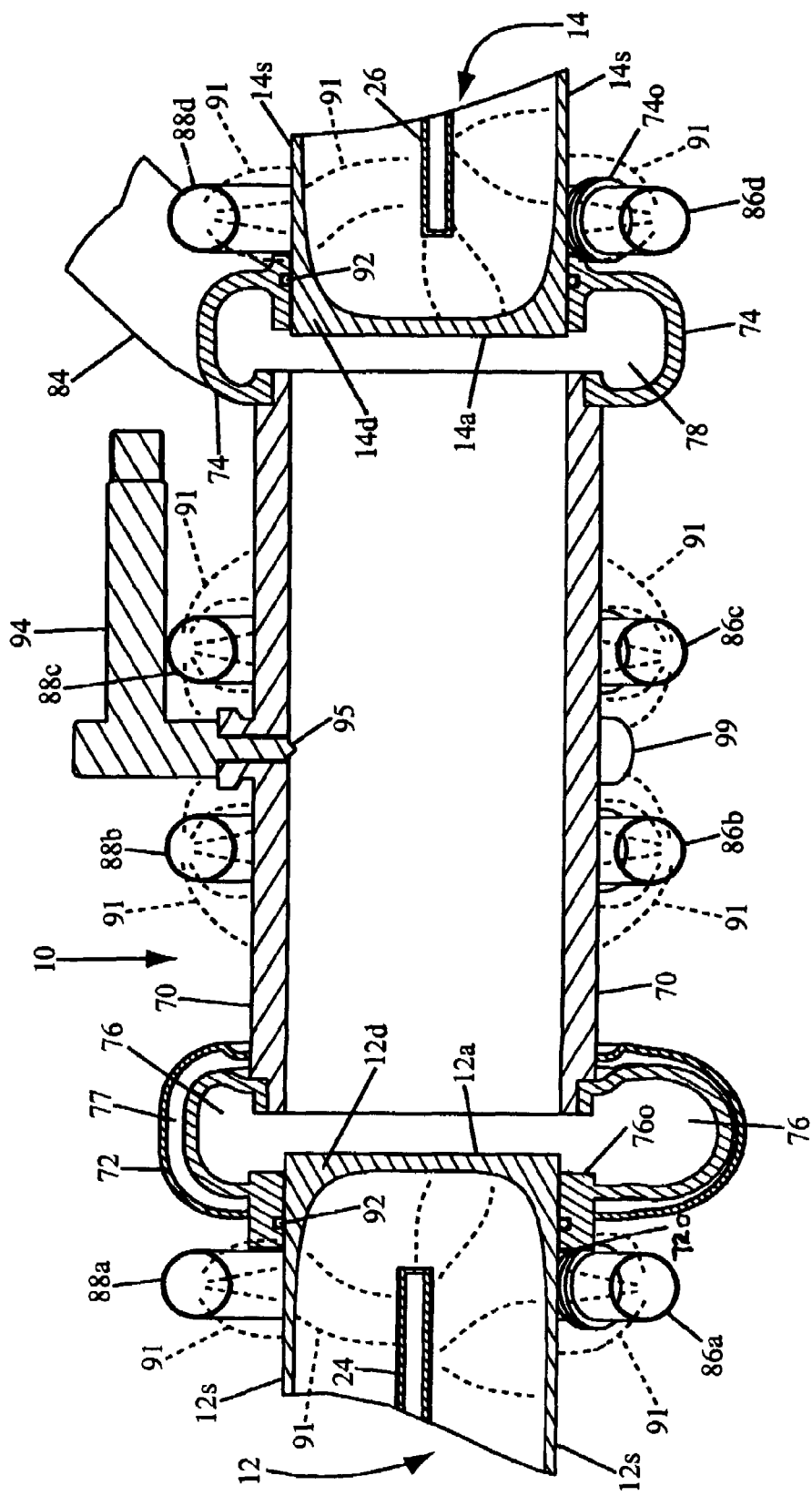
FIG. 5A is a side sectional view of the cylinder with opposed pistons of FIGS. 2A and 2B rotated 90° on its axis.

As seen in FIGS. 2A, 2B, and 5A, the cylinder 10 includes a cylinder tube 70 with opposing axial ends and annular exhaust and intake manifolds 72 and 74, each threaded, welded, or otherwise joined to a respective axial end of the cylinder tube 70. The manifolds 72 and 74 may be denominated the "cylinder exhaust manifold" and the "cylinder inlet manifold", respectively. The manifolds 72 and 74 have respective internal annular galleries 76 and 78 that constitute the exhaust and inlet ports, respectively. Preferably each of the galleries 76 and 78 has the shape of a scroll in order to induce swirling of gasses flowing therethrough, while inhibiting turbulent mixing. Swirling the pressurized air facilitates scavenging and enhances combustion efficiency. The cylinder manifold 72 also includes an annular passage 77 surrounding the annular gallery 76. The annular passage 77 may be connected to receive airflow, or alternatively it may contain stagnant air, to cool the periphery of the manifold 72. When the cylinder manifolds 72 and 74 are joined to the cylinder tube 70, their outer portions extend the bore of the tube. The bore may be precision machined to closely match the diameter of the pistons 12 and 14, and the pistons and cylinder may be fabricated from materials with compatible thermal expansion characteristics. If ringless pistons (pistons without rings) are used, there is no need for bridges spanning the ports, and a very close tolerance may be obtained between the outer diameters of the pistons and the inner diameter of the common bore. With ringless operation, for example, the spacing between each piston and the bore may be on the order of 0.002" to 0.003" (2 mils, or 50 microns, to 3 mils, or 75 microns). The absence of bridges also facilitates the formation of the intake manifold 74 into a swirl inducing shape such as a scroll. If, on the other hand, the pistons are provided with rings, it will be necessary to form the exhaust and inlet ports as annular passages with annular sequences of openings to the tube 70, thereby providing bridges to support the transit of the rings past the ports. Tubes 82 and 84 formed on the cylinder manifolds 72 and 74 open into the internal annular galleries 76 and 78, providing connection between the exhaust and inlet ports and respective exhaust and inlet manifolds.

FIG. 5A is an enlarged side sectional view of the cylinder 10 with opposed pistons 12 and 14 at their respective positions when the operational cycle is near its 180° point. As shown in these figures, the pistons 12 and 14 are provided without piston rings, although they may be provided with rings if dictated by design and operation. Piston rings are optional elements in this engine, for two reasons. First, piston rings accommodate radial distortion of pistons and cylinders in order to assist in controlling the cylinder/piston seal during engine operation. However, the cylinders illustrated and described in this specification are not cast in an engine block and are therefore not subject to non-uniform distortion from any thermal stress or any mechanical stress generated by other engine components, or asymmetrical cooling elements. As a result the cylinders and pistons may be machined with very tight tolerances for very close fitting, thereby confining combustion and limiting blow-by of combustion products along the interstice between each piston and the cylinder. Second, piston rings act to cool the piston during engine operation. However, while the engine operates, each piston may be cooled by application of liquid coolant because each piston is periodically substantially entirely withdrawn from (or protrudes from) the cylinder as it moves through its bottom dead center position so that liquid coolant can be applied to its external surface. See FIGS. 2B, 3C and 5A in this regard. As a piston moves out of and back into the cylinder, it is showered (by dispensers to be described) with a liquid coolant on the outer surface of its skirt. In addition, liquid coolant is applied (by a dispenser 24 or 26) to its inner surface along its skirt up to and including its crown.

Figure 6A:
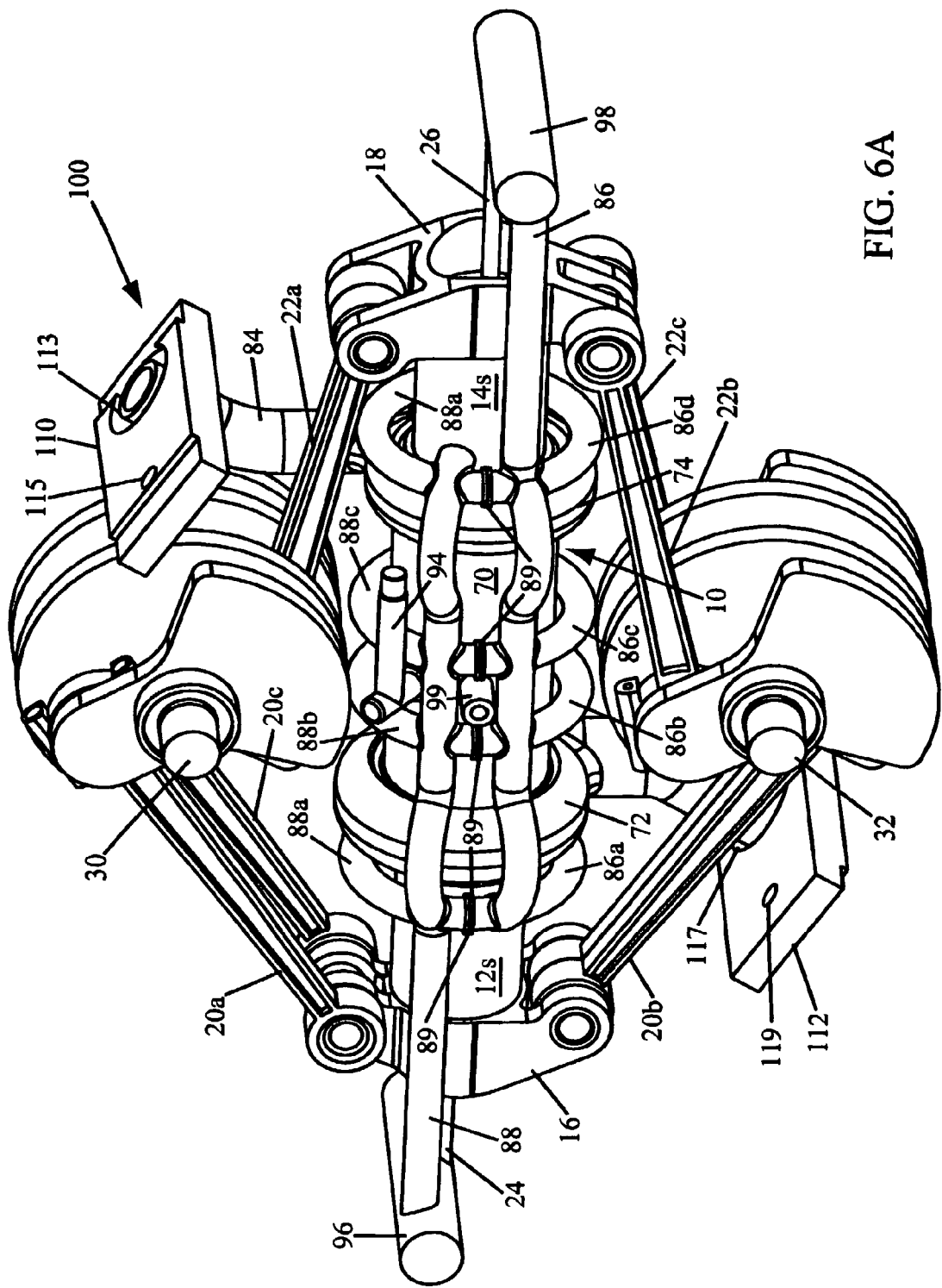
FIGS. 6A and 6B are side perspective views showing increasingly complete stages of assembly of a single cylinder mechanism for the first embodiment opposed-piston engine.

For example, in FIGS. 5A and 6A, each piston 12 and 14 is substantially withdrawn from the cylinder 10 near its bottom dead center position. Taking the piston 12 as representative, this means that, with the closed end 12a of the piston 12 near the outer edge of the annular gallery 76, the skirt 12s of the piston 12 is substantially entirely withdrawn from the cylinder 10 while only the portion of the piston crown 12d between the outside edge 76o of the gallery 76 and the outside edge 72o of the exhaust manifold 72 remains in the exhaust manifold 72 fitted on the end of the cylinder 10 as described below. It should be noted that each piston 12 and 14 subsequently moves back into the cylinder 10 to the extent that it is substantially enclosed by the cylinder 10 when it reaches its top dead center position.

Thus, at its bottom dead center position, substantially the entire skirt of each piston 12 and 14 protrudes from the cylinder 10 and is exposed for cooling. The detailed description of how that occurs in this illustrative example is not meant to limit the scope of this feature; what is required is that enough of the outside surface of the skirt of each of the pistons 12 and 14 be periodically outside of the cylinder 10 during engine operation to be sufficiently cooled by application of a coolant to the outside surfaces of the skirts outside of the cylinder. The percentage of the piston skirt that is exposed in a particular application may vary based on a number of factors including, for example, system coolant requirements, engine geometry, and designer preference.

As a piston moves in and out of a cylinder it is cooled by application of a liquid coolant (by dispensers to be described) to the outer surface of its skirt. In addition, liquid coolant is applied (by dispenser 24 or 26) to its inner surface along its skirt up to and including its crown. The same liquid coolant is preferably used to cool both the interior and the exterior of the pistons. With reference to FIGS. 5A and 6A, coolant dispensers, preferably made of steel tubing, dispense a liquid coolant onto the pistons 12 and 14 and the cylinder 10 during engine operation. An elongate dispenser manifold 86 extends at least generally axially along and against the cylinder tube and exhaust and inlet manifolds 72 and 74. Four axially spaced semicircular dispensers 86a, 86b, 86c, and 86d extend from the manifold tube halfway around the cylinder 10. The dispenser 86a is positioned outboard of the center of the exhaust manifold 72, near the outside edge 72o; the two dispensers 86b and 86c are located over the cylinder 10 between the manifolds 72 and 74, preferably near the axial center of the cylinder 10 in order to apply proportionately more liquid coolant to the hottest region of the cylinder than to other, cooler regions nearer the manifolds 72 and 74; and the dispenser 86d is located outboard of the center of the inlet manifold 74, near the outside edge 74o. A second dispenser manifold tube 88 extends at least generally axially along and against the cylinder tube and exhaust and inlet manifolds 72 and 74. Four axially spaced semicircular dispensers 88a, 88b, 88c, and 88d extend from the manifold tube 88 halfway around the cylinder 10. The dispenser 88a is positioned outboard of the center of the exhaust manifold 72, near the outside edge 72o; the two dispensers 88b and 88c are located over the cylinder between the manifolds 72 and 74, preferably near the axial center of the cylinder 10 in order to apply proportionately more liquid coolant to the hottest region of the cylinder than to other, cooler regions nearer the manifolds 72 and 74; and the dispenser 88d is located outboard of the center of the inlet manifold 74, near the outside edge 74o. Opposing dispensers are linked together as at 89 for structural integrity. Alternatively, the dispensers may be entirely circular and connected to a single manifold tube. Further, fewer or more dispensers may be provided and may be differently positioned than as shown. Still further, the dispensing branches could be replaced by a number of circumferentially spaced nozzles or sprayers supplied with liquid coolant from a common source.

The dispensers have substantial apertures formed thereinto from which a liquid coolant under pressure is applied to exposed outside surfaces of the skirts of the pistons 12 and 14 and the outside surface of the cylinder tube 70. Preferably, dispensers are positioned near the respective outside edges of the manifolds in order to ensure that liquid coolant is applied to substantially the entire outside surface of the skirt along the axial length of each piston. Depending on factors such as system coolant requirements, engine geometry and designer preference, the dispensers, nozzles, or other suitable coolant application elements may be repositioned in order to dispense or apply liquid coolant to smaller percentages of the outer radial peripheral surface areas of the skirts. For example, liquid coolant may be applied to the outside or external surface of the skirt along at least 25%, 50%, or 75% of the axial length of each piston.

In FIGS. 5A and 6A, the liquid coolant dispensers that apply liquid coolant to the outside surfaces of the pistons and cylinder are shown as being separate elements; however, one or more dispensers may also be integral with the cylinder manifolds 72 and 74 in addition to, or instead of, the separate elements shown in the figures.

Figure 5B:
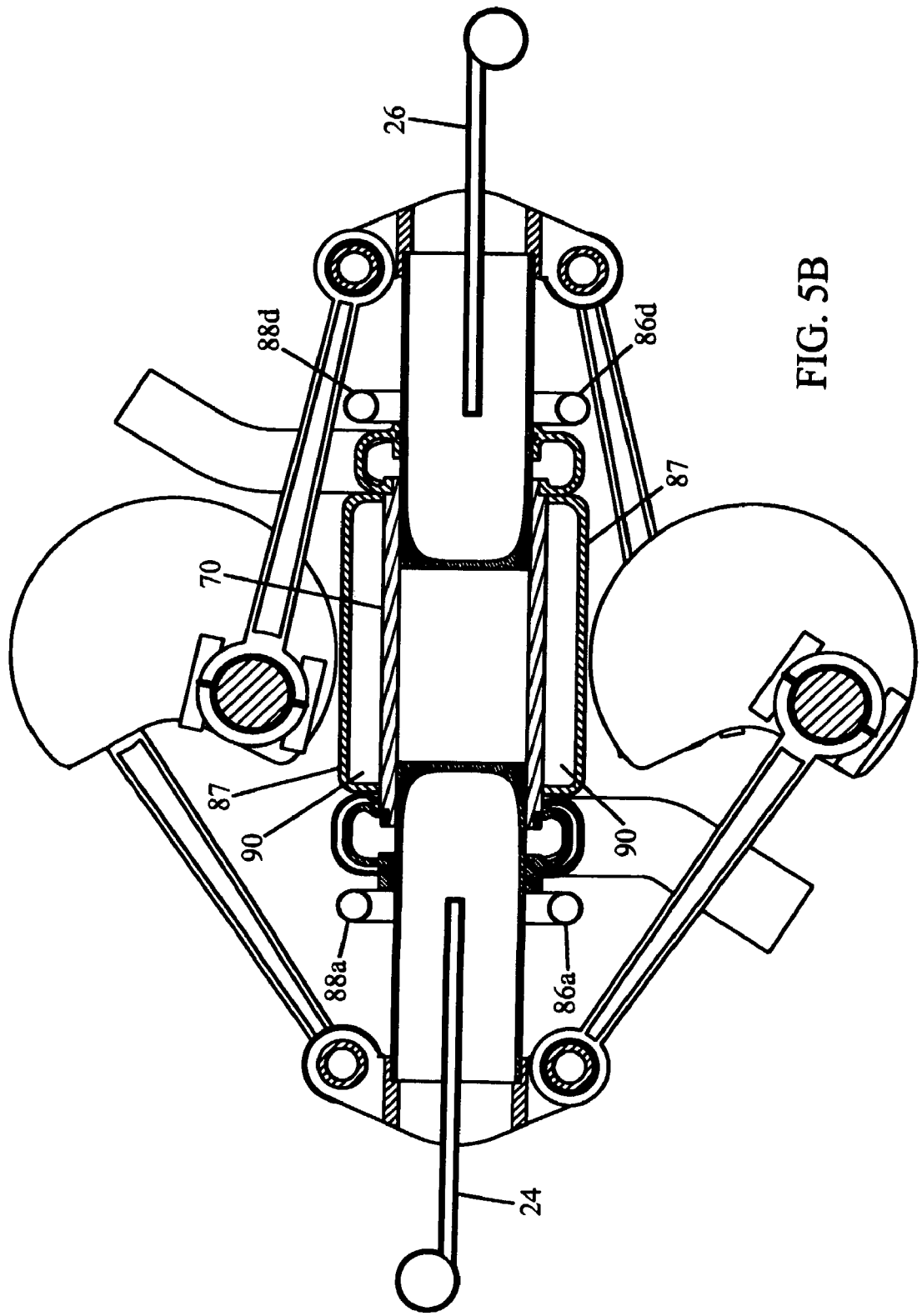
FIG. 5B is the same view of the cylinder in FIG. 5A showing an alternate embodiment for cooling the cylinder.

In an alternate embodiment shown in FIG. 5B, instead of cooling the cylinder tube 70 by way of dispensers, the cylinder tube may be disposed in a jacket 87 to provide a cooling passage 90 around the cylinder through which the coolant may be circulated. In this case, dispensers would still be used to cool the pistons.

The open structure of the saddles 16 and 18 and the absence of wristpins in the pistons permit improved direct application of liquid coolant to the internal surfaces of the pistons. In this regard, as shown in FIGS. 2A, 2B, and 5A, the pistons 12 and 14 are continuously cooled during engine operation by application of liquid coolant through dispensers 24 and 26 to their interior surfaces including their crowns along their skirts to their open axial ends. Each of the coolant dispensers 24, 26 may be constituted of one or a plurality of individual jets, in which each jet is for delivering a stream of coolant aimed at the crown of a piston.

In FIG. 5A, the flow of liquid coolant onto the pistons and the cylinder is indicated by reference numeral 91.

Continuing with the description of FIG. 5A, annular, high-temperature polymeric rings 92 located in annular grooves near the ends of the manifolds 72 and 74 lightly contact the pistons 12 and 14 and wipe excess lubricant from the pistons as they travel into the cylinder 10. Finally, one or more fuel injectors are provided for the cylinder. For example, the fuel injector 94 is coupled to the at least one injection site 95.

A two-stroke, opposed-piston engine mechanism is next described in which the working elements (cylinders, pistons, linkages, crankshafts, etc.) are received upon a structural unit in the form of a frame of passive structural elements fitted together to support the working elements. The frame is intended to bear the stresses and forces of engine operation, such as compressive forces between the crankshafts. In contrast with many prior art two-cycle, opposed-piston engines, the cylinders are not cast in a block nor are they formed with other passive structural elements. Consequently, the cylinders are not passive structural elements of the engine. Each cylinder is supported in the engine frame principally by the pair of pistons disposed in it. Thus, with the exception of combustion chamber forces, the cylinders are decoupled from the mechanical stresses induced by functional elements, and from the mechanical and thermal stresses of an engine block. Hence, the cylinders are essentially only pressure vessels. This engine construction eliminates non-uniform radial distortion of the pistons and cylinders, permits the cylinder-piston interface to be very close-fitting, and enables a close matching of the thermal characteristics of the materials from which the cylinders and pistons are made. Advantageously, with improved piston cooling, this characteristic affords the option of an engine design that dispenses with piston rings.

Figure 6B:
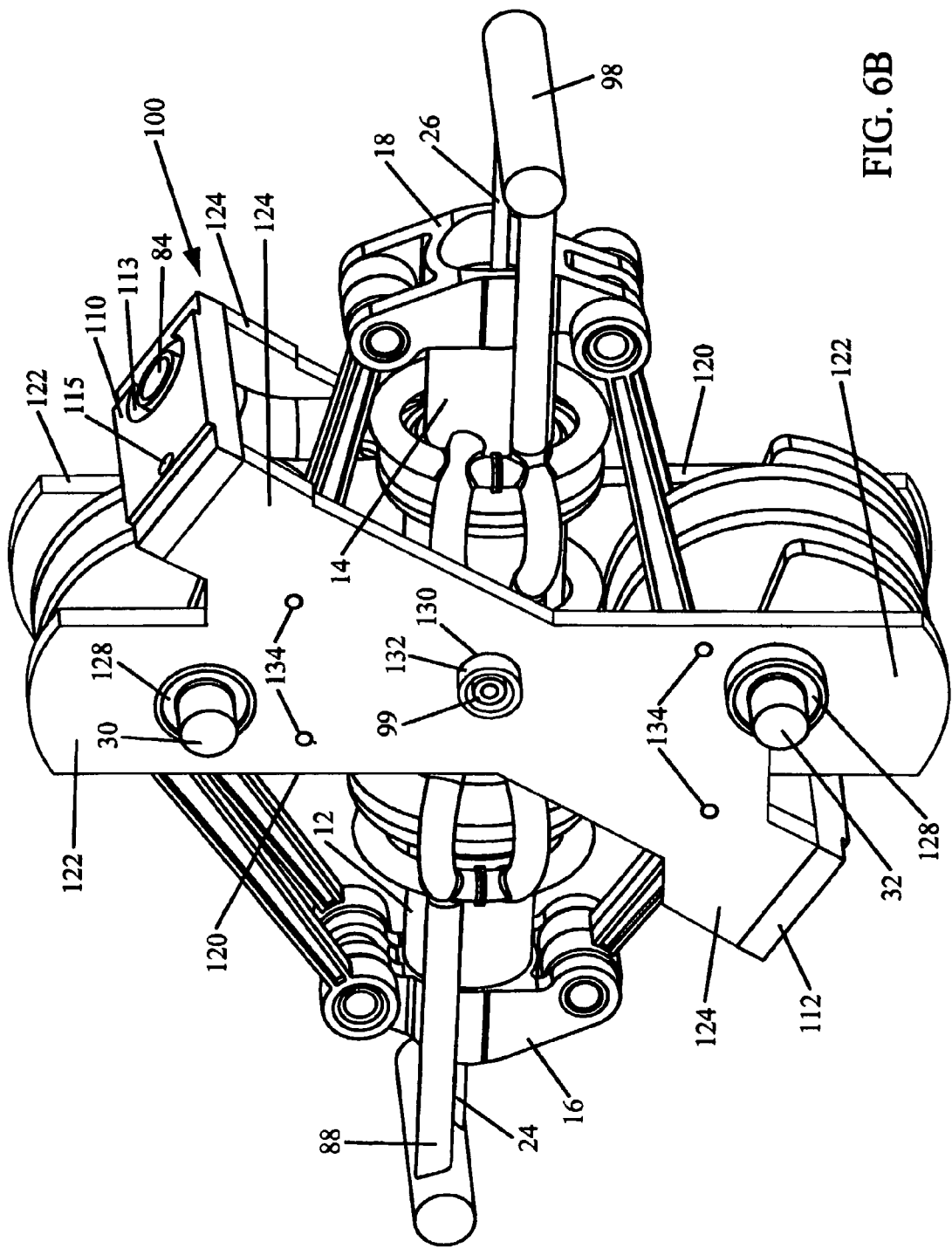
Figure 7A:
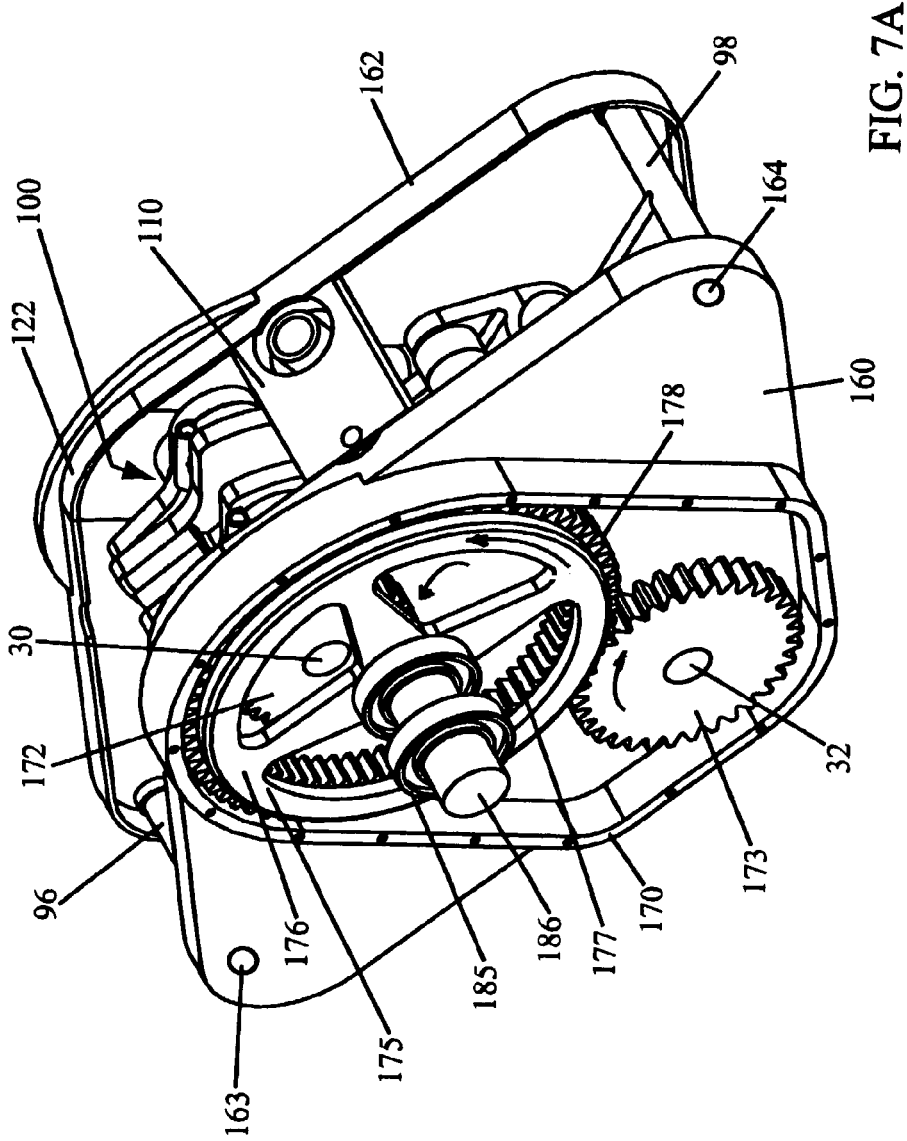
FIGS. 7A-7C are perspective views of a single-cylinder opposed-piston engine module for the first embodiment opposed piston engine showing assembly details at increasingly complete stages of assembly.
Figure 7B:
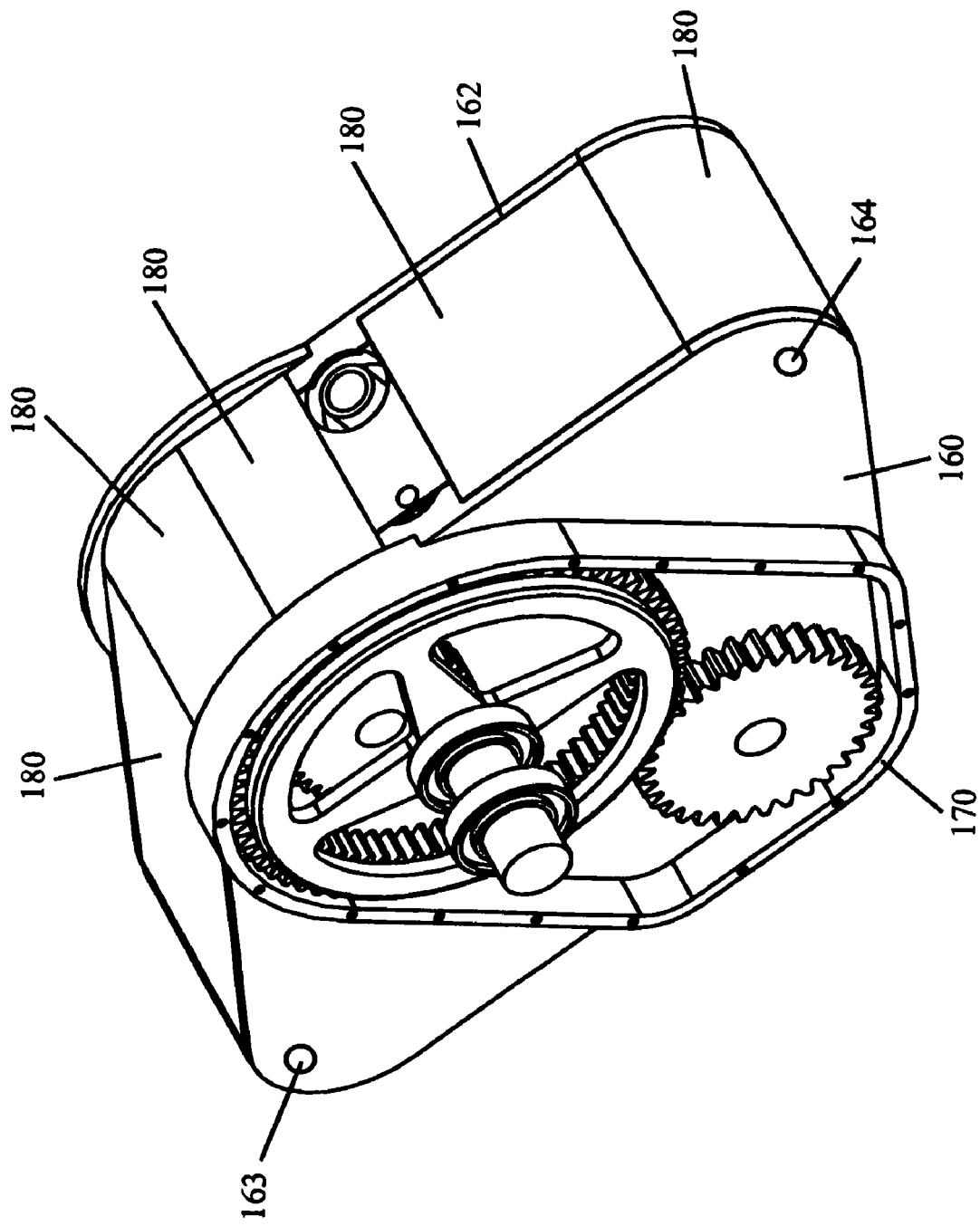
Figure 7C:
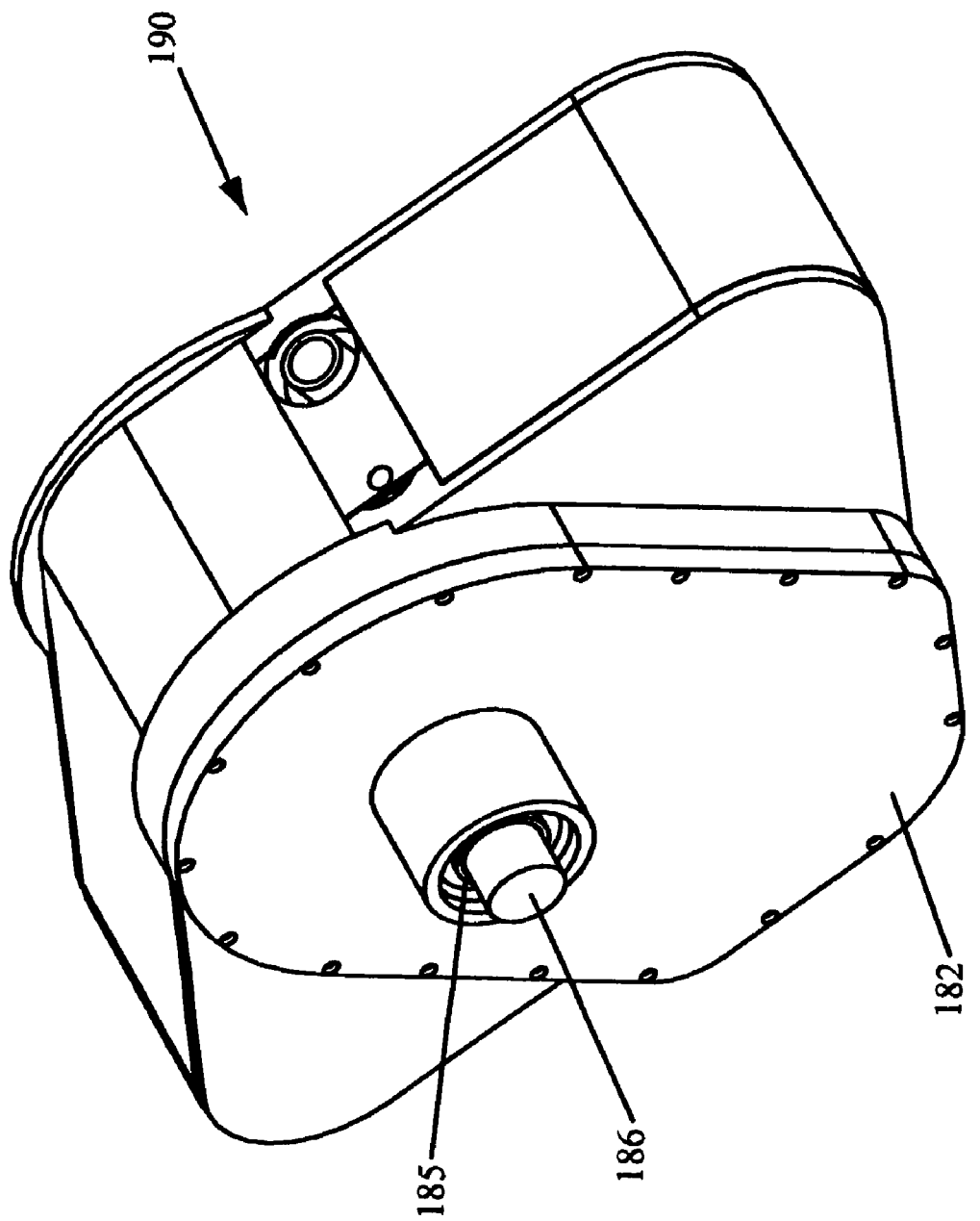
Figure 7D:
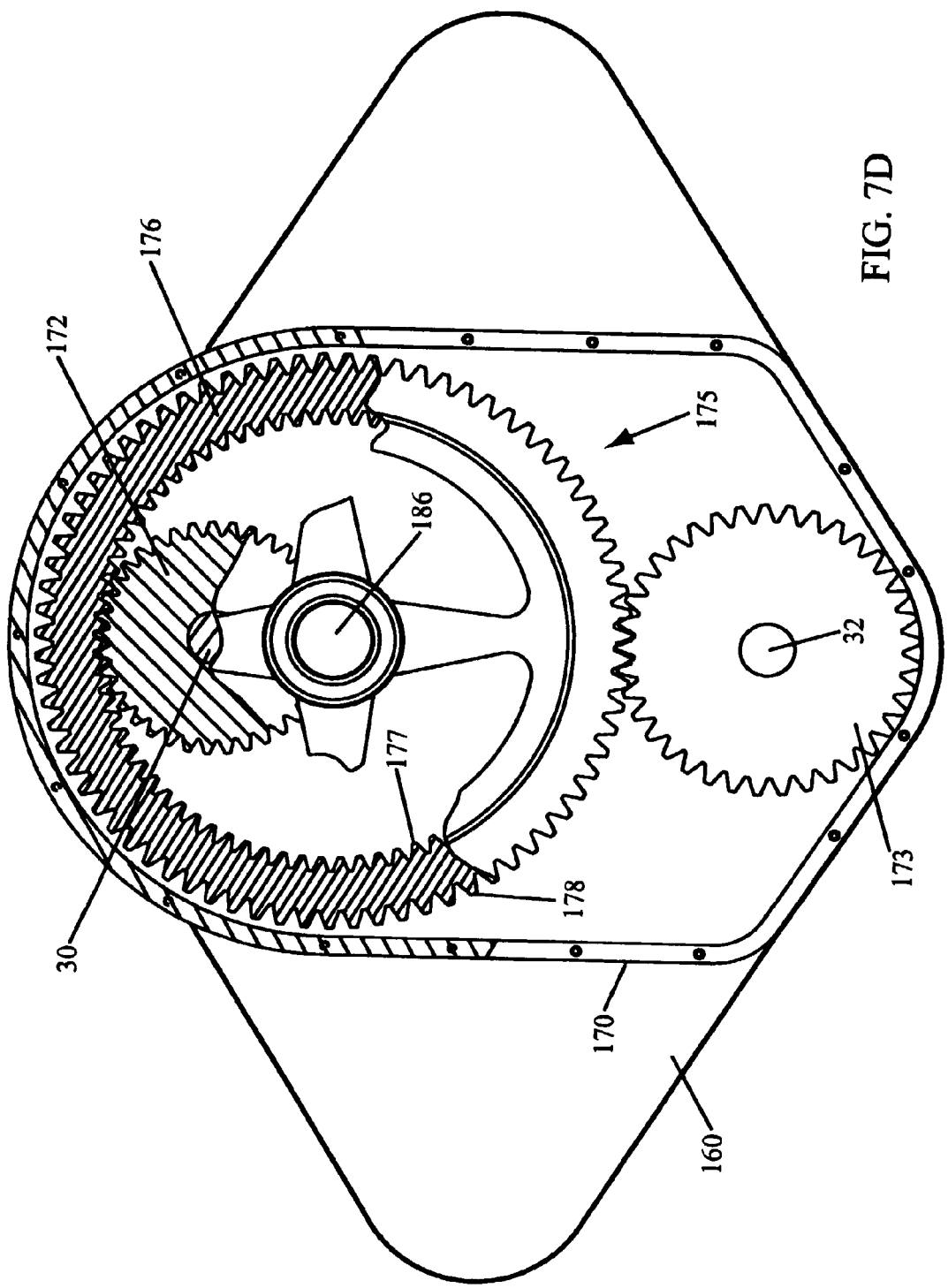
FIG. 7D is an end view of the single-cylinder opposed-piston engine module showing an open gearbox with one gear partially cut away.

FIGS. 6A and 6B are side perspective views showing increasingly complete assembly of a single-cylinder engine mechanism 100 for an opposed-piston engine with side-mounted crankshafts based on the cylinder/piston arrangement of the previous figures. The engine mechanism 100 can be scaled to engines of any size and engines having from one to multiple cylinders. In FIG. 6A, the mechanism 100 includes a single cylinder 10 having the construction illustrated in FIG. 5A, with opposed pistons 12 and 14 disposed in it. The saddles 16 and 18 of the opposed pistons are visible in the figure. The connecting rods 20a and 20c couple the saddle 16 to the crankshaft 30, and the connecting rod pair 20b couples the saddle 16 to the crankshaft 32. The connecting rod pair 22a couples the saddle 18 to the crankshaft 30, and the connecting rods 22b and 22c couple the saddle 18 to the crankshaft 32. The dispenser manifold tube 88 and the dispenser 24 are connected to coolant manifold 96. The manifold tube 86 and the dispenser 26 are connected to another coolant manifold 98. Two radially-opposed alignment pins (one of which is indicated by reference numeral 99) are formed on the cylinder 10 for cylinder stabilization during engine operation. Two beams 110 and 112 are shown in FIG. 6A for reference. The beam 110 has an opening 113 through which the manifold tube 84 can be connected to an air inlet manifold (not shown) and an opening 115 for a tube connecting the fuel injector 94 to a fuel manifold (not shown). The beam 112 has an opening 117 through which the manifold tube 82 can be connected to an exhaust manifold (not shown) and an opening 119 through which a tube can connect another fuel injector (not seen) to a fuel manifold (not shown).

In FIG. 6B, a frame for the engine mechanism 100 includes two support bulkheads 120 disposed on respective sides of the cylinder 10, together with the beams 110 and 112. The bulkheads 120 receive and support the crankshafts 30 and 32. Each bulkhead 120 includes an I-beam section 122 and a transverse section 124. The I-beam sections provide the principal support for the crankshafts during engine operation. The beams 110 and 112 are attached to the ends of the transverse sections 124. The crankshafts are supported for rotation in the I-beam sections 122 by bearings 128. Each bulkhead includes a central opening with a short elastomeric cylinder 132 that receives alignment pins 99 of adjacent cylinders. Threaded holes 134 are provided in each support bulkhead for attachment of additional components, for example, a gearbox.

Assembly of a single-cylinder opposed piston engine module from the engine mechanism 100 of FIGS. 6A and 6B is shown in FIGS. 7A-7D. In the single-cylinder engine module, light aluminum end plates 160 and 162 are attached to respective bulkheads 120 and to each of the beams 110 and 112. The end plate 160 has openings 163 and 164 to receive the liquid coolant manifolds 96 and 98 to feed lines (not shown). FIGS. 7A-7D show a gearbox 170 mounted on a bulkhead (not seen in these figures) through the outside surface of the end plate 160. The gearbox 170 houses an output gear train through which the opposing rotational motions of the crankshafts are coupled to an output drive shaft. The ends of the crankshafts 30 and 32 extend into the gearbox 170. A gear wheel 172 with a toothed outer rim is fixed to the end of the crankshaft 30 and a gear wheel 173 with a toothed outer rim is fixed to the end of the crankshaft 32. An output gear wheel 175 has an annulus 176 with a toothed inside circumference 177 and a toothed outside circumference 178. As seen in these figures, the outer rim of the gear wheel 172 engages the inside circumference 177 of the output gear wheel 175 at one location and the outer rim of the gear wheel 173 engages the outside circumference 178 of the output gear wheel 175 at another location diametrically opposite the one location. The gear ratio between the inner gear 172 and the inside circumference 177 may be 33/65 with MOD 4 teeth on the inner gear and the inside circumference, while the gear ratio between the outer gear 173 and the outside circumference 178 may be 33/65 with MOD 5 teeth on the outer gear and the outside circumference. This arrangement of gears permits the opposing rotations of the crankshafts 30 and 32 to be translated into the continuous rotation of the output gear wheel 175 with an odd number of gears (three, in this case), with a non-integral gear ratio, and without any intermediary belts, chains, or other torque transfer elements. The result is a simple, short output gear train.

Assembly of the single-cylinder opposed piston engine module is completed as shown in FIGS. 7A-7D by attachment of light aluminum casing panels 180 to the frame made up of the assembled bulkheads and beams. A cover 182 is fastened to the gearbox 170. The cover 182 includes an output bearing 185 that receives the axle 186 of the output gear wheel 175 thus enabling the frame to support the output gear 175 for rotation. The resulting assembled single-cylinder opposed-piston engine module is indicated by reference numeral 190 in FIG. 7C. The axle 186 constitutes the output drive of the engine module 190. It may be coupled to an intermediate transmission or directly to the driven component by one or more gears, belts, chains, cams or other suitable torque transfer element or system (not shown).

Figure 8A:
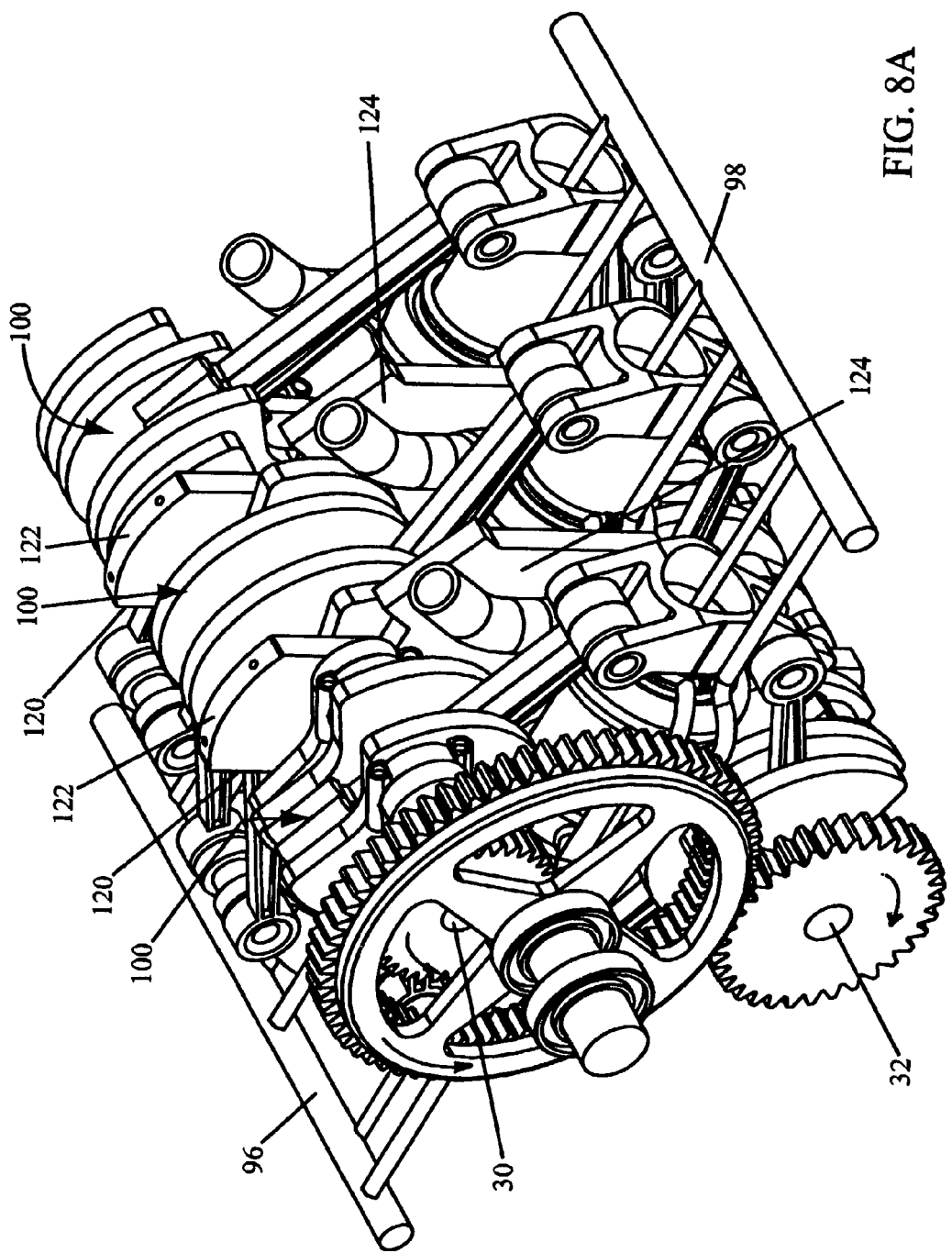
FIGS. 8A-8C are perspective views of a multiple-cylinder implementation of the first embodiment opposed-piston engine module showing assembly details at increasingly complete stages of assembly.
Figure 8B:
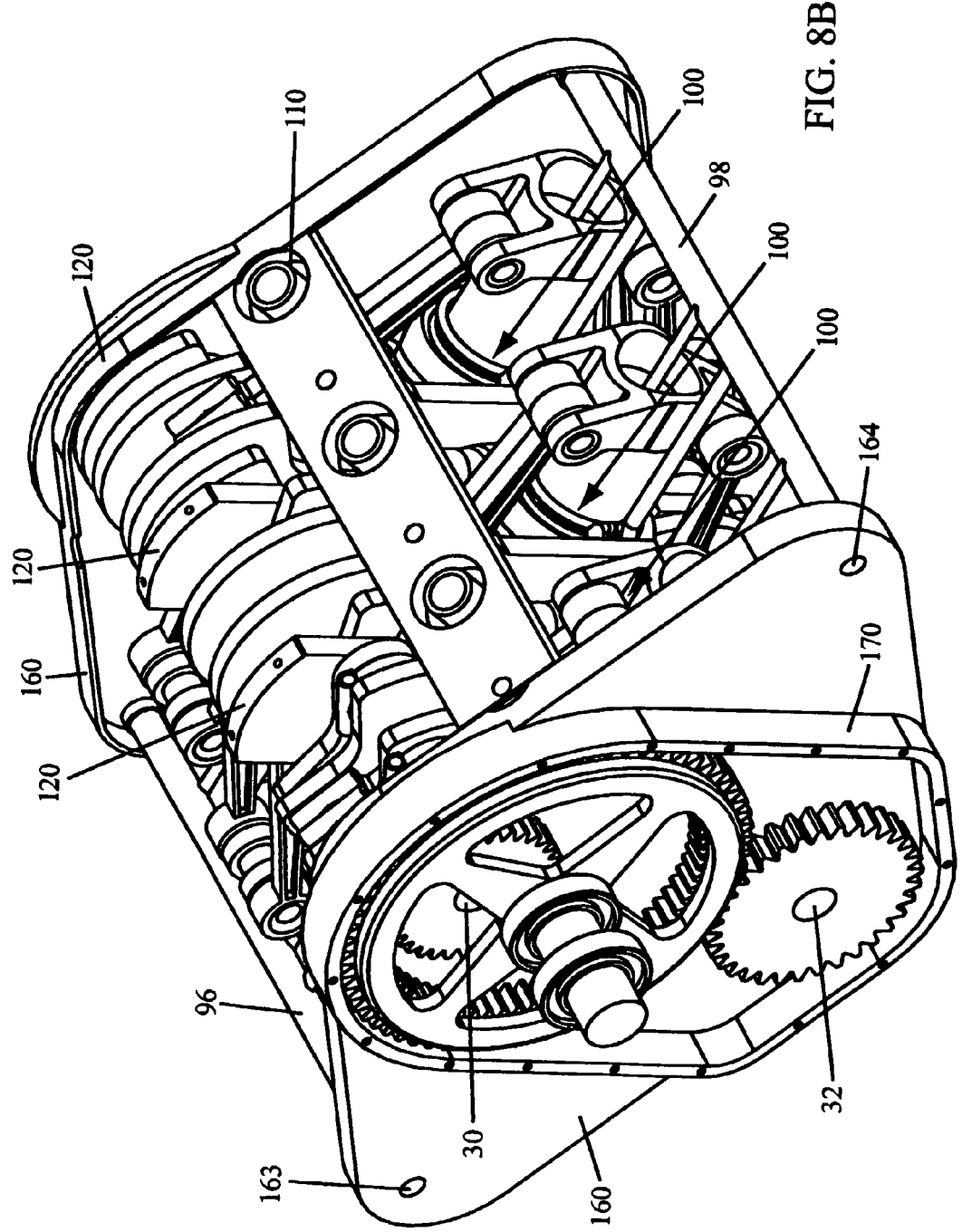
Figure 8C:
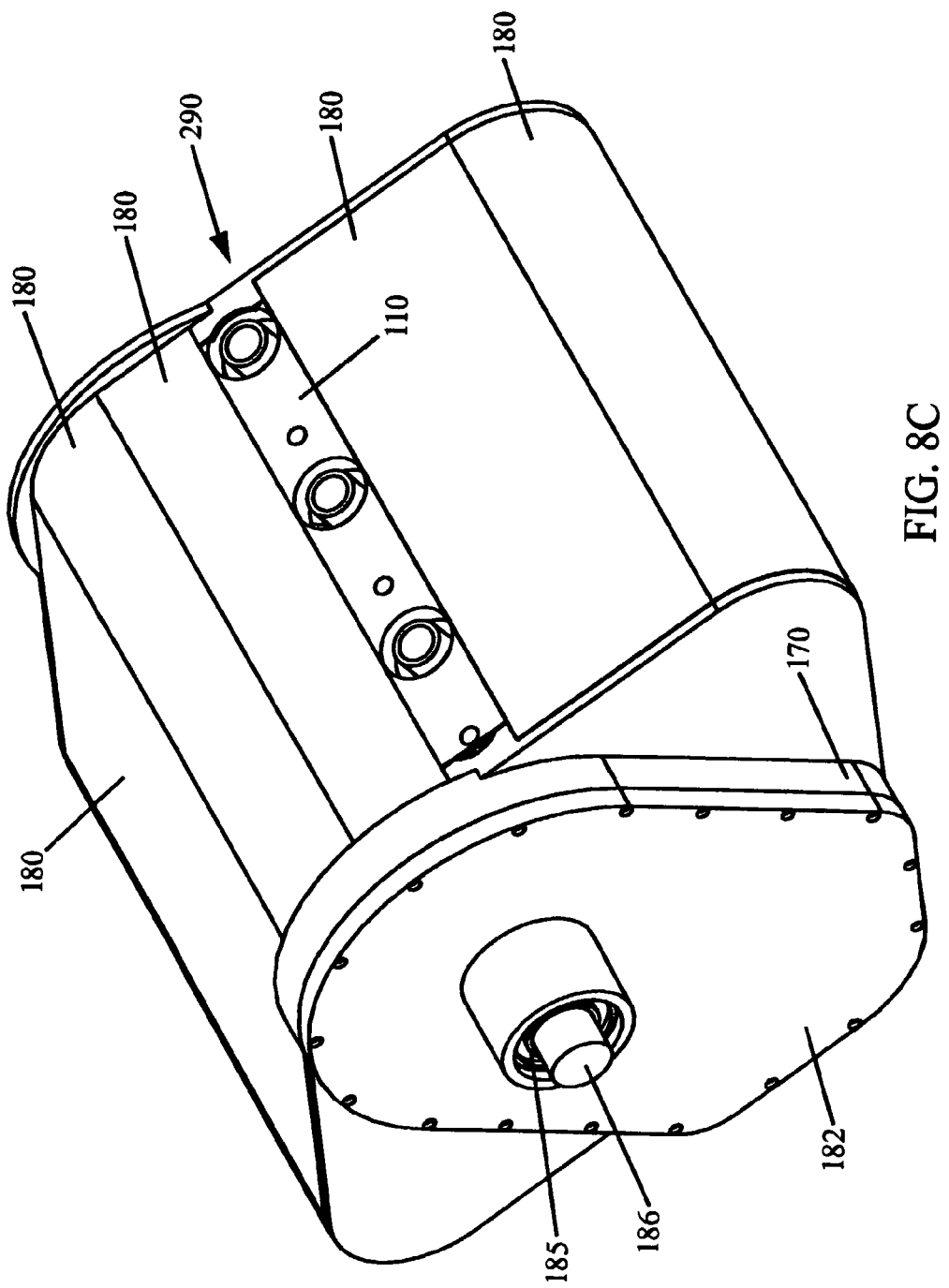

FIGS. 8A-8C illustrate assembly of a multi-cylinder, opposed-piston engine module with three engine mechanisms 100 disposed in a row. Note that the front and rear bulkheads are removed from FIG. 8A for clarity. The mechanisms 100 have the structure already illustrated in FIGS. 6A and 6B, and discussed in respect of the preceding figures. Four bulkheads 120 are provided in the frame of this engine module, each supporting the crankshafts in respective bearings. The frame also includes elongated beams 110 and 112 fixed to the transverse sections of the bulkheads 120. The end plates 160 and 162 close the ends of the engine module. The three-gear drive train is supported for rotation in the gearbox 170. The liquid coolant manifolds 96 and 98 are elongated to span the three engine mechanisms 100. Assembly of the multiple-cylinder opposed piston engine module is completed by attachment of light aluminum casing panels 180 to the frame. A cover 182 is fastened to the gearbox 170. The cover 182 includes an output bearing 185 that receives the axle 186 of the output gear wheel 175 thus enabling the frame to support the output gear wheel 175 for rotation. The resulting assembled multiple-cylinder opposed-piston engine module is indicated by reference numeral 290 in FIG. 8C. The axle 186 constitutes the output drive of the engine module 290.

Preferably, four identical connecting rods are provided for each piston. This mode of practice is best seen in FIG. 6A. In the view of FIG. 6A, on the exhaust port side of the cylinder 10, the two connecting rods 20a and 20c are spaced apart and each is connected at one end to the saddle 16 and at the opposite end to the crankshaft 30. The connecting rod pair 20b comprises two abutting rods, each identical in shape and structure to the rods 20a and 20c. The connecting rod pair 20b is connected at one end to the saddle 16, and at the other end to the crankshaft 32. On the input port side of the cylinder 10, the two connecting rods 22b and 22c are spaced apart and each is connected at one end to the saddle 18 and at the opposite end to the crankshaft 32 on either side of the connecting rod pair 20b. The connecting rod pair 22a comprises two abutting rods, each identical in shape and structure to the rods 22b and 22c. The connecting rod pair 22a is connected at one end to the saddle 18, and at the other end to the crankshaft 30, between the connecting rods 20a and 20c. Thus, on each of the crankshafts, the connecting rod pairs of the pistons on one end of the cylinders are interleaved with the two connecting rods of the pistons on the other end of the cylinders, as shown in FIG. 6A. This provides an optimum balance of forces on the pistons and also reduces the count of part types for the engine. The identical rods also assist in maintaining uniform thermal expansion of the rods during engine operation.

The connecting rods are made of forged steel or titanium, cylinders and pistons of aluminum-silicon alloy with chrome-plated cylinder bores, liquid coolant-conducting elements of steel tubing, and crankshafts of forged, machined steel. Engine frame parts may be made of lightweight alloys such as aluminum.

Figure 9A:
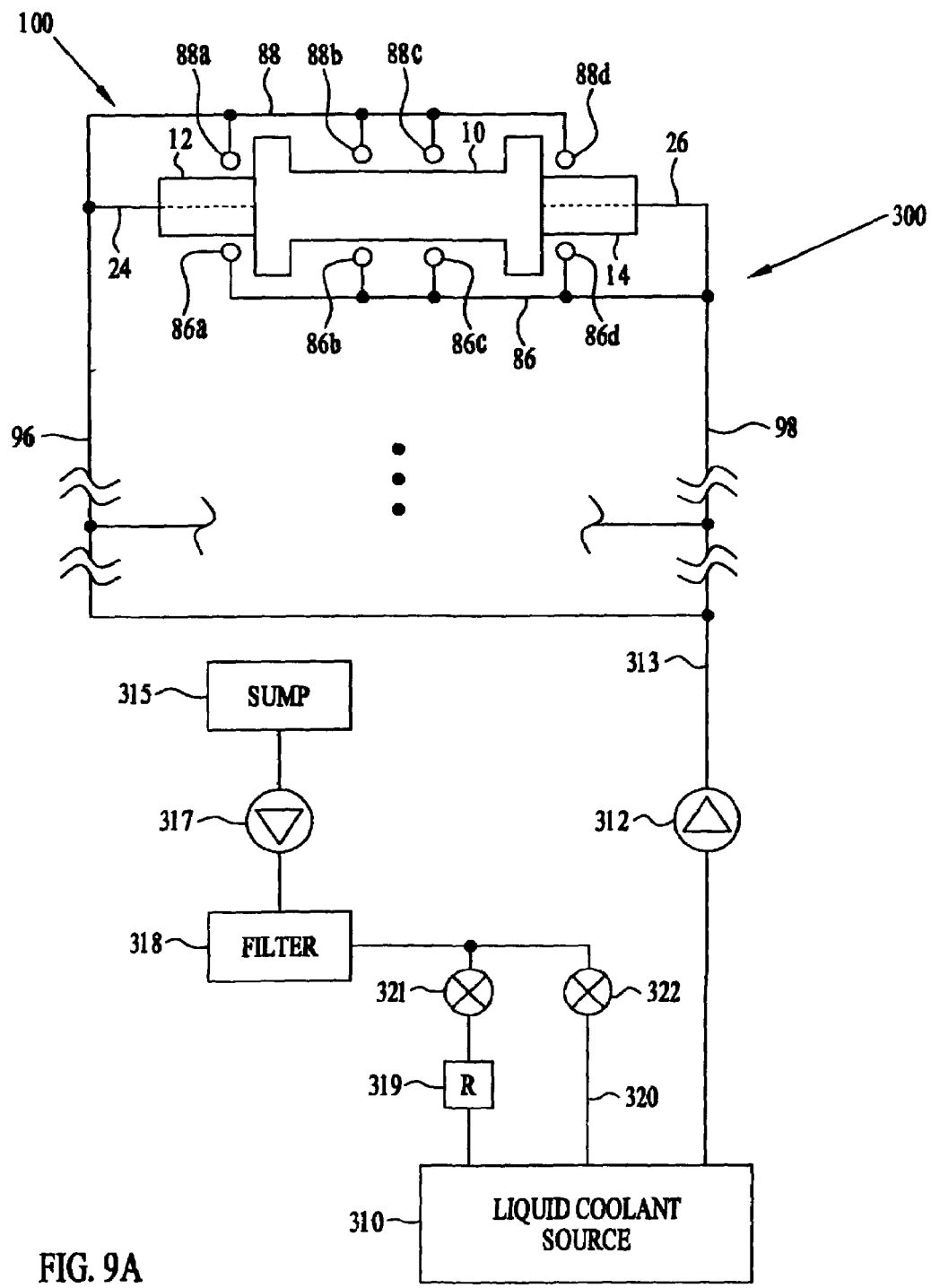
FIG. 9A is a schematic diagram of a supply system for an opposed-piston engine which provides liquid coolant to the engine.

A supply system 300 for supplying a liquid coolant to be dispensed on and in pistons and on cylinders in an opposed-piston engine of one or more cylinders is illustrated in FIG. 9A. The liquid coolant may be any liquid capable of being applied to the pistons and cooling them sufficiently for the desired application. Lubricating oil and diesel fuel are two possibilities. In this figure, a source of liquid coolant 310 is connected to a low-pressure, high-volume pump 312. The pump 312 may comprise, for example, a centrifugal pump providing liquid coolant in the range of 3 to 10 gal/min for a 100 HP engine. which pumps liquid coolant through a distribution line 313 to the manifolds 96 and 98. These manifolds supply a high volume of liquid coolant at low pressure to the dispensers 24 and 26 and to the dispensing manifolds 86 and 88 of one or more modules 100. The liquid coolant is collected by a sump 315 in the opposed-piston engine. A pump 317 connected to the sump pumps the collected liquid coolant through a filter 318 and a radiator 319 back to the source 310. As seen in FIG. 9A, a line 320 may be provided in parallel with the radiator 319. In this case, a valve 321 would control liquid coolant flow through the radiator 319 and a valve 322 would control liquid coolant flow through the line 320. For normal operation, only the valve 321 would be open, permitting liquid coolant to flow through the radiator 319, thereby dissipating the heat of the pistons and cylinders via the radiator 319. For short term boosted operation, the valves 321 and 322 would both be open, thereby dissipating the heat of the pistons and the cylinders via the radiator 319 and absorbing some of the heat in the reservoir of liquid coolant in the source 310. Finally, during emergency operation in the event of radiator failure the valve 321 would be closed and the valve 322 would be open, thereby temporarily diverting the heat of the pistons and cylinders into the reservoir of liquid coolant.

Figure 9B:
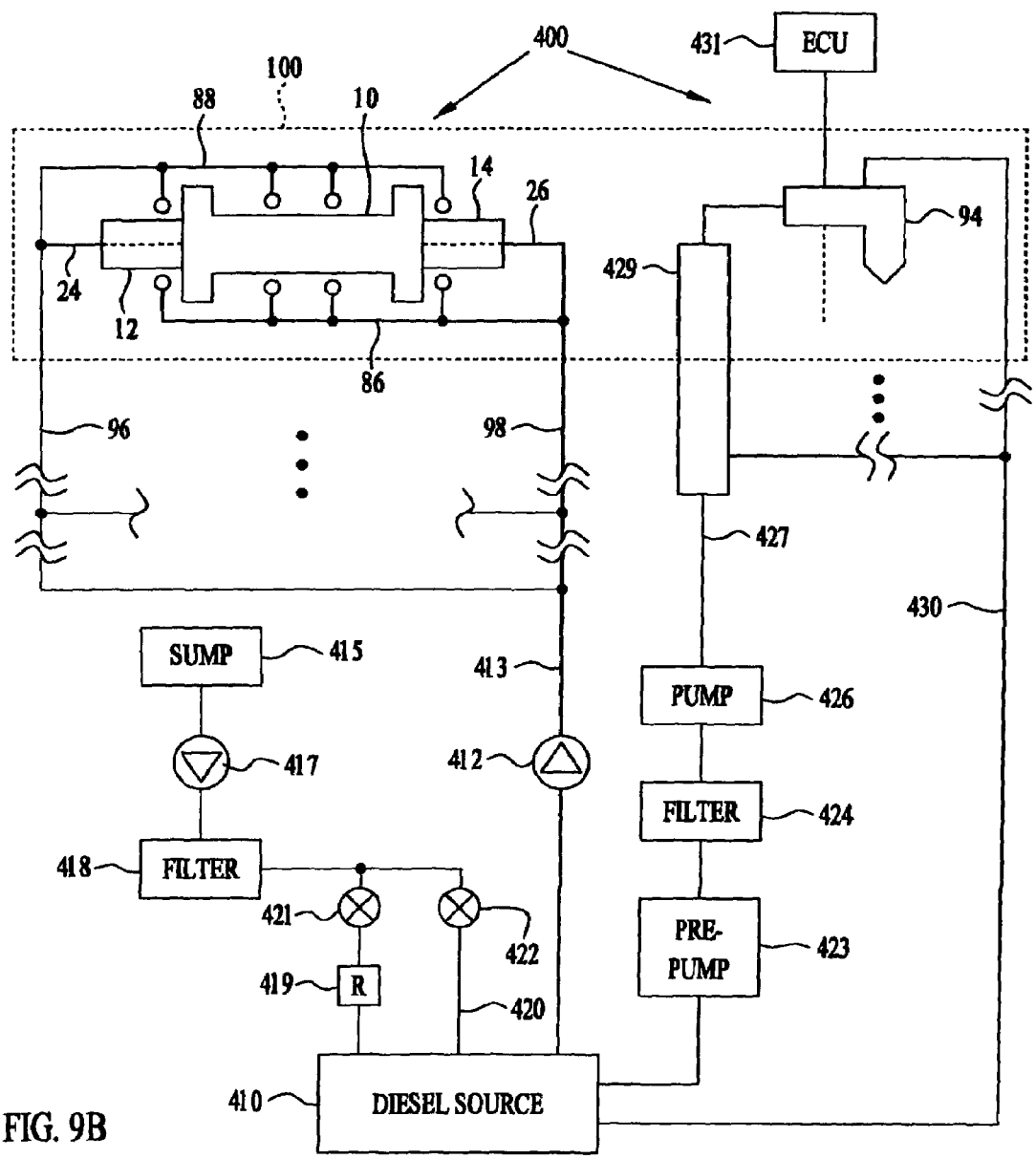
FIG. 9B is a schematic diagram of a combined fuel and coolant supply system for an opposed-piston engine.

If an opposed-piston engine is operated as a compression-ignition engine, fuel injection is the method of delivering diesel fuel to the cylinders for combustion. In this case, diesel fuel also preferably serves as the liquid coolant and as the lubricant for the pistons. It is therefore possible to combine the fueling and coolant sources, eliminating the need for multiple sources. Referring to FIG. 9B, a system 400 for supplying diesel fuel to be dispensed on and in pistons and on cylinders and supplied to fuel injectors in an opposed-piston engine of one or more cylinders is illustrated. In this figure, a source of diesel fuel 410 is connected to a low-pressure, high-volume pump 412 (a centrifugal pump, for example) which pumps liquid coolant through a distribution line 413 to the manifolds 96 and 98. These manifolds supply a high volume of liquid coolant at low pressure to the dispensers 24 and 26 and to the dispensing manifolds 86 and 88 of one or more engine mechanisms 100. The diesel fuel is collected by a sump 415 in the opposed-piston engine. A pump 417 connected to the sump pumps the collected diesel fuel through a filter 418 and a radiator 419 back to the source 410. A return line 420 parallel to the radiator 419 is provided. Valves 421 and 422 control the use of the radiator 419 and return line 420 as explained above in connection with the valves 321 and 322 in FIG. 9A. A pre-pump 423 connected to the source 410 pumps diesel fuel through a filter 424, and to a high-pressure pump 426, which boosts the pressure of fuel delivered to the injectors. For example, the pump 426 may supply diesel fuel at 30,000 psi. The fuel from the pump 426 is supplied through an input fuel line 427 connected to a common rail 429 and the input ports of one or more fuel injectors 94. The return ports of the one or more fuel injectors are returned through line 430 to the source 410. An electronic control unit (ECU) 431 controls the operations of the one or more fuel injectors 94.

Another advantage of an engine built according to this specification is that all of the bearings used to support the crankshafts and connecting rods may be roller bearings. These bearings may be lubricated by being sprayed with diesel fuel, whose lubricity and viscosity at the operating temperatures of an opposed-piston engine are completely adequate for their lubrication.

Thus, by way of the pump 412, the system 400 may deliver diesel fuel as a lubricant for all bearings of the engine, save those in the gearbox 170. In this regard, as diesel fuel supplied from the dispensers, the diesel fuel is churned into a mist within the engine that spreads throughout the engine and works its way between the moving parts of the engine and into the rolling bearings contained within the engine. A single source can then be used to supply such coolant, and lubricant to the engine.

Figure 9C:
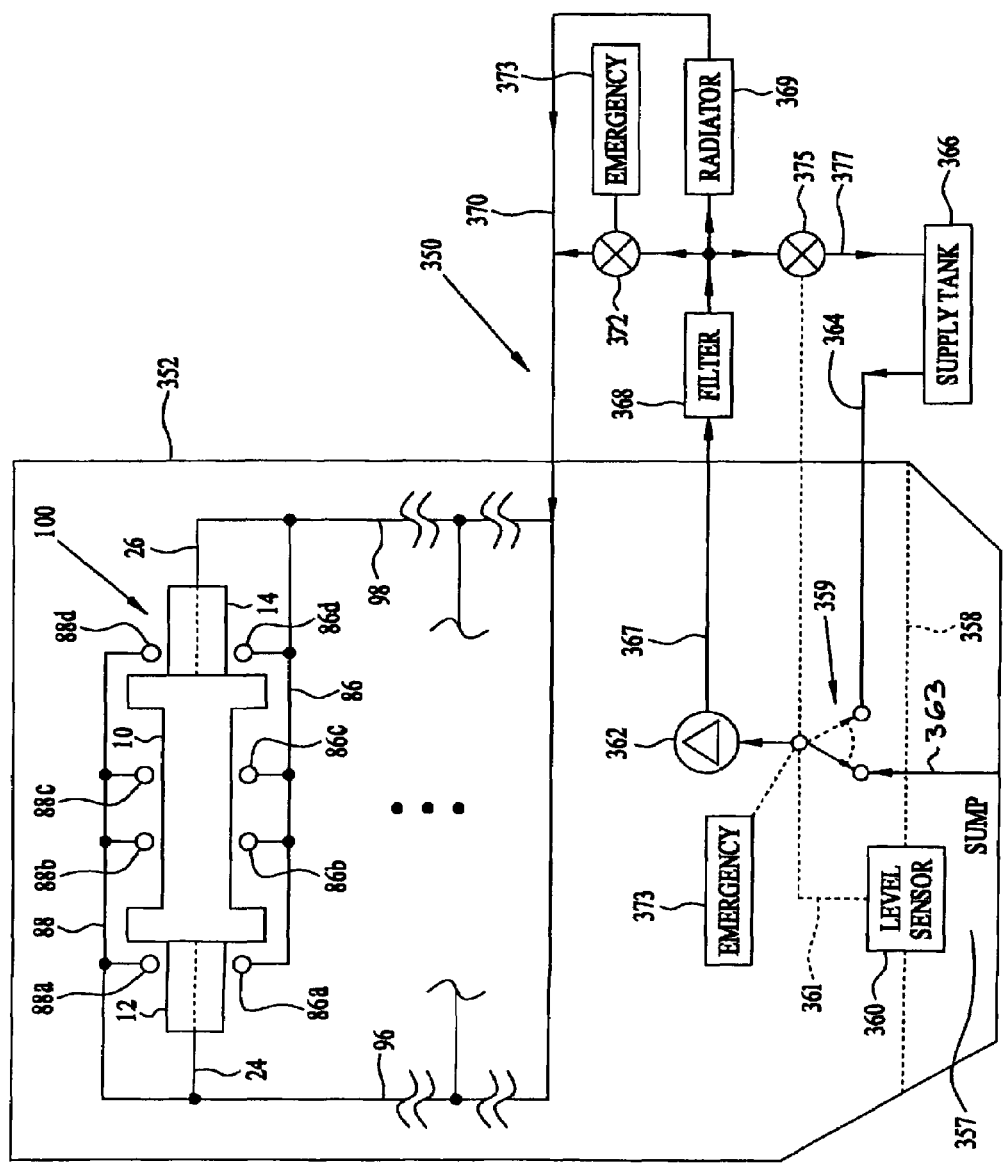
FIG. 9C is a schematic diagram of another supply system for an opposed-piston engine which provides liquid coolant to the engine.

An alternate supply system 350 for supplying a liquid coolant to be dispensed on and in pistons and on cylinders in an opposed-piston engine of one or more cylinders is illustrated in FIG. 9C. This system may be used for dispensing liquid coolant alone as the system 300 in FIG. 9A, or it may be combined with other elements in a system for dispensing diesel fuel to cool, lubricate, and fuel an engine as illustrated in FIG. 9B. The liquid coolant may be any liquid capable of being applied to the pistons and cooling them sufficiently for the desired application. Lubricating oil and diesel fuel are two possibilities. In this figure, an engine enclosure 352 enclosing one or more engine mechanisms 100 contains a sump region 357 where liquid coolant emitted by the above-described dispensers is collected. The liquid coolant collected in the sump region 357 has a nominal operating fluid level 358. A source valve 359 is mounted in the engine enclosure. A level sensor 360 in contact with the liquid coolant collected in the sump region 357 controls a linkage 361 that selects the state of the source valve 359. The source valve 359 has an output connected to a low-pressure high-volume pump 362. The pump 362 may comprise, for example, a centrifugal pump. The source valve 359 has two inputs, a first connected to a feed line 363 from the sump region 358, and a second connected to a feed line 364 from a supply tank 366 containing the liquid coolant. The pump 362 pumps liquid coolant through a feed line 367 to a filter 368 and therethrough to a radiator 369. From the radiator 369, the liquid coolant flows through a feed line 370 to the manifolds 96 and 98. These manifolds supply the high volume of liquid coolant at low pressure to the dispensers 24 and 26 and to the dispensing manifolds 86 and 88 of one or more modules 100. For example, the liquid coolant may be provided in the range of 3 to 10 gal/min for a 100 HP engine. As seen in FIG. 9C, a thermal valve 372 is connected in parallel with the radiator 369 between the output of the filter 368 and the feed line 370. The state of the thermal valve 372 is controlled by the temperature of the liquid coolant or by an emergency circuit 373. The emergency circuit 373 is also connected to the source valve 359. A level valve 375 has an input connected in common with the output of the filter 368, the input of the radiator 369, and the input of the thermal valve 372. The output of the level valve 375 is connected through a feed line 377 to the supply tank 366. The control linkage 361 is also connected to control the state of the level valve 375.

With further reference to FIG. 9C, in normal operation, the level sensor 360 detects the level of liquid coolant in the sump region 357 and selects as a source for the pump 362 either the sump region 357 or the supply tank 366. When the operating level has been reached, the level sensor sets the control linkage 361 to place the source valve in the state where it draws liquid coolant only from the sump region 357. The heated liquid coolant is pumped by the pump 362 through the filter 368 to the radiator 369 and the thermal valve 372. When a design operating temperature of the liquid coolant is achieved, the thermal valve will close partially or fully to modulate the flow of liquid coolant through the radiator 369, thereby regulating the engine temperature. The flow of liquid coolant continues through the feed line 370 to the dispensers where the liquid coolant is applied to remove heat from the engine components. If the level of liquid coolant in the sump region becomes too high, the level sensor 360 causes the control linkage 361 to partially open the level valve 375 to return a portion of the liquid coolant to the supply tank 366 after filtration at 368. In an emergency situation where it is necessary to temporarily bypass the radiator 369, the emergency circuit 373 fully opens the thermal valve 372, thereby shunting the radiator 369, and forces the source valve 359 to initially draw liquid coolant from the supply tank 366. The excess liquid coolant that accumulates in the sump region 357 will be removed by the level valve in response to the level sensor 360. For temporary maximum performance, the thermal valve 372 is closed, thereby utilizing the full capacity of the radiator 369, while the state of the source valve 359 is set to draw fluid only from the supply tank 366.

Figure 10:
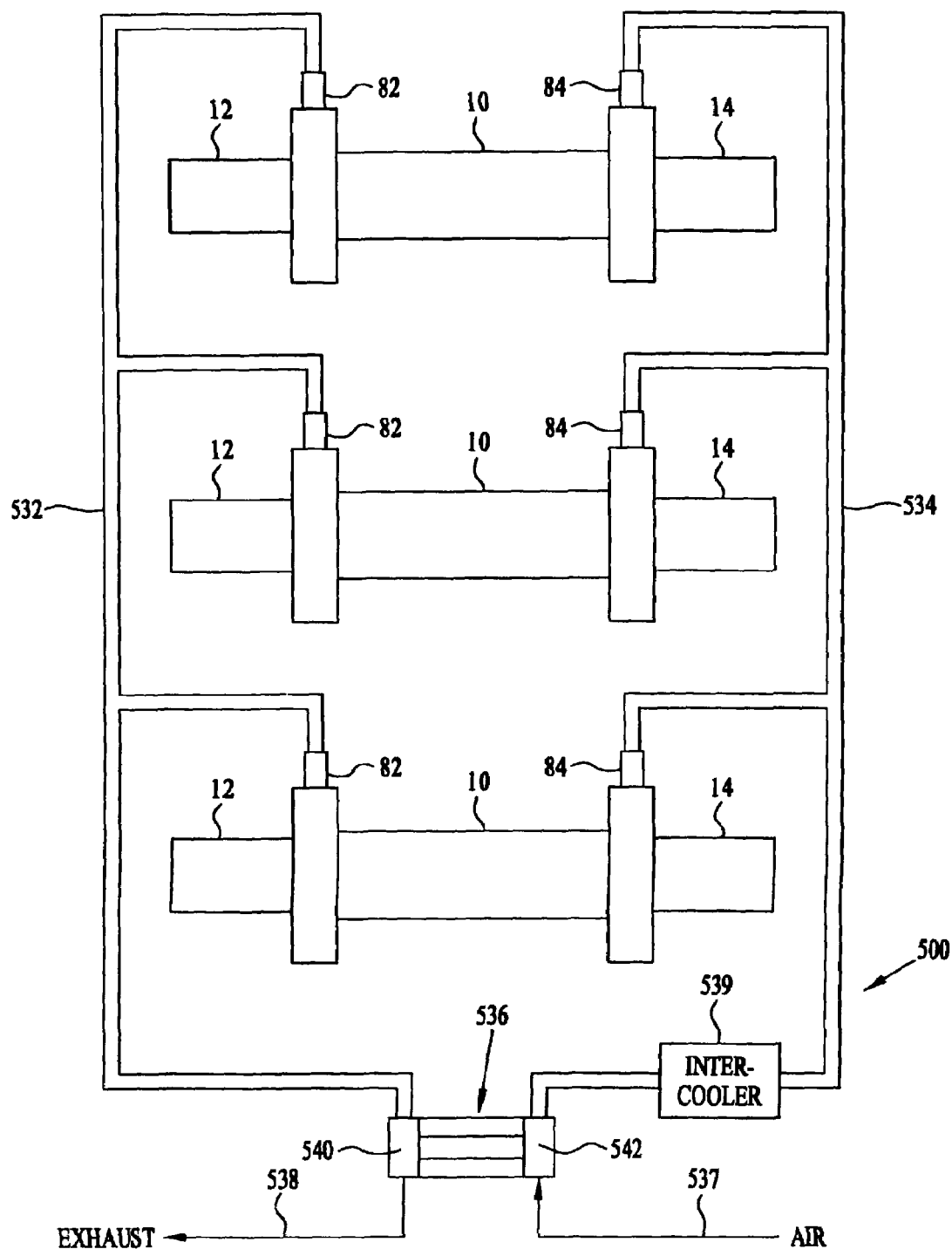
FIG. 10 is a schematic diagram of gas flow in an opposed-piston engine.

A system 500 for providing charge air to and discharging exhaust gasses from an opposed-piston engine is illustrated in FIG. 10. The system may scale to serve one or more cylinders 10. In the system 500, an air inlet manifold line 534 and an exhaust outlet manifold line 532 are respectively connected to the inlet port tubes 84 and the exhaust port tubes 82 of one or more modules. These manifold lines are preferably mounted outside the engine enclosure. The engine schematically illustrated in FIG. 10 is a turbo-supercharged or supercharged engine. Thus, the manifold lines are connected to a turbo-supercharger 536. Specifically, the exhaust gases moving through the exhaust manifold line 532 drive a turbine 540 en route to an output line 538 to mechanically drive a compressor 542. The compressor 542 draws air in on an air inlet line 537 and pressurizes the intake air before directing air to the inlet manifold line 534 by way of an intercooler 539. Conventionally, a supercharger or equivalent device may be connected between the intercooler 539 and the manifold line 534 to provide scavenge air for starting the engine.

Other engine elements not included in the illustrations of this first embodiment will be provided according to specific circumstances of each application of this opposed-piston engine. In this regard, the gearbox 170 may be sealed and self-lubricated by oil or may be lubricated separately from the rest of the engine. Alternately, it could be left open and lubricated by the coolant/lubricant used to cool and lubricate the pistons, provided that a suitable lubricant is employed.

In prior engines, as the BMEP increases, friction at the piston ring/cylinder interface increases and the interface temperature rises. The increasing interface temperature ultimately results in heat flowing back into the piston from the interface rather than from the piston to the interface. As a consequence, the rings no longer cool the piston. Assuming maximum flow of coolant to the inside surfaces of the piston skirt and crown, the only remaining piston surfaces to cool are the exterior surfaces of the skirt and crown. The exterior surface of the crown is a component of the combustion chamber and is only marginally cooled by combustion gas expansion and scavenging airflow; this surface is otherwise inaccessible to external cooling. In prior art engines, the exterior surface of the piston skirt is also inaccessible to piston cooling because the piston is encased in the cylinder. However, with periodic exposure of the external surface of the piston skirt by substantially withdrawing the piston from the cylinder bore, that surface is available for cooling. As a result, on the order of twice the amount of heat transfer is achievable when compared with cooling only the inside surfaces of the piston skirt and crown.

A Second Engine Embodiment

In an opposed-piston internal combustion engine, the cylinder is subjected to non-uniform thermal stresses as a consequence of combustion during engine operation. Consideration of the first embodiment described above has lead to the realization that such stresses may not be adequately controlled in all cases by directly showering the outer surface of the cylinder with a large, low velocity stream of liquid coolant, which tends to detach from the outside surface toward the bottom of the cylinder. On the other hand, it has also been appreciated that the piston may be adequately cooled under conditions of high BMEP just by application of directed jets of liquid coolant to the back surface of the piston crown.

These insights have lead to the design of a second embodiment of an opposed-piston internal combustion engine in which thermal non-uniformities occurring in the cylinder are eliminated or at least substantially reduced by application of streams of a liquid coolant over the entire circumference of the outer surface of the cylinder that vary in direction and areal density to remove varying amounts of heat in order to tailor the cooling to the non-symmetric heat distribution in the cylinder. In addition, thermally-induced distortion of the piston is reduced or eliminated by provision of a reduced wall thickness at the piston crown and application of directed jets of liquid coolant to the back surface of the crown.

The absence of thermal non-uniformities in the cylinder and thermal distortion of the piston crown at high BMEP results in a tightly controlled fit between cylinder bore and piston with minimal flow of gasses between the cylinder and pistons ("blowby") during compression and combustion. With the geometric relationship between the connecting rods, saddles, and crankshafts in the first embodiment and improved control of thermally-induced distortion, the second embodiment engine operates with reduced piston side forces and may operate with ringless pistons.

The second embodiment opposed-piston internal-combustion engine includes elements that correspond in form and/or function with elements of the first embodiment described above. Nevertheless, for clarity and ease of understanding, elements of the second embodiment are numbered independently of the numbering of corresponding elements of the first embodiment.

FIGS. 11A-11D illustrate a cylinder 1100 useable in the second embodiment of an opposed-piston internal combustion engine. The cylinder 1100 has four parts: a cylinder liner 1102 formed as an open cylindrical tube with a cylindrical bore 1103, an exhaust manifold 1104, an inlet manifold 1106, and a cylinder sleeve 1140. Preferably, the cylinder 1100 is made from aluminum, such as a high-temperature aluminum alloy, and it may be cast as a single piece, or assembled by fixing the manifolds 1104 and 1106 to the cylinder sleeve 1140 and then fixing that subassembly to the outer surface of the cylinder liner 1102. The longitudinal axis $A_c$ of the cylinder liner 1102 is also the longitudinal axis of the cylinder 1100.

Figure 11A:
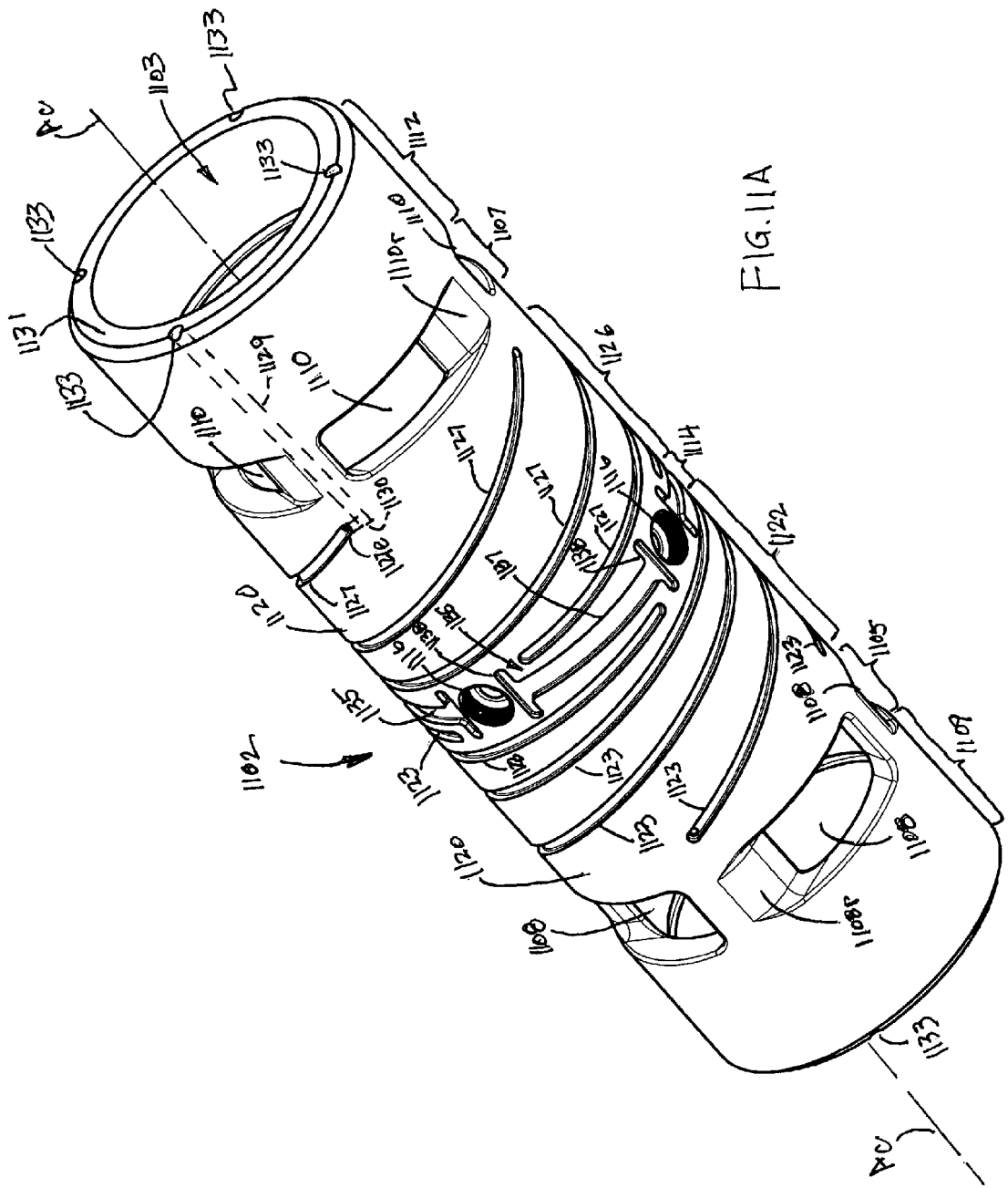

As best seen in FIG. 11A, the cylinder liner 1102 has an exhaust port 1105 constituted of a series of circumferentially-spaced openings 1108 near an exhaust end 1109 of the cylinder liner 1102. The cylinder liner 1102 also has an inlet port 1107 constituted of a series of circumferentially-spaced openings 1110 near an inlet end 1112. Each opening 1108 of the exhaust port 1105 has a ramped downstream end 1108r. Combustion gases spiraling toward the exhaust end 1109 of the cylinder liner 1102 are diverted at least generally out of the cylinder liner 1102 into the exhaust manifold 1104. Similarly, each opening 1110 of the inlet port 1107 has a ramped upstream end 1110r at which pressurized air flowing into the inlet port 1107 through the inlet manifold 1106 is diverted into the bore 1103 in a spiral direction toward the exhaust end 1109. At a central portion 1114 of the cylinder liner 1102, a number of threaded openings 1116 are provided in a circumferential sequence. At least one of the openings 1116 receives a fuel injector, and at least one other of the openings 1116 receives a sensor for sensing engine operating conditions such as pressure or temperature. In the cylinder liner 1102 shown, there may be, for example, two openings 1116 for receiving fuel injectors, one opening 1116 for receiving a pressure sensor, and one opening 1116 for receiving a temperature sensor.

Figure 12:
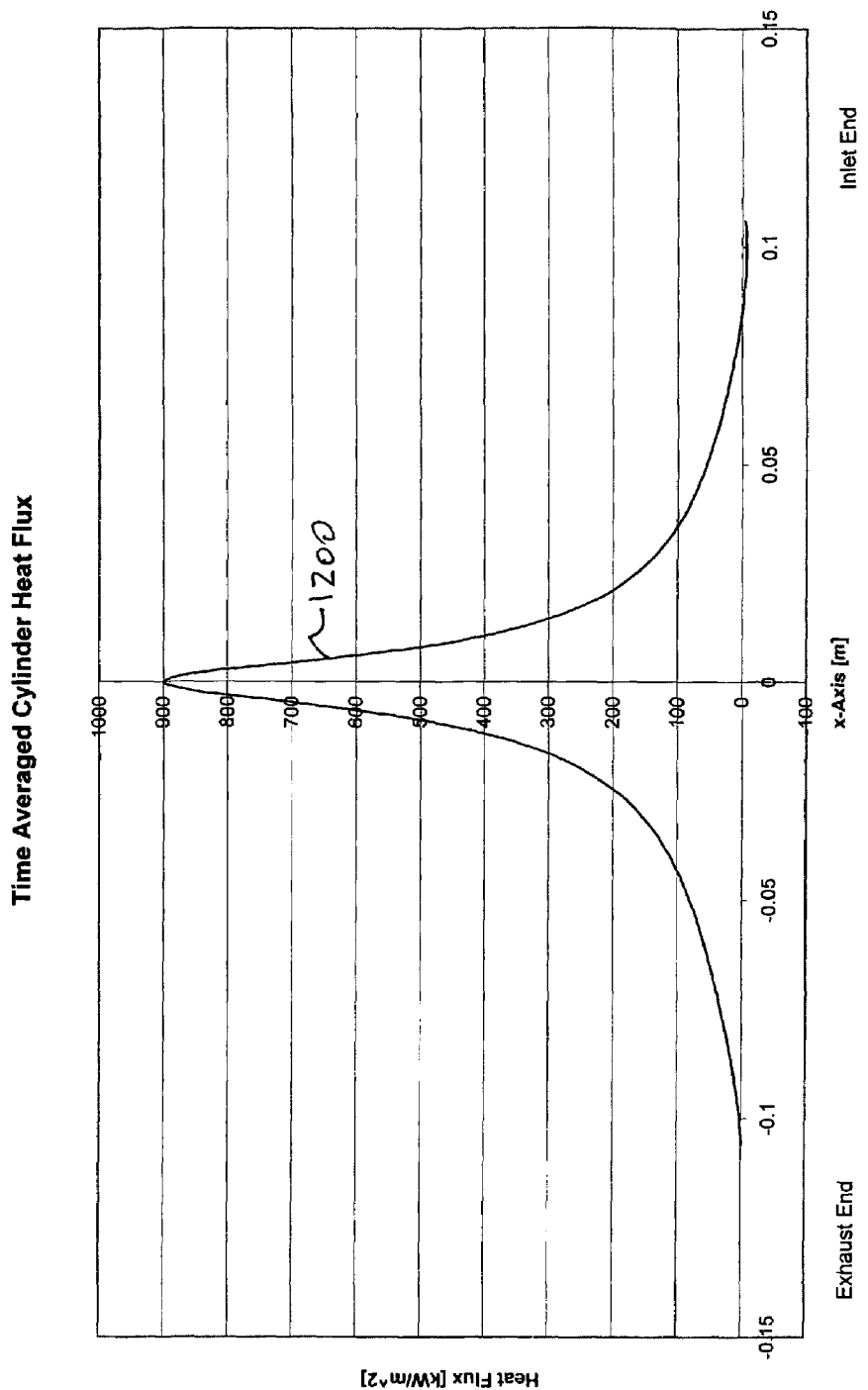
FIG. 12 is a curve modeling time-averaged cylinder heat flux in an axial direction during operation of an opposed piston engine.

The curve 1200 of FIG. 12 represents the average heat flux across a longitudinal trace on the inside wall of the cylinder liner 1102 during engine operation. As the curve 1200 shows, the cylinder liner 1102 is non-uniformly heated with respect to its longitudinal axis. The cylinder liner 1102 has its greatest heat load in its central portion 1114, where combustion occurs. Also, the end portion of the cylinder liner with the exhaust port 1105 experiences a greater heat load than the end portion with the inlet port 1107. Thus, in order to minimize non-uniformities in the temperature of the cylinder 1100 and resulting cylindrical non-uniformity of the bore 1103, the cylinder 1100 should be cooled in a tailored manner that accommodates the non-uniform ways its portions are heated during engine operation. That is to say, a system for cooling the cylinder 1100 should provide a greater cooling capacity to the portion of the cylinder from near its axial center to the exhaust end than the portion from near its axial center to the inlet end, and should provide the highest cooling capacity to the central portion of the cylinder.

In addition to minimizing the non-uniformities in cylinder wall temperature along the longitudinal axis of the cylinder 1100 caused by the varying heat flux along that axis, there exists a potential for a circumferential temperature variation in the cylinder wall even with uniform heat flux if the available cooling is not uniform around the circumference as is the case in the central portion 1114 due to the sequence of openings 1116. To maintain circumferential temperature uniformity, and thus cylindrical uniformity, in the central portion 1114 the cooling adjacent to these openings 1116 must subsume the cooling that would have occurred had the openings not been present.

Figure 11B:
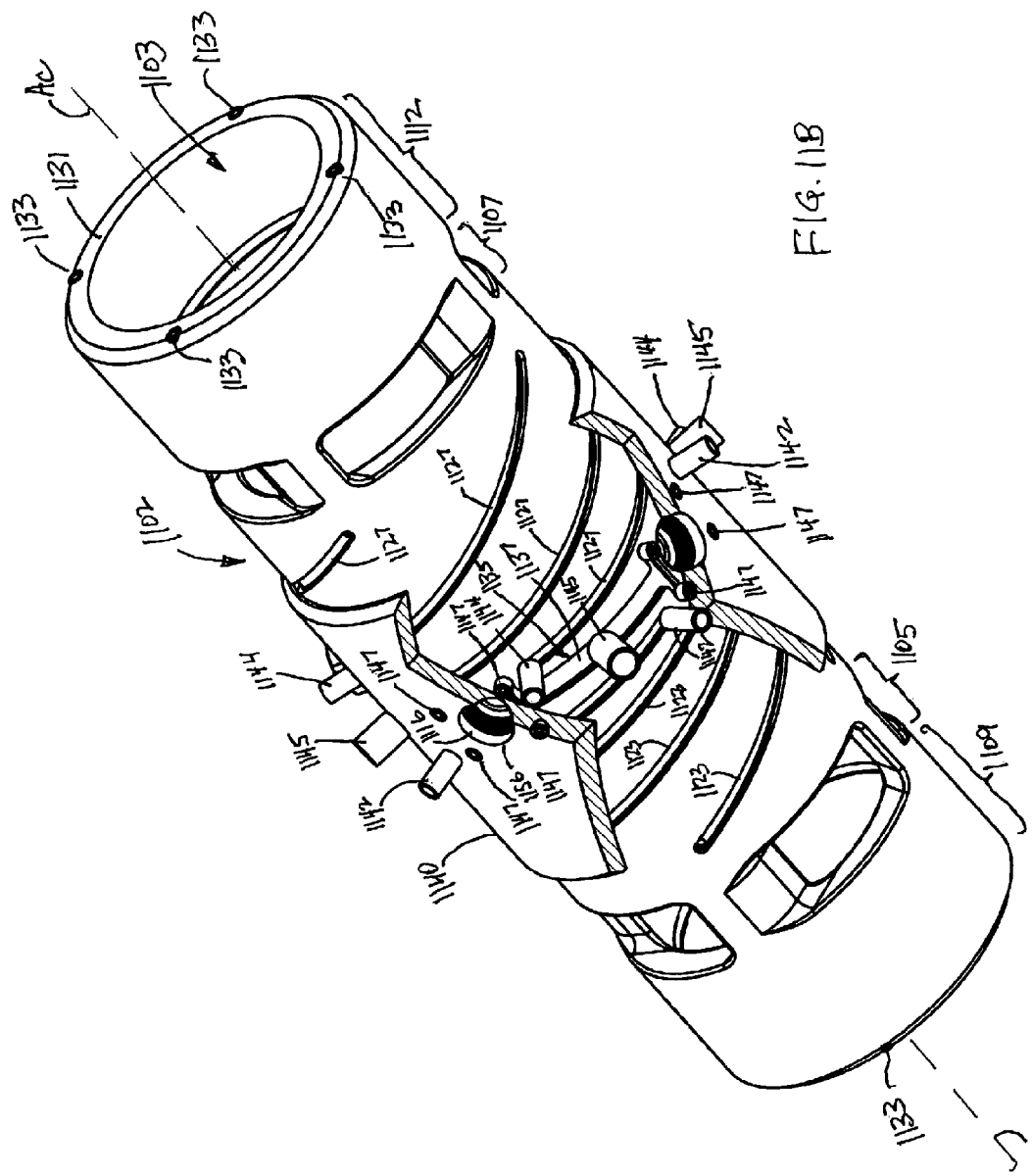

To provide a tailored cooling capacity that meets these goals, a number of grooves or channels are provided on the outside surface 1120 of the cylinder liner 1102. Referring to FIGS. 11A, 11B, and 11D, a first group 1122 of interlaced grooves 1123 spiral around the outside surface 1120 from the central portion 1114 toward the exhaust port 1105, and a second group 1126 of interlaced grooves 1127 spiral around the outside surface 1120 from the central portion 1114 toward the inlet port 1107. Each groove of these two groups originates in or near the central portion 1114, follows a spiral path around the outside surface 1120, and terminates near a respective port 1105, 1107 in a drilled radial section. The drilled radial section of each groove communicates with a drilled axial channel extending longitudinally within the cylinder liner 1102 through an edge of the cylinder liner 1102. One such axial channel, indicated by reference numeral 1129, communicates through a drilled radial section 1130 with an end 1127e of a groove 1127 and penetrates the edge 1131 through hole 1133. This enables a stream of liquid coolant to flow from the beginning of a groove in or near the central portion 1144, along the spiral of the groove toward a respective end of the cylinder liner 1102, through a channel in the cylinder liner, and out of a hole in an edge of the cylinder liner 1102. Each group 1122, 1126 of grooves conducts an aggregate flow of liquid coolant from the central portion 1114 to an end portion of the cylinder liner 1102, enabling cooling of the respective corresponding portion of the cylinder liner, and thereby, of the cylinder 1100 itself. There is a pitch, or spacing, (which may be constant or varying) between the grooves of each group and the pitch for the grooves of the group 1122 extending from the central portion 1114 toward the exhaust end 1109 is less than the pitch for the group 1126 of grooves extending from the central portion 1114 toward the inlet end 1112. As a result, more liquid coolant contacts the cylinder liner portion over a larger surface area including the exhaust port 1105 than the cylinder liner portion including the inlet port 1107, thereby providing greater cooling capacity for the cylinder liner portion that includes the exhaust port 1105. The coolant is also the coolest, and therefore has the greatest heat exchange capacity, as it enters the grooves near the central portion 1114 of the cylinder liner 1102 where the cooling requirements are the greatest. Furthermore, the grooves may have a variable cross-sectional area along their length that affects the local flow velocity of the coolant within the grooves and therefore the rate of heat removal. Thus, the cooling capacity of the spiral grooves is settable over a wide range by varying any or all of the number of interlaced grooves, the length of the grooves, the pitch of the grooves, the cross-sectional area along the length of the grooves and the coolant flow rate into the channels.

Still referring to FIGS. 11A, 11B, and 11D, a third group of grooves 1135 extend around the outside surface 1120 in the central portion of the cylinder liner 1102, with each groove 1135 extending between two of the openings 1116 in the central portion. Each groove 1135 has an elongated portion 1137 that extends in an arc on the circumference of the cylinder liner 1102, and cross portions 1138 at the opposed ends of the elongated portion 1137. Each cross portion 1138 is transverse to the elongate portion 1137 so that each of the grooves 1135 has the shape of an I. As best seen in FIG. 11A, each cross portion 1138 is positioned immediately adjacent an opening 1116. In operation, liquid coolant introduced into each groove 1135 at the center of its elongate portion 1137 flows through the elongate portion 1137 toward each cross portion 1138 and then is exhausted from holes 1147 in the cylinder sleeve 1140 at either end of each cross portion 1138. Thus, liquid coolant flowing in each groove 1135 has a longer flow path at each end 1138 of the groove, near an opening 1116. Consequently, each groove 1135 provides a greater capacity for cooling at the hottest parts of the central portion 1114, near the openings 1116. The cooling capacity provided for the central portion 1114 varies with the circumferential distance to the nearest opening 1116 in the central portion. The cooling in the grooves 1135 is a very effective, localized method for removing heat from the area of the openings 1116 that is not accessible to cooling by the group of spiral grooves 1122, 1126. The effectiveness of heat removal in the central section 1114 is due to a stagnation flow pattern of the coolant occurring in the zone where the coolant flows to and touches the center of each end 1138 before flowing to the tips of the end.

Figure 11C:
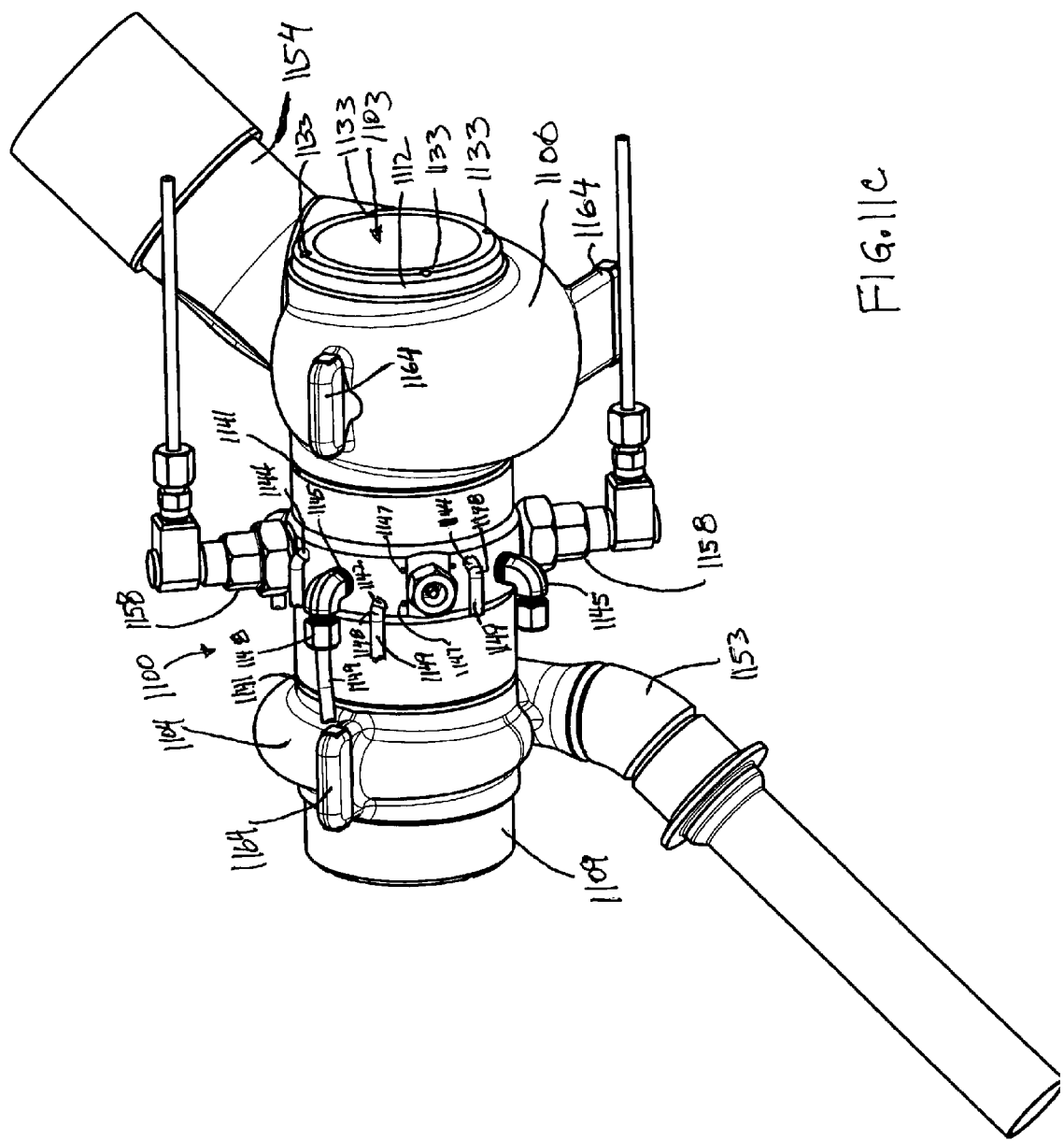

Assembly details of the cylinder 1100 are seen in FIGS. 11A-11D. The tubular cylinder sleeve 1140 is received on the surface 1120, centered on the central portion 1114 and extending to and meeting the exhaust and inlet manifolds 1104 and 1106. The manifolds 1104, 1106 may be welded to the cylinder sleeve 1140 at the seams 1141 between the cylinder sleeve and the exhaust and inlet manifolds 1104 and 1106. Such welds 1141w are best seen in FIG. 11D. Alternatively, the manifolds 1104 and 1106 may be individually cast with respective portions of the cylinder sleeve 1140 and fixed to each other and to the cylinder liner 1102 by welding. Together, the exhaust and inlet manifolds 1104 and 1106 and the cylinder sleeve 1140 cover the grooves 1123, 1127, and 1135, confining the flow of liquid coolant in the grooves. As best seen in FIG. 11B, the cylinder sleeve 1140 includes ports 1142, 1144, and 1145. Each port 1142 is positioned over the beginning of a respective groove 1123 near the central portion 1114; each port 1144 is positioned over the beginning of a respective groove 1127 near the central portion 1114; and each port 1145 is positioned over the center of the elongate portion 1137 of a respective groove 1135. Liquid coolant flows into grooves 1123 and 1127 through ports 1142 and 1144, near or at the central portion 1114 of the cylinder liner 1102, and flows in streams through the grooves and the drilled channels 1129, and out of the holes 1133 in the end edges of the cylinder liner 1102. Liquid coolant flows into the grooves 1135 through ports 1145, and flows in streams through the elongate portions 1137, to the ends 1138. Holes 1147 provided through the cylinder sleeve 1140 are positioned at the tips of the ends 1138 to permit liquid coolant to flow out of the grooves 1135. As best seen in FIG. 11C, the ports 1142, 1144 and 1145 receive couplings 1148 mounted on liquid coolant supply lines 1149 that connect to a liquid coolant supply system as explained below in connection with FIGS. 16A and 16B. Three liquid coolant supply circuits may be provided in a liquid coolant supply system to supply liquid coolant for the three groups of grooves. Each circuit is connected to a respective group of grooves by way of the ports that communicate with the grooves to input liquid coolant at a desired pressure and flow rate for the group of grooves. In these figures, no lines are provided to conduct liquid coolant flowing out of the grooves on the outside surface 1120 of the cylinder liner 1102. As per the description of FIG. 9A above, the liquid coolant may be collected by a sump in the engine. In this case, some portion of the liquid coolant expelled through the holes 1133 at each edge of the cylinder liner 1302 will fall on the outside skirt surfaces of the opposed pistons (not shown in FIGS. 11A-11E) as they reciprocate in the bore 1303, thereby cooling and lubricating those surfaces during engine operation. Alternatively, the liquid coolant flowing out of the ends of grooves on the cylinder 1100 may be conducted in liquid coolant return lines connected by conventional fittings to the holes 1133 and 1147 for collection and recirculation of the liquid coolant as explained below in connection with FIG. 16B.

As seen in FIGS. 11C and 11D, the exhaust and inlet manifolds 1104 and 1106 have respective internal annular volutes 1150 and 1152 that communicate with the exhaust and inlet ports 1105 and 1107, respectively. Preferably each of the volutes 1150 and 1152 has the shape of a scroll in order to induce swirling of gasses flowing therethrough, while controlling turbulent mixing. Swirling the pressurized air facilitates scavenging and enhances combustion efficiency. Ducts 1153 and 1154 connect the exhaust and inlet manifolds 1104 and 1106 to a system for discharging exhaust gasses from and providing charge air to an opposed-piston engine, such as the system of FIG. 10.

As seen in FIGS. 11B-11D, the cylinder sleeve 1140 includes one or more openings 1156, each aligned with a corresponding threaded opening 1116 in the cylinder liner 1102. One or more fuel injectors 1158 each threaded at its nozzle end are mounted to the cylinder 1100 by being threaded into openings 1116. Each fuel injector 1158 is coupled at 1159 to a high-pressure fuel line 1160 and may be provided with fuel by a system such as the system of FIG. 9B. The cylinder 1100 is provided with mounting tabs 1164 that are received in a frame (not shown in these figures) when the cylinder 1100 is assembled into an opposed-piston engine.

FIGS. 13A-13E illustrate a piston 1300 useable in the second embodiment of an opposed-piston internal combustion engine. The piston 1300 is preferably ringless. The piston 1300 has a cylindrical section 1302 with a closed end that forms the piston crown 1308. The cylindrical section 1302 has an open end 1309 opposite the crown 1308. The portion of the cylindrical section 1302 extending from the crown 1308 to the open end 1309 forms the piston skirt 1310. The longitudinal axis $A_p$ of the cylindrical section 1302 is also the longitudinal axis of the piston 1300.

In order to operate effectively without rings, the piston 1300 must retain at least substantially cylindrical symmetry under all engine operating conditions. Deformation of the piston results from thermal expansion, compression pressure, combustion pressure, inertial forces and blowby pressure. The greatest risk of thermal deformation occurs at the crown, especially adjacent to and at the corner 1312 where the crown 1308 transitions to the skirt 1310. Without cooling, this portion of the piston 1300 may bulge during engine operation, giving the piston 1300 a mushroom or tulip shape. This thermally-induced deformation is substantially uniform but still raises the risk of contact between the piston and the cylinder bore, if not controlled. The deformation may be eliminated, or at least substantially reduced, by maintaining as thin a cross section x-x as possible in the crown 1308 in order to minimize the thermal impedance in the crown 1308 where maximum heating occurs, while cooling the crown by direct impingement of one or more jets of liquid coolant on the back surface of the crown. Since the deformation is substantially uniform, the cooling may be tailored to the substantially symmetric heat distribution in and adjacent the crown.

But a thin crown potentially weakens a piston precisely where the greatest pressure must be accommodated during combustion. In the piston 1300, structural robustness at the crown 1308 is assured by the provision of load-bearing elements or members that extend between the crown 1308 and the skirt 1310 to transfer the load brought to bear on the crown during combustion to the skirt and other elements of the piston. With efficient cooling of the crown 1300, it becomes less important to transfer heat through the piston skirt 1302. As a result, the skirt 1302 may be made thinner, than otherwise would be necessary thereby lowering the mass of the piston and enhancing engine PWR.

Further benefits may also be realized by allowing the piston support structure to deform elastically in some manner during engine operation for the purpose of regaining and/or maintaining axial alignment between the piston and the cylinder as the piston reciprocates in the bore of the cylinder.

The crown 1308 has an indented, bowl-shaped contour 1318 that may correspond with an identical contour of an opposing piston in defining a combustion chamber when the pistons are at or near top dead center in the cylinder 1100. The thickness of the crown 1308 at x-x may be 2 mm, or less, if the piston 1300 is made of a high-temperature alloy of aluminum or steel. For example, presuming that the crown 1308 is constituted of 5454 aluminum, and has a diameter of 80 mm, the thickness of the crown 1308 at x-x may be in the range of 1.5 to 2.0 mm.

The piston 1300 includes ribs 1322 formed within the cylindrical section 1302 that serve as the load-bearing elements discussed above. Preferably, the ribs 1322 are evenly spaced circumferentially about the longitudinal axis $A_p$ and extend radially from a cylindrical boss 1326 to the inner surface 1324 of the piston. The ribs 1322 abut the back surface 1316 of the crown 1308 and also extend longitudinally within the piston 1300 from the back surface 1316 at least part way along the inside surface 1324 of the skirt toward the open end 1309. In other embodiments, the ribs 1322 may approach or even reach the open end 1309. The ribs 1322 also have an axial extent and converge on the cylindrical boss 1326. The cylindrical boss 1326 has a threaded lower annular annulus 1327 and is centered on the longitudinal axis $A_p$, behind the crown 1308. The ribs 1322 transfer the axial loads exerted on the crown 1308 during engine operation to the skirt 1310 and the cylindrical boss 1326. The precise shape, extent, and number, of ribs 1322 may vary according to engine design and operating specifications. The crown 1308, the upper portion of the skirt 1310, the ribs 1322, and the cylindrical boss 1326 are formed as a single crown unit, with the lower portion of the skirt 1310 formed as a single cylindrical unit and joined to the crown unit at 1325. The crown and cylindrical units may be made by casting and/or machining high-temperature aluminum or steel alloy and joined by brazing, welding or threading.

Still referring to FIGS. 13A-13E, the cylindrical boss 1326 has an internal fluid accumulation space 1328. A number of holes open through the wall of the cylindrical boss 1326. The holes include circumferentially spaced first holes 1329. Each first hole 1329 is positioned between a respective pair of ribs 1322 and is axially inclined so as to open through the cylindrical boss 1326 at a slant toward the back surface 1316. The holes also include a plurality of circumferentially spaced, radially disposed second holes 1330 that are longitudinally spaced from the first holes 1329 toward the back surface 1316 of the crown 1308 and positioned where the cylindrical boss 1326 joins the back surface 1316. (Access to drill the second holes 1330 is provided through radial holes 1330a in the crown piece.) Each second hole 1330 is positioned circumferentially between a respective pair of ribs 1322 and opens radially through the cylindrical boss 1326 near the back surface 1316 of the crown 1308. A tubular connecting rod 1331 best seen in FIGS. 13C and 13D has a central bore 1332 and threaded end sections 1333 and 1334. The rod 1331 is received and retained in the cylindrical boss 1326 by threaded engagement between the end section 1333 and the annulus 1327, and the rod 1331 is locked to the piston 1300 by a threaded nut 1335.

Figure 13C:
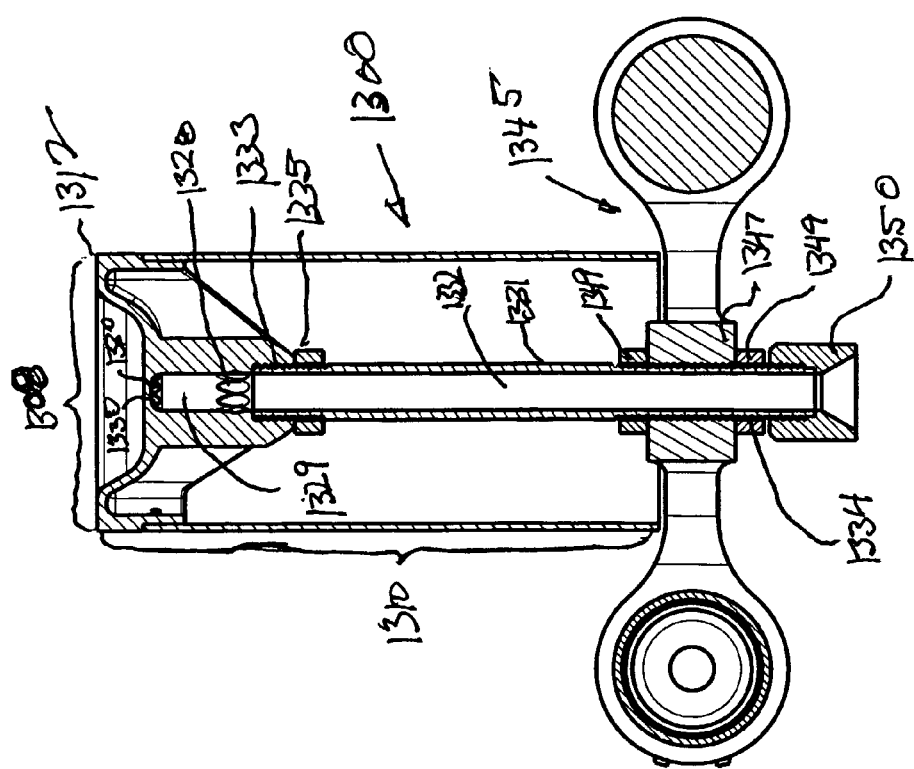
Figure 13D:
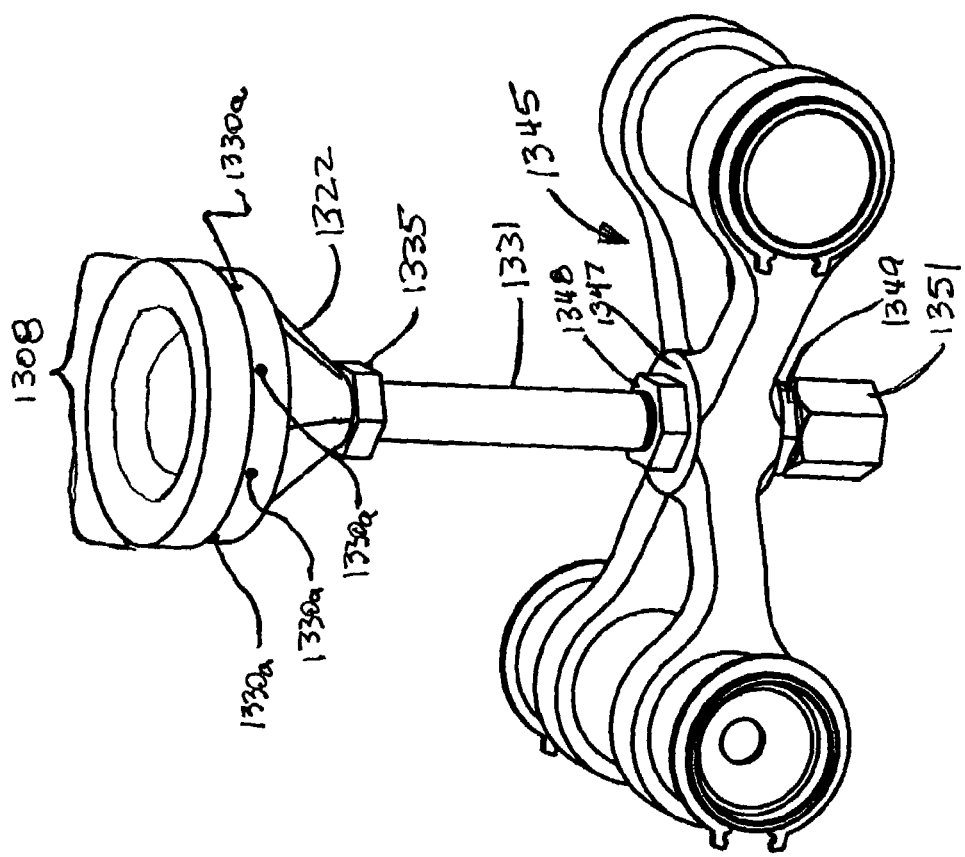

As best seen in FIGS. 13C and 13D, a saddle 1345, in the form of an open cruciate structure, is mounted by a threaded central piece 1347 to the threaded end section 1334 of the rod 1331. Locking nuts 1348 and 1349 threaded on the end section 1334, retain the saddle 1345 on the piston 1300. A port fixture 1350 is threaded to the end of the end section 1334.

Figure 13E:
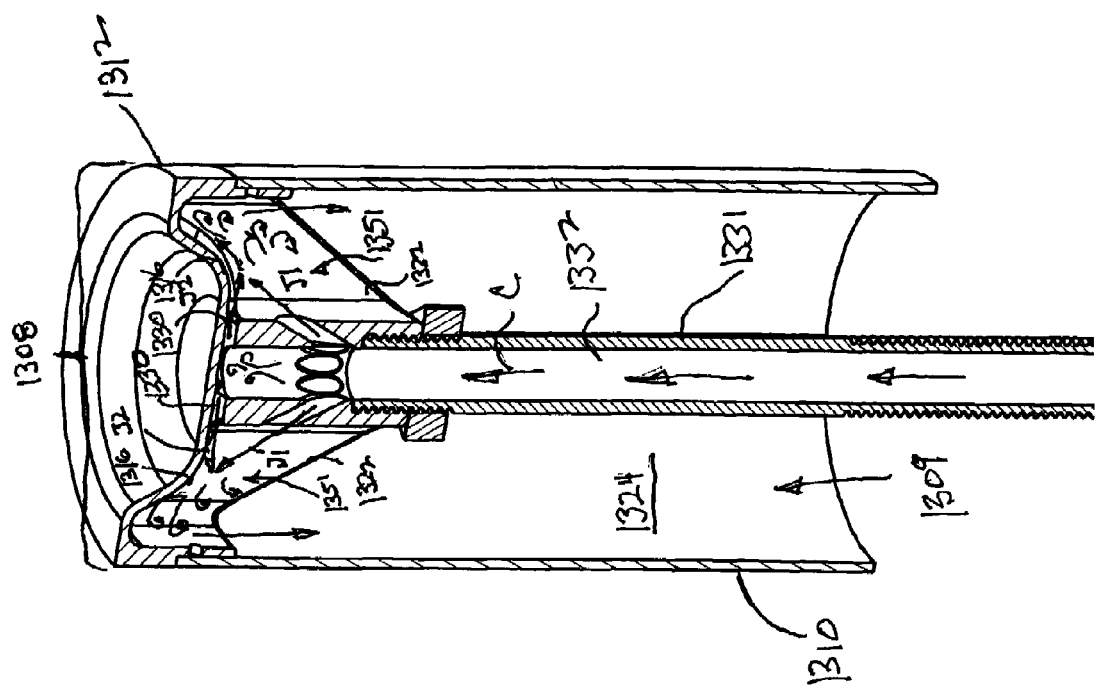

As may be appreciated with reference to FIGS. 13C and 13E, the rod 1331 constitutes a channel to deliver at least one directed jet of a liquid coolant on the back surface 1316 of the crown 1308. The bore 1332 of the rod 1331 communicates with the accumulation space 1328, and liquid coolant introduced through the port fixture 1350 flows through the bore 1332, into the accumulation space 1328, and out of the first and second holes 1329 and 1330 onto the back surface 1316.

Referring now to FIGS. 13A and 13E, the application of coolant to the back surface 1316 of the crown 1308 may be understood. The ribs 1322 define a radially symmetrical ring of chambers 1351 on the back surface 1316 of the crown 1308. As coolant C flows axially through the bore 1332 of the rod 1331, coolant is diverted out of the cylindrical boss 1326 and through each first hole 1329 in an axially inclined jet J1 directed toward a portion of the back surface 1316 in one of the chambers 1351. As coolant C enters the internal accumulation space 1328 of the cylindrical boss 1326, it impinges axially on and cools the central portion of the back surface 1316. The coolant C is diverted radially across the central portion of the back surface 1316, and flows out through each first hole 1329 in a jet J2 directed substantially radially with respect to the longitudinal axis $A_p$. Each chamber 1351 receives a turbulent axially inclined jet J1 of liquid coolant ejected through a respective first hole 1329 and directed toward the section of the back surface 1316 within the chamber 1351. Each chamber 1351 also receives a turbulent radially directed jet J2 of liquid coolant ejected through a second hole 1330. The turbulent jets J1 and J2 of liquid coolant impinge on the section of the back surface 1316 within the chamber 1351. The ejected liquid coolant flows along the section of the inside surface 1324 and the facing surfaces of the ribs 1322 defining the chamber 1351, and then out of the chamber 1351 along the inside surface 1324 of the skirt 1310. Thus, during engine operation, the piston 1300 is cooled by one or more directed jets of liquid coolant that strike the back surface 1316, between the ribs 1322. The viscosity and pressure of the coolant C and the diameters of the first and second holes 1329 and 1330 may be varied to assure turbulence of the jets in the local flow of the coolant within the chambers 1351 and against the back surface 1316. As is known turbulence enhances the capacity of the coolant to conduct heat away from the back surface 1316 and the sides of the chambers 1351. The flow rate of the coolant C is raised to a level to assure a high rate of heat removal from the crown 1308. The jets J1 and J2 are aimed to impinge on the back surface 1316. Thus, the cooling capacity of the first and second holes 1329 and 1330 is settable over a wide range by varying any or all of the number of holes, the diameter of the holes, the axial orientation of the holes, and the viscosity, pressure and flow rate of the coolant C into the piston 1300. Preferably, the coolant C flows out of the open end 1309 of the piston 1300 to be collected with liquid coolant flowing out of the cylinder 1100 by a sump.

Thus, a thin cross-section and cylindrically symmetrical delivery of jets of liquid coolant directed at the back surface 1316 of the crown 1308 assure uniform cooling of the crown during engine operation and eliminate, or substantially reduce, swelling of the crown and the portion of the skirt immediately adjacent the crown. Cylindrical symmetry of the piston 1300 is thereby maintained at high BMEP, which supports ringless piston construction and operation. According to an exemplary piston design utilizing such jets to control thermal distortion, the differential expansion of the crown relative to the lower cylindrical portion of a 3.8" diameter piston can be maintained at less than 0.001".

The construction of the piston 1300 also mitigates another consequence of an opposed-piston engine of the Bird type that arises from the rigid interconnection of the pistons and the crankshafts to other parts of the engine. In Bird's engine, each piston is connected to two side-mounted crankshafts by a single yoke and a number of connecting rods. The yoke is integral with or fixed to the outer skirt of the piston and each end of the yoke is connected by one or more stiff rods to one of the crankshafts. The cylinder is immobilized in an engine block. As a result, translational misalignment between the axes of the piston and the cylinder containing the piston cannot be accommodated by compliance of the support structures of either the cylinder or the piston. In this regard, "compliance" refers to the amount of extension or displacement of a loaded structure per unit load. In comparison to Bird, the construction illustrated in FIGS. 13A-13E affords considerably more compliance in the support structure of the piston by permitting flexing of the tubular rod 1331 in response to translational misalignment between the longitudinal axis of the piston 1300 and the longitudinal axis of the cylinder 1100.

Figure 14A:
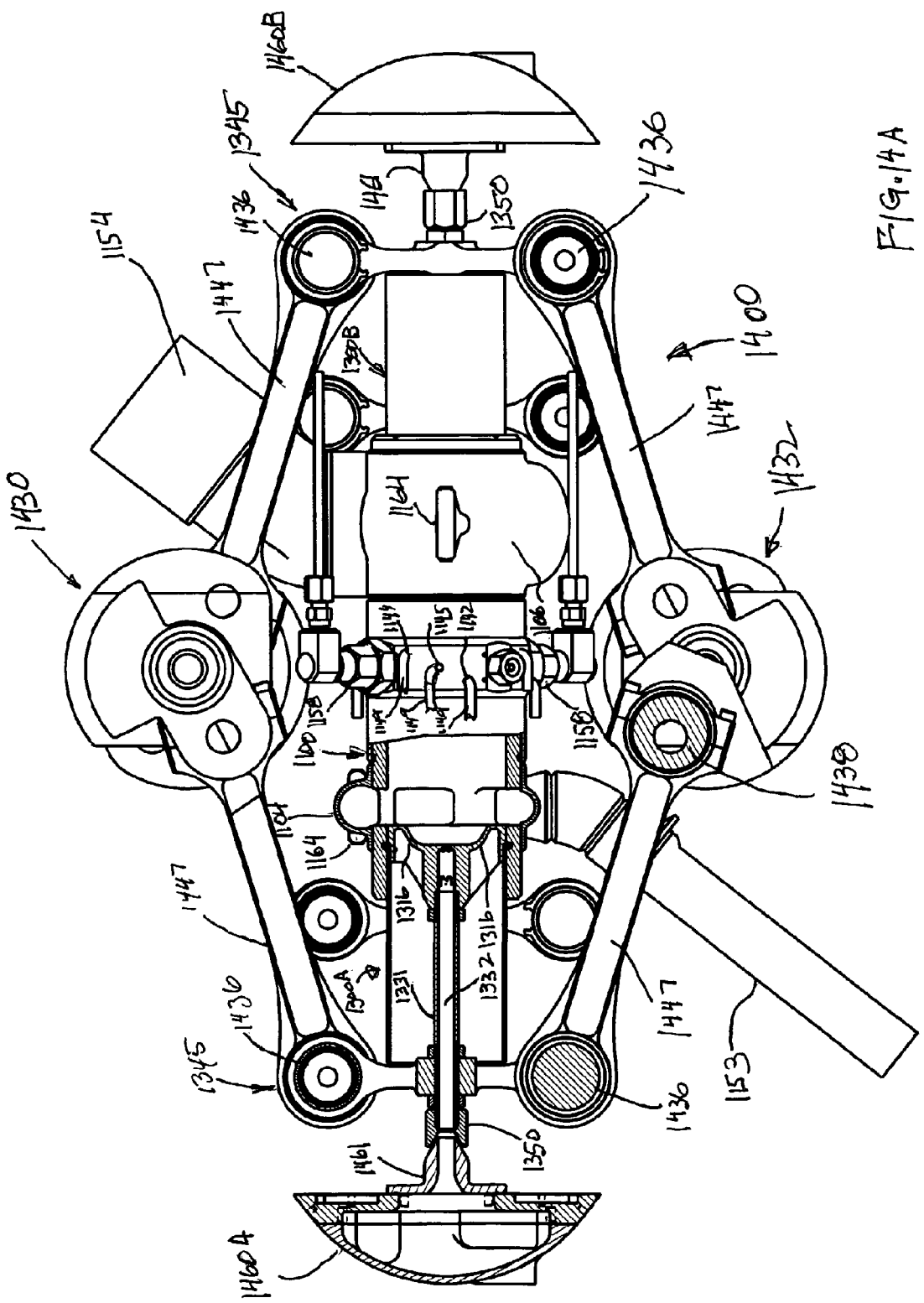
FIG. 14A is a side view of the second embodiment engine showing a cylinder with opposed pistons in which the pistons are coupled by primarily tensile-loaded connecting rods to two crankshafts, with the view partially cut away to show a piston cooling structure according to FIGS. 13A-13E.

A two-cycle, opposed-piston internal combustion engine illustrated in schematic form in FIG. 14A is now described. This description presumes a compression-ignition engine for the sake of illustration and example only. It could instead be a spark ignited engine. The described engine is constituted of at least one cylinder in which thermal non-uniformities are eliminated or substantially reduced by application of streams of a liquid coolant in the manner described with respect to the cylinder 1100 illustrated in FIGS. 11A-11D. A cylinder of this engine has a pair of opposed ringless pistons, in each of which thermal deformation is eliminated or substantially reduced by application of one or more jets of a liquid coolant in the manner described with respect to the piston 1300 described in connection with FIGS. 13A-13E.

As shown in FIG. 14A, the engine 1400 includes at least one cylinder 1100 with opposed pistons 1300A and 1300B disposed in it for reciprocating opposed motion toward and away from each other and the center of the cylinder 1100. The longitudinal axis $A_c$ of the cylinder is collinear with the longitudinal axes $A_p$ of the pistons 1300A and 1300B. The pistons 1300A and 1300B are coupled to first and second side-mounted counter-rotating crankshafts 1430 and 1432 which, in turn, are coupled to a common output (not shown in this figure). Saddles 1345 are mounted to the pistons 1300. Each of the saddles 1345 connects ends of a plurality of connecting rods 1447 to a respective one of the pistons. The perspective of this figure illustrates only two connecting rods 1447 for each piston, and it is to be understood that one or more additional connecting rods are not visible. Connecting rods 1447 are connected to a saddle 1345 near the open end 1309 of each piston 1300A and 1300B.

The two side-mounted crankshafts 1430 and 1432 are disposed with their axes parallel to each other and lying in a common plane that intersects the cylinder 1100 at or near its longitudinal center and that is perpendicular to the longitudinal axis $A_c$ of the cylinder. The crankshafts rotate in opposite directions. The connecting rods 1447 are connected to crank throws on the crankshafts 1430 and 1432. Each connecting rod 1447 is disposed to form an acute angle with respect to the axes (and the sides) of the cylinder 1100 and the pistons 1300A and 1300B. The connecting rods 1447 are linked to the saddles 1345 by means of needle bearings 1436, and to the crank throws by means of roller bearings 1438.

The geometric relationship between the connecting rods 1447, saddles 1345, and crankshafts 1430, 1432 in FIG. 14A keeps the connecting rods principally under tensile stress as the pistons 1300A and 1300B move in the cylinder 1100, with a limited level of compressive stress resulting from inertial forces of the pistons at high engine speeds. This geometry eliminates or at least substantially reduces side forces between the pistons 1300A and 1300B and the bore of the cylinder 1100.

In FIG. 14A, additional details and features of the cylinder 1100 and the pistons 1300A and 1300B are shown. The cylinder 1100 includes an exhaust port 1105 covered by the exhaust manifold 1104 through which the products of combustion flow out of the cylinder 1100. During high power operation of the engine 1400, for example at BMEP=150 psi, the average external temperature of the exhaust manifold 1104 and the duct 1153 may reach or exceed 375° C., a high enough temperature to coke diesel fuel. The average temperature of the manifold 1104 and duct 1153 is reduced considerably from the high initial exhaust gas temperature by the large subsequent flow of scavenging air. Accordingly, the exterior surfaces of exhaust manifold 1104 and the duct 1153 may be covered with an insulating coating such as a high temperature paint. Silicone-based compositions are useful for this purpose. One such composition is a metal oxide filled paint with a thermal conductivity (K) of less than 1 W/meter-° K sold under the trade name Corr-Paint CP4040 by Aremco. Another suitable composition is a coating formulated by mixing sil-cell spherical microballoons sold by Eager Plastics, Inc. or microspheres of glass sold by Potters Europe with a silicone based binder system sold under the trade name Aremco 8080 by Aremco; this composition provides a coating having a thermal conductivity (K) of less than 0.36 W/meter-° K.

As seen in FIG. 14A, the cylinder 1100 also has an inlet port hidden by the inlet manifold 1106 through which pressurized air flows into the cylinder 1100. Because of their locations with respect to these ports, the pistons 1300A and 1300B may be respectively referred to as the "exhaust" and "inlet" pistons, and the ends of the cylinder 1100 are similarly named. At least one fuel injector 1158 injects fuel into the cylinder 1100. Ports 1142, 1144, and 1145 conduct liquid coolant into respective groups of grooves on the outer surface of the cylinder 1100.

As described in connection with the first embodiment, the relation between piston length and the length of the cylinder, coupled with a phase difference between the pistons 1300A and 1300B as they traverse their bottom dead center positions, modulate port operations and sequence them correctly with piston events. Thus, the phase offset between the bottom dead center positions produces a sequence in which the exhaust port 1105 opens when the exhaust piston 1300A moves near its bottom dead center position, then the inlet port 1107 opens when the inlet piston 1300B moves near its bottom dead center position, following which the exhaust port closes after the exhaust piston moves away from its bottom dead center position, and then the inlet port 1107 closes after the inlet piston 1300B moves away from its bottom dead center position.

With reference to FIGS. 13C and 14A, two reservoirs 1460A and 1460B are provided outboard of the open ends of the pistons 1300A and 1300B. Each reservoir has a fixture 1461 from which liquid coolant for cooling the associated piston 1300A or 1300B is fed to the fixture 1350 mounted on the threaded end 1334 of the piston rod 1331. The fixture 1350 is aligned with a nozzle 1461 on the reservoir 1460A or 1460B. Liquid coolant fed into a reservoir 1460A or 1460B is forced out of a nozzle 1461 in a projected stream that enters the bore 1332 of a corresponding rod 1331 through a fixture 1350. The force of the projected stream and motion of the piston 1300A or 1300B force liquid coolant out of the rod 1331 in one or more jets directed onto the back surface of a crown 1308 through first and second holes 1329 and 1330.

FIG. 14B shows a side partially sectional view of a modification of the second embodiment engine that is identical in all respects with the engine 1400, with the exception of having alternate piston support and cooling structures. In FIG. 14B, the cylinder 1100 has disposed in it two opposing pistons 1480A and 1480B in which each piston 1480A or 1480B is coupled around its sleeve to a respective saddle 1482 in the manner described above for the first embodiment engine. In this regard see the coupling of piston sleeves 12s and 14s to saddles 16 and 18 in FIGS. 2A, 2B, 6A, and 6B. In addition, the crowns 1480c of the pistons 1480A and 1480B are thin and supported on their back surfaces 1486 by ribs (not shown) in the manner of the piston 1300. However, the pistons 1480A and 1480B lack the cylindrical boss 1326 and tubular rod of the piston 1300. For each piston 1480A, 1480B, there is a cooling structure 1490 fixed to a reservoir 1460 and having an annular array of tubes 1492 that face the back surface 1486 of the piston 1480A and 1480B. The outlet of each tube 1492 directs a turbulent jet of coolant between a respective pair of ribs 1488. There is a single tube 1493 centered in each annular array; the outlet of this tube 1493 faces the central portion of the back surface 1486 of a piston crown 1480c. Liquid coolant fed from each reservoir 1460A and 1460B, through the associated annular array emerges from the tubes 1492, 1493 as a plurality of jets directed at the back surface 1486 of a piston crown 1480c as the piston reciprocates in the cylinder 1100 during engine operation.

As described above in connection with the first embodiment, a two-stroke, opposed-piston engine according to the second embodiment has working elements (cylinders, pistons, linkages, crankshafts, etc.) received upon a structural unit in the form of a frame of passive structural elements fitted together to support the working elements. The frame bears the stresses and forces of engine operation, such as compressive forces between the crankshafts, and the cylinders are neither cast in a block nor formed with other passive structural elements. Each cylinder is supported in the engine frame and is decoupled from the mechanical and thermal stresses of an engine block. Hence, as with the first embodiment, the cylinders in the second embodiment are essentially only pressure vessels. This engine construction, together with cooling of the cylinder 1100 and pistons 1300A and 1300B in the manner described above, eliminates non-uniform radial distortion of the cylinder and swelling of the piston crowns, and permits the cylinder-piston interface to be very close-fitting. Advantageously, with tailored cooling, this characteristic affords the option of an engine design that dispenses with piston rings.

Figure 15D:
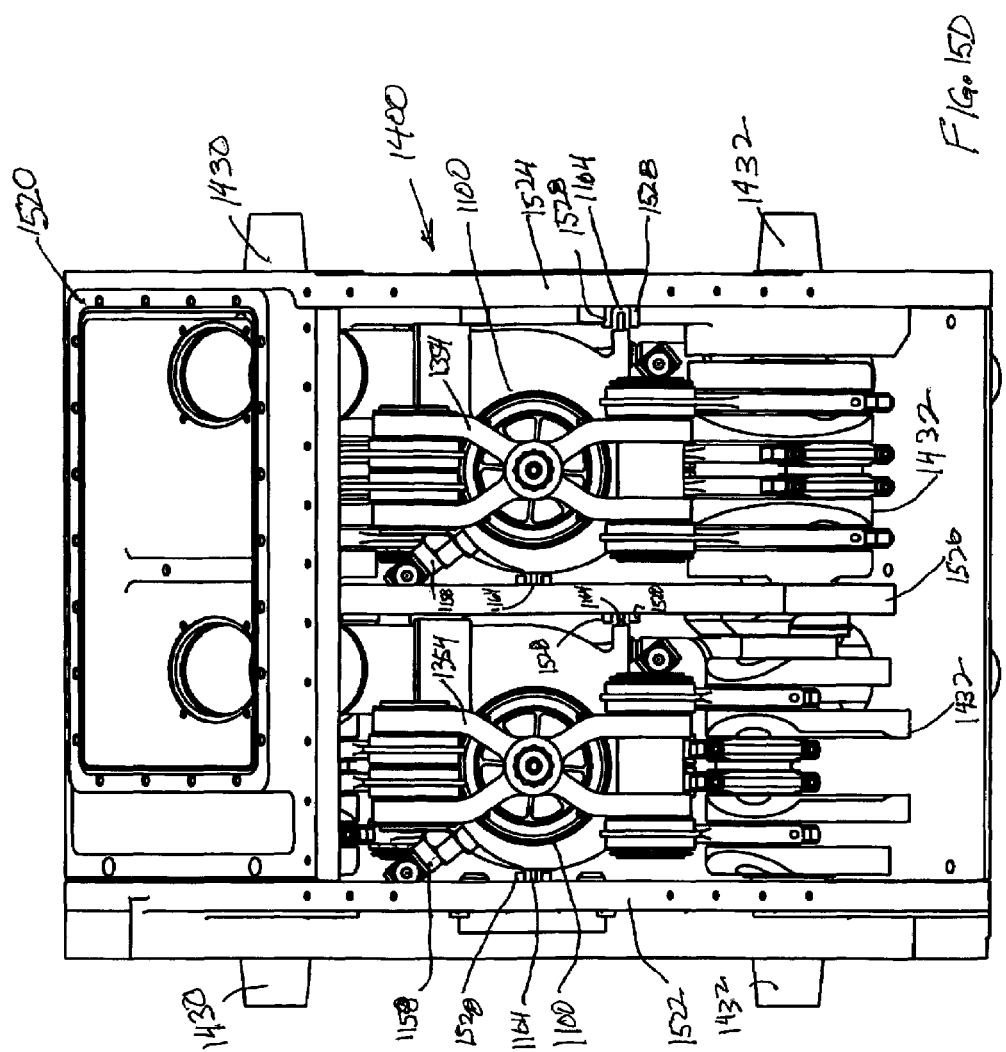

FIGS. 15A-15E are side perspective views showing increasingly complete assembly of the opposed-piston engine 1400 with side-mounted crankshafts based on the cylinder and piston constructions of FIGS. 11A-11D and 13A-13E. The engine 1400 has two cylinders, although this is merely for the sake of illustration. In fact, it can be scaled to engines of any size and engines having one, two or three or more cylinders. In FIG. 15A, the engine 1400 includes two cylinders 1100 having the construction illustrated in FIGS. 11A-11D, with opposed pistons 1300A and 1300B disposed in it. The saddles 1354 of the opposed pistons are visible in FIG. 15A. Connecting rods 1447 couple the saddles 1354 to the crankshafts 1430 and 1432. The exhaust ducts 1153 are received in corresponding openings in an engine plate 1510, and the inlet ducts are received in corresponding openings of an engine plate 1520.

FIGS. 15B and 15C show the engine 1400 without cylinders 1100 and reservoirs 1460. The engine 1400 has a frame constituted of end plates 1522 and 1524, and a middle plate 1526 positioned between the end plates 1522 and 1524. Slots 1528 are disposed on opposing sides of the plates 1522, 1524, and 1526. The plates 1522, 1524 and 1526 have bearings 1530 for rotatably supporting the crankshaft 1430 and bearings 1532 for rotatably supporting crankshaft 1432. The end and middle plates 1522, 1524, and 1526 are held together on one side by a number of engine plates including engine plate 1510 and counterpart engine plate 1511, and on a second side by engine plate 1520 and counterpart engine plate 1521. One reservoir 1460 is mounted to one side of the frame between engine plates 1520 and 1511, the other to the other side of the frame between engine plates 1510 and 1521.

A gearbox 1570 houses an output gear train through which the opposing rotational motions of the crankshafts 1530 and 1532 are coupled to an output drive shaft. The ends of the crankshafts 1430 and 1432 extend into the gearbox 1570. A gear wheel 1572 with a toothed outer rim is fixed to the end of the crankshaft 1430 and a gear wheel 1573 with a toothed outer rim is fixed to the end of the crankshaft 1432. An output gear wheel 1575 has an annulus 1576 with a toothed inside circumference 1577 and a toothed outside circumference 1578. As seen in these figures, the outer rim of the gear wheel 1572 engages the inside circumference 1577 of the gear wheel 1575 at one location and the outer rim of the gear wheel 1573 engages the outside circumference 1578 of the gear wheel 1575 at another location diametrically opposite the one location. The gear ratio between the inner gear 1572 and the inside circumference 1577 may be 33/65 with MOD 4 teeth on the inner gear and the inside circumference, while the gear ratio between the outer gear 1573 and the outside circumference 1578 may be 33/65 with MOD 5 teeth on the outer gear and the outside circumference. This arrangement of gears permits the opposing rotations of the crankshafts 1430 and 1432 to be translated into the continuous rotation of the output gear wheel 1575 with an odd number of gears (three, in this case), with a non-integral gear ratio, and without any intermediary belts, chains, or other torque transfer elements. The result is a simple, short output gear train.

An axle plate 1581 is attached by threaded screws to the annulus 1576 and a cover 1582 is fastened by threaded screws to the end plate 1522, over the gearbox 1570. The axle plate 1581 has a central axle 1586. The cover 1582 includes an output bearing 1585 that receives the axle 1586, thus enabling the frame to support the output gear 1575 for rotation. The axle 1586 constitutes the output drive of the engine 1400. It may be coupled to an intermediate transmission or directly to the driven component by one or more shafts, gears, belts, chains, cams or other suitable torque transfer element or system (not shown).

Figure 15E:
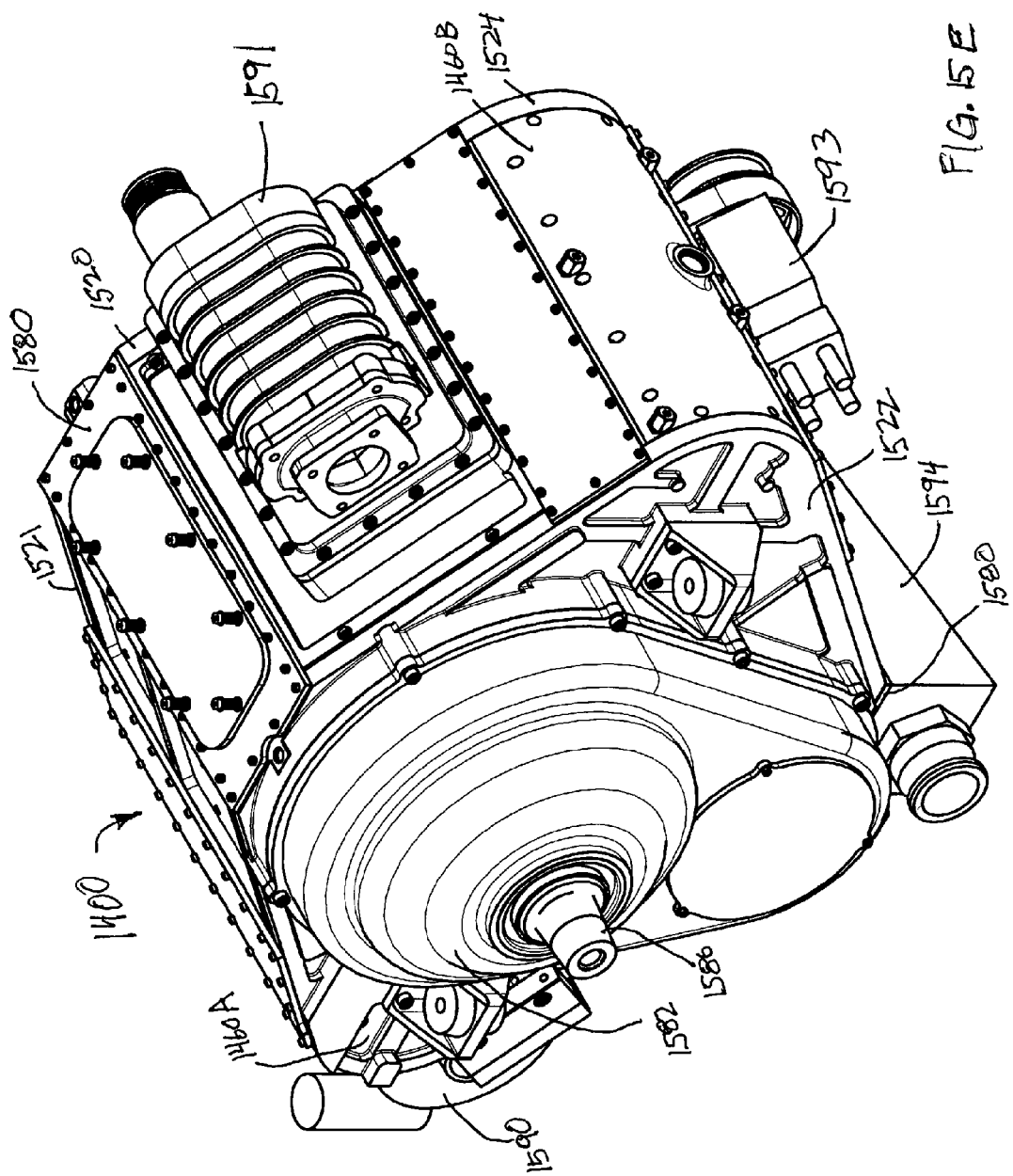

FIG. 15D shows the engine 1400 with two cylinders 1100 mounted to the end and middle plates 1522, 1524, and 1526 by engagement of tabs 1164 in slots 1528. The slots 1528 provide for easy removal of cylinders from the engine 1400 for inspection, repair, or replacement of cylinders or pistons. The assembled engine 1400 is seen in FIG. 15E, with reservoirs 1460 mounted by threaded screws between the end plates 1522 and 1524. The engine plates 1520, 1521, 1510, and 1511, reservoirs 1460, and cover plates 1580 are mounted by threaded screws and/or bolts to the end and middle plates 1522, 1524, and 1526 of the frame.

The frame parts for the engine 1400 are preferably made of high temperature aluminum alloy (such as 5454 aluminum) that is cast and/or machined as necessary for assembly and operation of the engine. Engine fuel and scavenge systems may be as disclosed above with respect to the first embodiment. Preferably, the liquid coolant and the fuel used for the engine 1400 are diesel fuel that may also serve as a lubricant for the pistons and other engine elements. Preferably, engine operations are controlled by way of an engine control unit (ECU) with associated sensors and actuators, as needed.

The mounting of auxiliary engine apparatus to the engine 1400 may be understood with reference to FIGS. 15A-15E. For example, a turbocharger 1590 is mounted to the engine plate 1510 for ease of coupling to one or more exhaust ducts 1153 and a supercharger 1591 is mounted to the engine plate 1520 for ease of coupling to inlet ducts 1154. A fuel injection pump 1593 is driven by a timing belt from the end of one of the crankshafts 1430, 1432. Coolant, lubricant and scavenging pumps (not shown) are mounted to the back of the engine 1400 and are driven by the end of one of the crankshafts 1430, 1432. The coolant pump provides liquid coolant to the ports in the cylinder sleeve 1140 and to the reservoirs 1460A and 1460B. A sump pump 1594 is mounted to the bottom plate 1580. Although not shown in these figures, the extensions of the crankshafts 1430 and 1432 through the back plate 1524 may also be employed to drive vibration dampers and engine accessories.

Figure 16A:
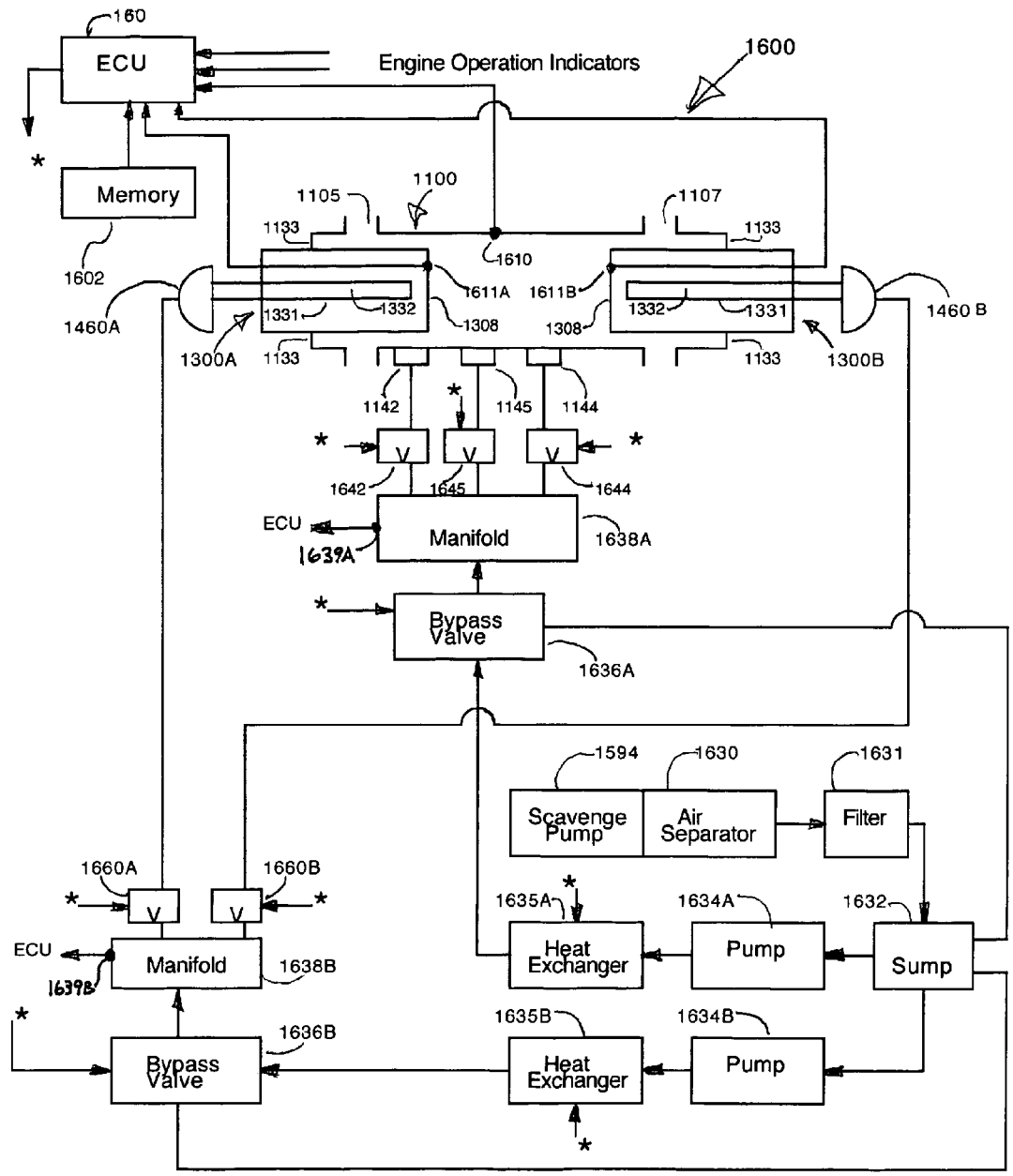
FIG. 16A is a schematic diagram of a supply system useable to control the application of liquid coolant to a cylinder and opposed pistons of the second embodiment engine.

Control of the delivery of liquid coolant by a liquid coolant supply system 1600 useable in the second embodiment is illustrated in the schematic diagram of FIG. 16A. The supply system 1600 includes a programmable engine control unit (ECU) 1601. The ECU 1601 senses a temperature of the cylinder 1100 by way of a sensor 1610 treaded into one of the openings 1116 in the cylinder liner 1102. The ECU 1601 also senses temperatures of the crowns of the pistons 1300A and 1300B by way of sensors 1611A and 1611B mounted in the pistons 1300A and 1300B. Other sensors (not all shown) may provide inputs indicative of various engine operating conditions to the ECU 1601. In the supply system 1600, a scavenge pump 1594 recovers coolant exhausted from the cylinder 1100 and pistons 1300A and 1300B and pumps the coolant through an air separator 1630 and a filter 1631 to a (dry) sump 1632.

A cylinder coolant circuit pump 1634A pumps coolant collected in the sump 1632 through a heat exchanger 1635A and a bypass valve 1636A and into a manifold 1638A. Liquid coolant for provision to the grooves in the cylinder 1100 is maintained at a selected pressure in the manifold 1638A by control of the bypass valve 1636A by the ECU 1601 and a pressure sensor 1639A in the manifold 1638A. From the manifold 1638A, the liquid coolant flows through proportional valves 1642, 1644, and 1645 and into grooves on the outside surface of the cylinder 1100 via ports 1142, 1144, and 1145, respectively. All of the valves 1636A, 1642, 1644, and 1645 are controlled by the ECU 1601.

A piston coolant circuit pump 1634B pumps coolant collected in the sump 1632 through a heat exchanger 1635B and a bypass valve 1636B into a manifold 1638B. Liquid coolant for provision to the tubes 1331 in the pistons 1300A and 1300B is maintained at a selected pressure in the manifold 1638B by control of the bypass valve 1636B by the ECU 1601 and a pressure sensor 1639B in the manifold 1636B. From the manifold 1638B, the liquid coolant flows through proportional valves 1660A and 1660B into the reservoirs 1460A and 1460B and from the reservoirs, through the bores 1332 of the tubes 1331 onto the back surfaces of the crowns in the pistons 1300A and 1300B. All of the valves 1636B, 1660A, and 1660B are controlled by the ECU 1601.

The ECU 1601 is programmed by mapping pre-calibrated values of cylinder and piston temperatures and other sensory data indicative of engine operating conditions to coolant pressures and flow rates for various engine operating loads. The ECU 1601 senses engine operating conditions and cylinder and piston temperatures, determines the current engine load and accesses and computes the required pressures and flow rates for the three circuits of the cylinder 1100 and the pistons 1300A and 1300B. The ECU 1601 then controls the valves 1636A, 1642, 1644, and 1645 to provide coolant to the coolant circuits of the cylinder 1100 as required to maintain cylindrical symmetry at the current engine operating point. This control may be either open loop or closed loop. For example, at full engine power, using diesel fuel as the coolant, the pressure and flow rates provided to the ports 1142 and 1144 may be less than 1 bar at 1 gallon per minute, and the pressure and flow rate provided to the ports 1145 may be less than 1 bar at 4 gallon per minute. At the same time, the ECU 1601 also sets the valves 1636B, 1660A, and 1660B to provide coolant to the coolant circuits of the pistons 1300A and 1300B as required to control thermal distortion of the crowns 1308 at the current engine operating point. For example, at full engine power, using diesel fuel as the coolant, the pressure and flow rates provided to the reservoirs 1460A and 1460B may be less than 3 bar at 15 gallons per minute per piston.

Control of the delivery of liquid coolant by an alternate liquid coolant supply system 1650 useable in the second embodiment is illustrated in the schematic diagram of FIG. 16A. The system 1650 provides a first coolant (water, for example) to the cylinder 1100 and a second, different coolant (lubricant or diesel fuel, for example) to the pistons 1300A and 1300B. The supply system 1650 includes the programmable engine control unit (ECU) 1601 and the sensors 1610, 1611A, and 1611B in the cylinder 1100 and pistons 1300A and 1300B. The supply system 1651 utilizes liquid coolant return lines 1661 connected conventionally to the holes 1147 in the cylinder sleeve 1140 and the holes 1133 at the ends of the cylinder 1100. The liquid coolant return lines 1661 converge into a return manifold 1662 that returns the first liquid coolant from the cylinder 1100 to a reservoir 1663.

A cylinder coolant circuit pump 1664 pumps the first liquid coolant collected in the reservoir 1663 through a heat exchanger 1665 and a bypass valve 1666 into a manifold 1667. First liquid coolant for provision to the grooves in the cylinder 1100 is maintained at a selected pressure in the manifold 1667 by control of the bypass valve 1666 by the ECU 1601 and a pressure sensor 1669 in the manifold 1667. From the manifold 1667, the first liquid coolant flows through proportional valves 1672, 1674, and 1675 into grooves on the outside surface of the cylinder 1100 through ports 1142, 1144, and 1145, respectively. All of the valves 1666, 1672, 1674, and 1675 are controlled by the ECU 1601.

The supply system 1650 also includes the piston coolant circuits of the supply system 1600, which are constituted of the elements in sequence from the scavenge pump 1594 through the reservoirs 1460A and 1460B to deliver the second liquid coolant for cooling the pistons 1300A and 1300B as described above in connection with FIG. 16A. As with the system 1600, the second liquid coolant is jetted into the pistons 1300A and 1300B and recovered by the scavenge pump 1594.

The ECU 1601 is programmed and operates the supply system 1650 in the manner of the supply system 1600 to map pre-calibrated values of cylinder and piston temperatures and other sensory data indicative of engine operating conditions to first and second coolant pressures and flow rates for various engine operating loads, and to control the provision of the first and second liquid coolants at those pressure and flow rates to the cylinder 1100 and pistons 1300A and 1300B, respectively.

Figure 16B:
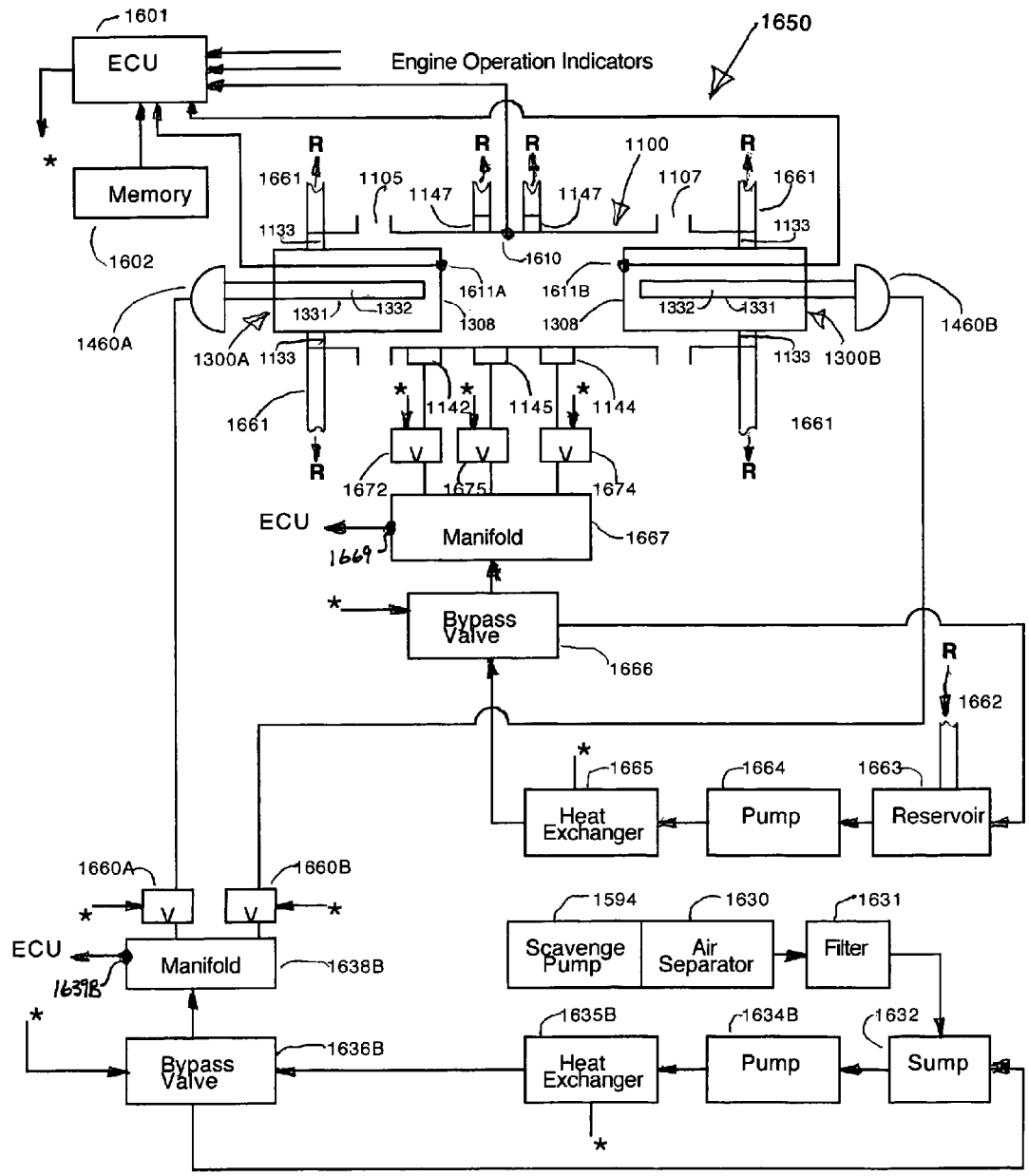
FIG. 16B is a schematic diagram of a modified supply system useable to control the application of liquid coolant to a cylinder and opposed pistons of the second embodiment engine.

It should be evident that the supply systems of FIG. 16A and FIG. 16B can control the cooling of the cylinder 1100 independently of the pistons 1300A and 1300B in response to engine operating conditions. Accordingly, the cylinder 1100 and the pistons 1300A and 1300B may be maintained at different temperatures. One advantage of this arrangement may be to maintain the cylinder 1100 at a higher temperature than the pistons 1300A and 1300B in order to maintain a predetermined spacing between the bore 1103 and the outside diameter of the pistons as engine conditions vary.

Engine Power

Enhanced engine performance is realized, with the result that opposed-piston engines constructed according to this specification are capable of achieving improved BMEP, specific output, and PWR when compared with prior art opposed-piston engines. For example an opposed-piston engine constructed according to this specification will tolerate BMEP of at least 200 psi, at least 250 psi, or at least 300 psi due to improved cooling. Such an opposed-piston engine is capable of providing specific power densities (SPD) relative to piston area of at least 11.0 HP/in$^2$, at least 12.0 HP/in$^2$, or at least 13.0 HP/in$^2$. These improvements enable this opposed-piston engine to achieve a PWR of at least 0.5 HP/lb, at least 0.667 HP/lb, or at least 1.0 HP/lb.

Figure 17C:
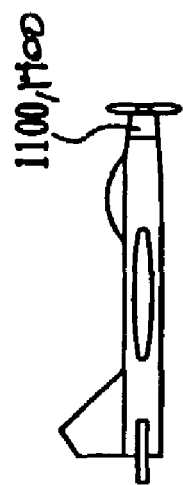
FIGS. 17A-17F illustrate applications of the opposed-piston engine.
Figure 17B:
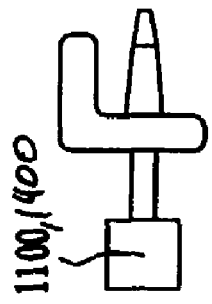
Figure 17A:
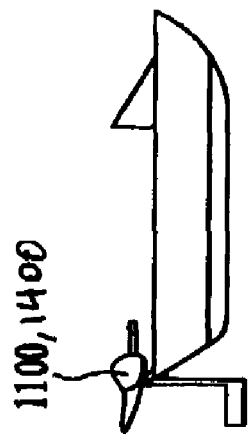
Figure 17F:
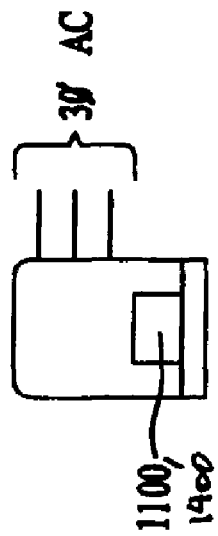
Figure 17E:
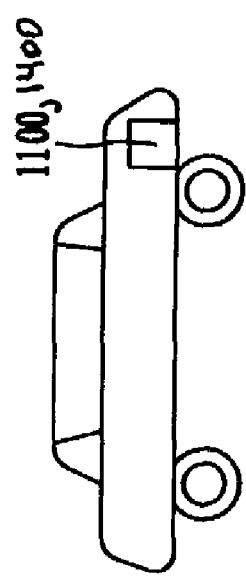
Figure 17D:
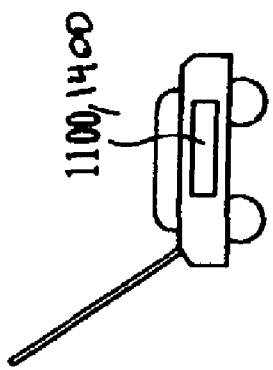

The uses and applications of an opposed-piston engine set forth in this specification are many fold. It can be scaled for any application using two-cycle engines, including two-cycle diesel engines. The engine can be installed in or mounted on a variety of powered vehicles, tools, devices, or other apparatus requiring the delivery of rotary power. See FIGS. 17A-17D for examples in this regard. In FIG. 17A, this two-cycle opposed-piston engine 1100, 1400 is installed in a surface vehicle, which can include wheeled or tracked vehicles, such as automobiles, motorcycles, scooters, trucks, tanks, armored military vehicles, snow-mobiles, and all equivalent and similar instances. In FIG. 17B, this engine is installed in a water-going vehicle such as a boat, hovercraft, submarine, personal water craft, and all equivalent and similar vehicles. In FIG. 17C, this engine is installed in a fixed or rotary-wing aircraft. In FIG. 17D, this engine is installed in a powered implement such as a lawnmower, edger, trimmer, leaf blower, snow blower, chain saw, and all equivalent and similar devices. In FIG. 17E, this engine is installed in an electrical power generating device. In FIG. 17F, the engine is installed in a pumping device.

Although the invention has been described with reference to specific illustrations and examples, it should be understood that various modifications can be made without departing from the spirit of the principles of our engine. Accordingly, the invention is limited only by the following claims.

The invention claimed is:

1. An opposed-piston internal combustion engine, comprising:
   a cylinder having a liner with an outside surface, a central portion, exhaust and inlet ends, and a bore;
   cylinder coolant channels to conduct streams of a liquid coolant on the outside surface that flow from the central portion to both the exhaust and inlet ends;
   first and second opposed pistons disposed to reciprocate in the bore, each piston including a crown having a back surface; and
   a piston coolant channel to apply a flow of a liquid coolant to an internal portion of each piston on the back surface of the crown.

2. The engine of claim 1, in which the cylinder coolant channels include first and second groups of grooves which extend on the outside surface from the central portion toward the exhaust and inlet ends, respectively, and a third group of grooves which extend substantially circumferentially in the central portion, further including a cylinder sleeve covering the first, second, and third groups of grooves and one or more ports in the cylinder sleeve, each port in communication with a respective groove.

3. The engine of claim 1, in which each piston includes a cylindrical body, an open end, and a closed end defining a crown, the engine further including at least two piston coolant channels, each piston coolant channel positioned for directing at least one jet of liquid coolant to the back surface of the crown of the piston.

4. The engine of claim 3, in which the cylinder coolant channels include first and second groups of grooves which extend on the outside surface from the central portion toward the exhaust and inlet ends, respectively, and a third group of grooves which extend substantially circumferentially in the central portion, further including a cylinder sleeve covering the first, second, and third groups of grooves and one or more ports in the cylinder sleeve, each port in communication with a respective groove.

5. The engine of claim 3, in which each piston includes a longitudinal axis and a plurality of ribs abutting the back surface of the crown and extending radially with respect to the longitudinal axis.

6. The engine of claim 5, further including a frame, in which each piston coolant channel is mounted to the frame.

7. The engine of claim 5, in which each piston coolant channel is mounted to a respective piston.

8. The engine of claim 1, further including a frame, an exhaust manifold on the exhaust end, an inlet manifold on the inlet end and at least one tab on each of the exhaust and inlet manifolds, each tab receivable in the frame.

9. The engine of claim 8, further including an insulating coating on the exhaust manifold.

10. The engine of claim 1, in which each piston includes a cylindrical body having a radius, an open end, a closed end defining a crown, and a tube, the tube coaxial with the cylindrical body and having a first end attached to the piston near the back surface of the crown and a second end extending through the open end and constructed to be connected to a reciprocating mechanism in the engine.

11. The engine of claim 10, in which the tube forms the piston coolant channel, further including a coolant supply system and means for connecting the piston coolant channel to the coolant supply system.

12. The engine of claim 11, in which the tube is flexible.

13. The engine of claim 1, wherein the liquid coolant provided to the cylinder and pistons comprises the same liquid coolant.

14. The engine of claim 1, wherein the liquid coolant provided to the cylinder is different than the liquid coolant provided to the pistons.

15. The engine of claim 1, further including first means for applying a first liquid coolant to the cylinder coolant channels and a second means for applying a second liquid coolant, different than the first liquid coolant, to the piston coolant channels of the first and second pistons.

16. The engine of claim 1, wherein each piston is a hollow piston lacking a wristpin.

17. The engine of claim 15, wherein each piston coolant channel includes a plurality of coolant channels aimed at the crown of a piston.

18. The engine of claim 1, further including a coolant supply system connected to the cylinder and piston coolant channels, in which the coolant supply system includes means for maintaining the cylinder and pistons at respective temperatures.

19. The engine of claim 1, further comprising:
   first and second side-mounted crankshafts; and
   rods which connect the pistons to the crankshafts.

20. The engine of claim 19, wherein the rods are subjected primarily to tensile forces during operation of the engine.

21. The engine of claim 19, wherein the cylinder has exhaust and inlet ports and wherein the crankshafts, the rods, and the exhaust and inlet ports are arranged such that the pistons are in phase in their top dead center positions and offset in phase in their bottom dead center positions.

22. The engine of claim 19, further comprising a frame constructed to support the crankshafts for rotation.

23. The engine of claim 22, wherein the frame supports compressive forces between the crankshafts.

24. The engine of claim 19, wherein the engine is a two-cycle compression-ignition engine.

25. The engine of claim 24, the cylinder further including manifolds, wherein the exhaust and inlet ports open into respective manifolds, and each manifold has a shape that induces swirl.

26. The engine of claim 1, wherein the engine operates at a power-to-weight ratio of at least 0.50 HP/lb.

27. The engine of claim 26, wherein the engine operates at a power-to-weight ratio of at least 0.67 HP/lb.

28. The engine of claim 27, wherein the engine operates at a power-to-weight ratio of at least 1.00 HP/lb.

29. A machine powered by the engine of claim 1.

30. A vehicle powered by the engine of claim 1.

31. The vehicle of claim 30, wherein the vehicle is a watercraft.

32. The vehicle of claim 30, wherein the vehicle is a surface vehicle.

33. The vehicle of claim 30, wherein the vehicle is a fixed-wing aircraft.

34. The vehicle of claim 30, wherein the vehicle is a rotary-wing aircraft.

35. A power tool powered by the engine of claim 1.

36. A power generator powered by the engine of claim 1.

37. The engine of claim 1, further comprising first and second counter rotating crankshafts, the engine further including:
   a frame constructed to support the crankshafts for rotation;
   a first gear on the first crankshaft;
   a second gear on the second crankshaft; and,
   a third gear supported on the frame, the third gear having an annulus with an outside circumference engaging the first gear at a first location and an inside circumference engaging the second gear at a second location.

38. The engine of claim 37, wherein the second location is opposite the first location.

39. An opposed-piston internal combustion engine, comprising:
a cylinder with a bore, an outside surface, a central portion, an exhaust end and an inlet end;
a first group of grooves on the outside surface to conduct a liquid coolant from the central portion toward the exhaust end;
a second group of grooves on the outside surface to conduct a liquid coolant from the central portion toward the inlet end;
a third group of grooves on the outside surface to conduct a liquid coolant circumferentially in the central portion;
first and second opposed pistons disposed to reciprocate in the bore, each piston including a crown;
at least one coolant channel to apply a directed jet of a liquid coolant to an internal portion of the first piston on a back surface of the crown; and
at least one coolant channel to apply a directed jet of a liquid coolant to an internal portion of the second piston on a back surface of the crown.

40. The engine of claim 39, wherein the pistons are ringless.

41. An assembly for an opposed piston internal combustion engine, comprising:
a cylinder including a liner with exhaust and inlet ends, a bore, an outside surface, a central portion, an exhaust port near the exhaust end, and an inlet port near the inlet end;
the cylinder including an exhaust manifold over the exhaust port and an inlet manifold over the inlet port;
means for conducting a liquid coolant on the outside surface in a direction from the central section out of the inlet end;
means for conducting a liquid coolant on the outside surface in a direction from the central section out of the exhaust end;
means for conducting a liquid coolant on the outside surface in a circumferential direction in the central section;
first and second opposed pistons disposed to reciprocate in the bore, each piston including a crown;
at least one coolant channel to apply a directed jet of the liquid coolant to an internal portion of the first piston on a back surface of the piston crown; and
at least one coolant channel constructed to apply a directed jet of the liquid coolant to an internal portion of the second piston on a back surface of the piston crown.

42. The engine of claim 41, wherein the pistons are ringless.

43. An opposed-piston internal combustion engine, comprising:
a cylinder having a liner with an outside surface, a central portion, exhaust and inlet ends, and a bore;
a supply system constructed to apply respective streams of a liquid coolant on the outside surface that flow from the central portion out of both the exhaust and inlet ends; and
first and second opposed pistons disposed to reciprocate in the bore.

44. The engine of claim 43, in which the cylinder liner includes respective groups of grooves which extend on the outside surface from the central portion toward the exhaust and inlet ends, and a group of grooves which extend substantially circumferentially in the central portion, further including a cylinder sleeve covering the grooves and one or more ports in the cylinder sleeve, each port in communication with a respective groove, the supply system connected to the one or more ports.

45. The engine of claim 43, wherein each piston includes a crown having a back surface, the supply system constructed to apply a liquid coolant to an internal portion of each piston on the back surface of the crown.

46. The engine of claim 45, in which each piston includes a cylindrical body, an open end, and a closed end defining a crown, the engine further including at least two coolant channels, each coolant channel connected to the supply system and positioned for directing at least one jet of liquid coolant to the back surface of the crown of the piston.

47. The engine of claim 45, in which the cylinder liner includes respective groups of grooves which extend on the outside surface from the central portion toward the exhaust and inlet ends, and a group of grooves which extend substantially circumferentially in the central portion, further including a cylinder sleeve covering the grooves and one or more ports in the cylinder sleeve, each port in communication with a respective groove, the supply system connected to the one or more ports.

48. An opposed-piston internal combustion engine, comprising:
a cylinder having a liner with a bore;
first and second opposed pistons disposed to reciprocate in the bore, each piston including a skirt and a crown having a back surface; and
an array of ribs in each crown extending along the inside surface of a skirt and forming a radially symmetrical array of chambers for conducting jets of a liquid coolant on the back surface of the crown.

49. The engine of claim 48, wherein the liner further includes an outside surface, a central portion, exhaust and inlet ends, and the cylinder includes coolant channels to apply respective streams of a liquid coolant on the outside surface that flow from the central portion out of the ends.

50. The engine of claim 49, in which the coolant channels include groups of grooves which extend on the outside surface from the central portion toward the end portions, and a group of grooves which extend substantially circumferentially in the central portion, further including a cylinder sleeve covering the grooves and one or more ports in the cylinder sleeve, each port in communication with a respective groove.

51. A method of operating an internal combustion engine including at least one cylinder having a liner with an outside surface, a bore, a central portion, and exhaust and inlet end portions, and a pair of opposed pistons disposed to reciprocate in the bore, each piston including a crown with a back surface, the method including:
applying first streams of a liquid coolant to the outside surface that flow from the central portion out of the exhaust end portion;
applying second streams of a liquid coolant to the outside surface that flow from the central portion out of the inlet end portion; and,
applying third streams of a liquid coolant to the outside surface that flow around the central portion.

52. The method of claim 51, further including applying directed jets of a liquid coolant to an internal portion of each piston on the back surface of the crown.

53. The method of claim 52, wherein applying directed jets of a liquid coolant to an internal portion of each piston on the back surface of the crown includes cylindrically symmetric delivery of the directed jets on the back surface of the crown.

54. A method of operating an internal combustion engine including at least one cylinder having a liner with an outside surface, a bore, a central portion, and exhaust and inlet end portions, and a pair of opposed pistons disposed to reciprocate in the bore, each piston including a crown with a back surface, the method including:

applying first streams of liquid coolant to the outside surface from the central portion toward the exhaust end portion;

applying second streams of liquid coolant to the outside surface from the central portion toward the inlet end portion; and, applying third streams of a liquid coolant to the outside surface around the central portion;

in which the first streams of a liquid coolant have a first cooling capacity, the second streams have a second cooling capacity less than the first cooling capacity, and the third streams have a third cooling capacity greater than the first cooling capacity.

* * * * *